(12) United States Patent
Furuya

(10) Patent No.: US 7,527,303 B2
(45) Date of Patent: May 5, 2009

(54) CONNECTOR WITH CHECK FUNCTION

(75) Inventor: Masashi Furuya, Kanagawa (JP)

(73) Assignee: Piolax, Inc., Yokohama-shi (JP)

( * ) Notice: Subject to any disclaimer, the term of this patent is extended or adjusted under 35 U.S.C. 154(b) by 194 days.

(21) Appl. No.: 10/452,245

(22) Filed: Jun. 3, 2003

(65) Prior Publication Data
US 2004/0036283 A1    Feb. 26, 2004

(30) Foreign Application Priority Data
Jun. 4, 2002 (JP) .......................... P.2002-162841
Mar. 7, 2003 (JP) .......................... P.2003-061799

(51) Int. Cl.
*F16L 37/00* (2006.01)
(52) U.S. Cl. .......................... 285/305; 285/81; 285/319
(58) Field of Classification Search ................. 285/305, 285/39, 81, 319, 308, 921, 93, 913, 914, 285/316, 86
See application file for complete search history.

(56) References Cited

U.S. PATENT DOCUMENTS 4,483,510 A  * 11/1984  Palau et al. .............. 251/149.6
4,601,497 A     7/1986  Bartholomew
5,152,555 A  * 10/1992  Szabo ......................... 285/319
5,219,188 A  *  6/1993  Abe et al. ...................... 285/93
5,275,443 A  *  1/1994  Klinger ....................... 285/319
5,401,063 A  *  3/1995  Plosz ............................. 285/93
5,405,175 A  *  4/1995  Bonnah et al. .............. 285/921
5,806,832 A  *  9/1998  Larbuisson ................. 285/316
5,863,077 A     1/1999  Szabo et al.

FOREIGN PATENT DOCUMENTS

EP        0 992 729 A1    4/2000
JP        10-141567       5/1998

* cited by examiner

*Primary Examiner*—Aaron M Dunwoody
(74) *Attorney, Agent, or Firm*—McGinn IP Law Group, PLLC

(57) ABSTRACT

An approximately cylindrical housing is coupled to one pipe, and the other pipe having an annular protruding portion on an outer periphery at an end portion is inserted into the housing to be coupled. Inside the housing, are installed a stopper that is held at an initial position in close proximity to an opening portion of the housing and moves to a push-in position away from the opening portion of the housing when the other pipe is fully introduced inside, and a retainer having a locking piece that is inserted through an opening portion, formed in a top wall of the housing, in a direction perpendicular to the axial direction of the housing and engages with the annular protruding portion of the other pipe while the end portion of the other pipe is fully inserted. The retainer cannot be inserted unless the stopper moves to the push-in position.

22 Claims, 46 Drawing Sheets

FIG. 17 (a)
FIG. 17 (b)
FIG. 17 (c)
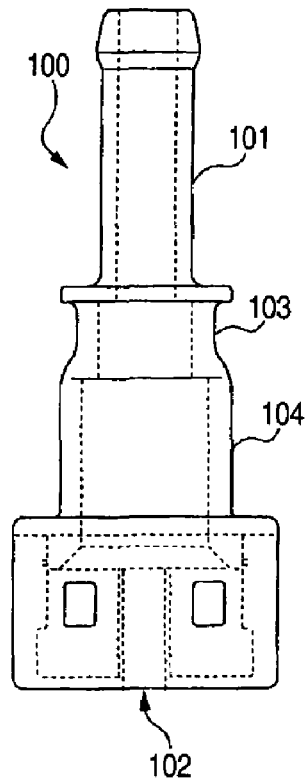
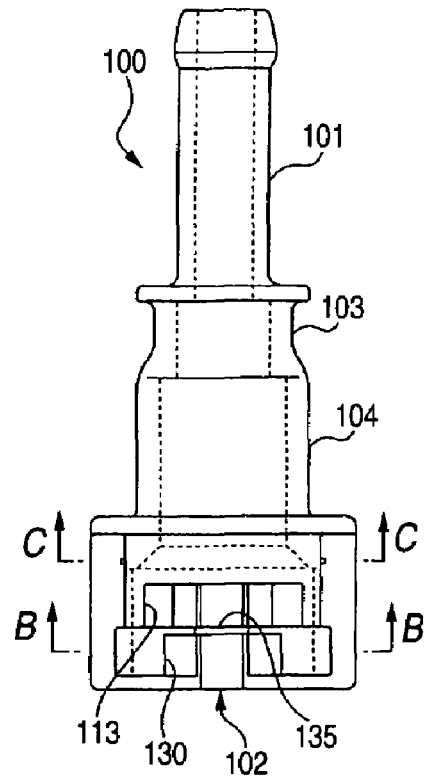
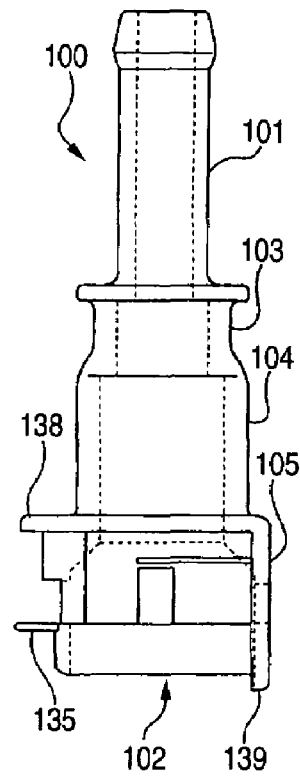
FIG. 17 (d)
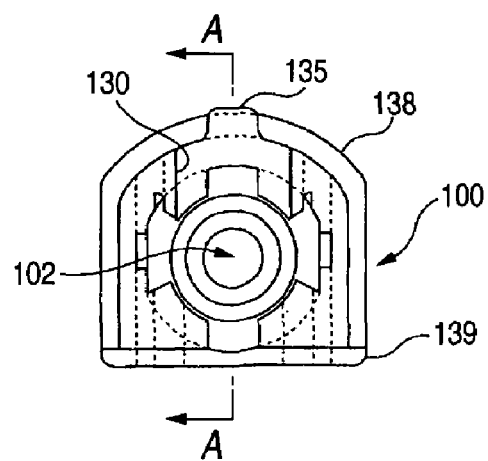

FIG. 19 (a)
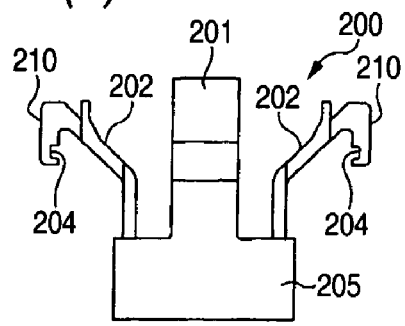
FIG. 19 (b)
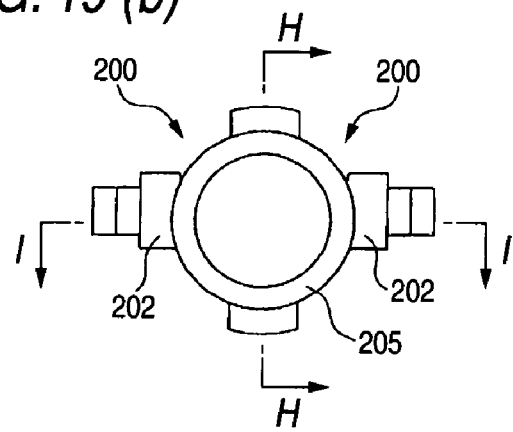
FIG. 19 (c)
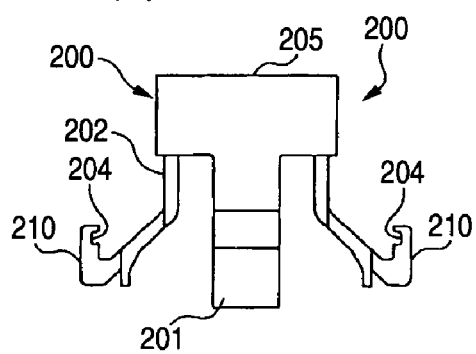
FIG. 19 (d)
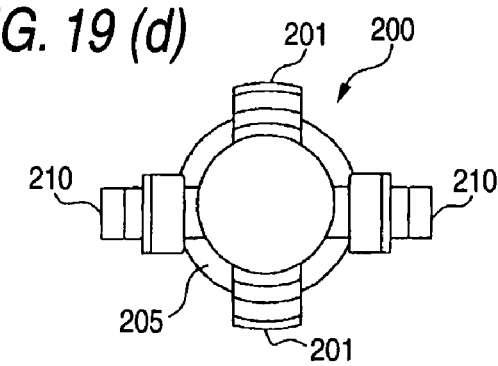
FIG. 19 (e) H-H
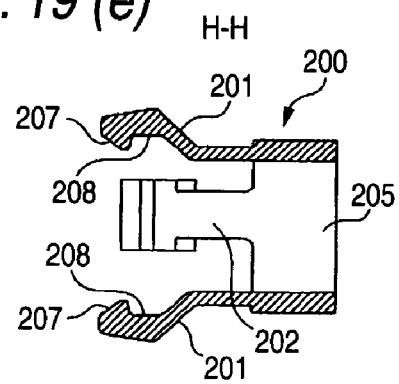
FIG. 19 (f) I-I
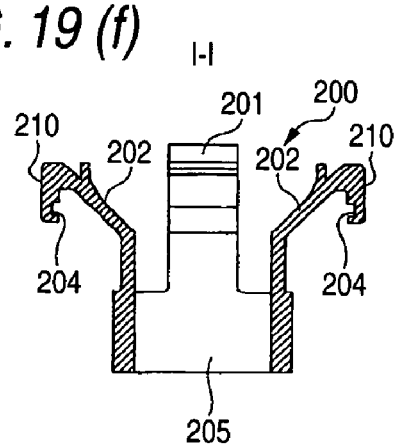

K-K

J-J

N-N

V-V

W-W

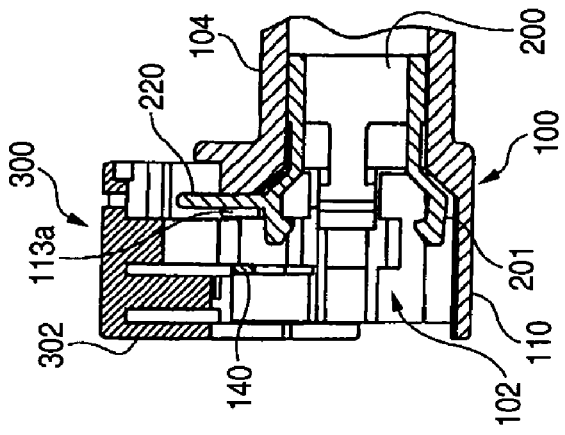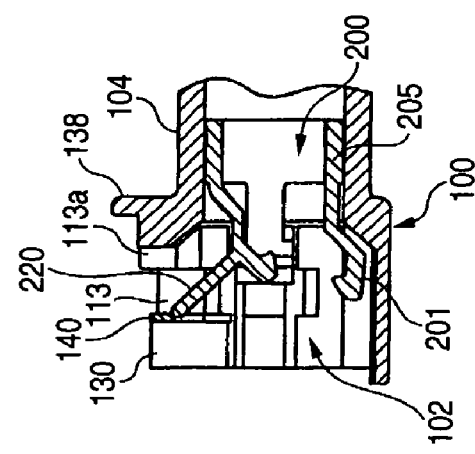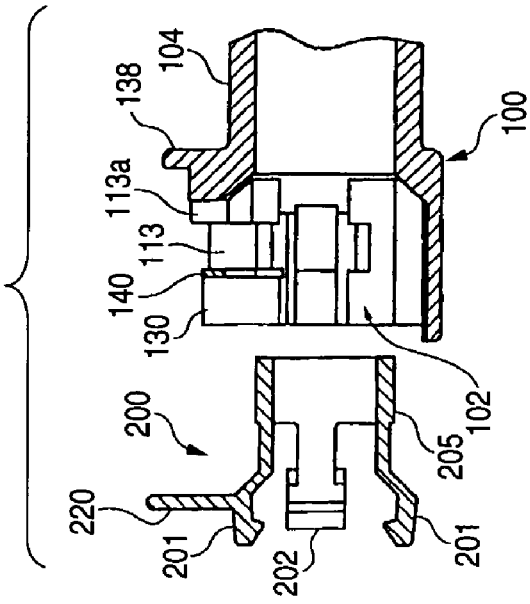

FIG. 46 (a)　　　FIG. 46 (b)　　　FIG. 46 (c)
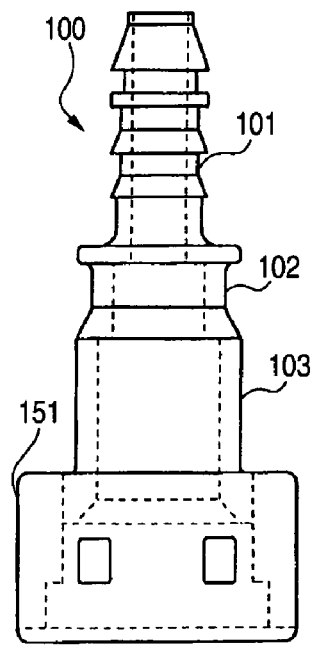
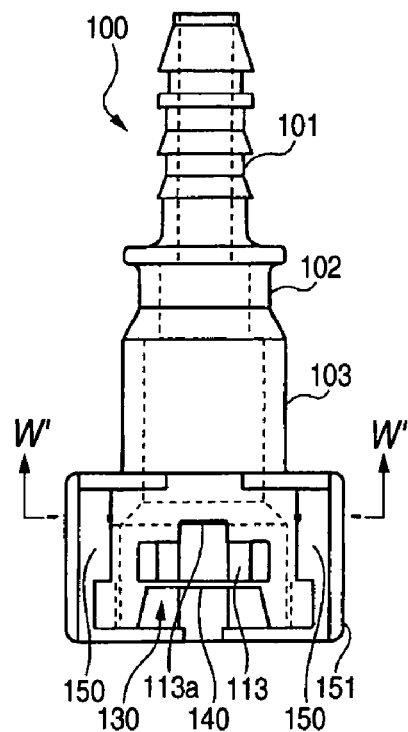
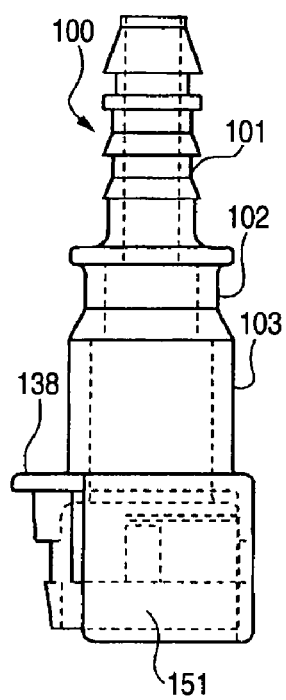
FIG. 46 (d)　　　FIG. 46 (e)
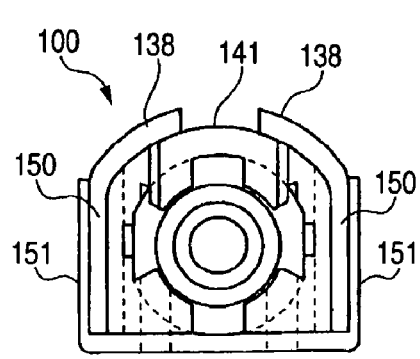
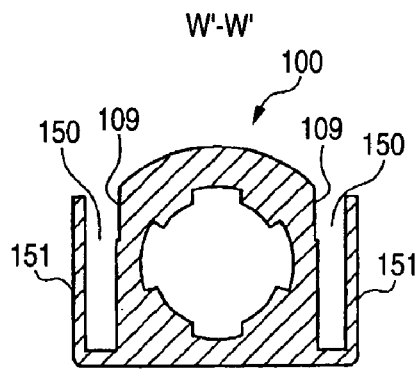

CONNECTOR WITH CHECK FUNCTION

The present disclosure relates to the subject matter contained in Japanese Patent Application No. 2002-162841 filed on Jun. 4, 2002 and Japanese Patent Application No. 2003-61799 filed on Mar. 7, 2003, which are incorporated herein by reference in its entirety.

BACKGROUND OF THE INVENTION

1. Field of the Invention

The present invention relates to a connector for use in piping connection for fluid, for example, fuel, cooling water, etc., and more particularly to a connector with check function of enabling confirmation from the outside as to whether piping connection is established completely.

2. Description of the Related Art

Recently, a so-called quick connector has been used for piping connection of fuel supply in a vehicle or the like. According to this connector, one pipe to be connected is provided with an annular protruding portion on the outer periphery at the end portion while the other pipe to be connected is coupled to a nearly cylindrical housing (connector housing). Thus, when the end portion of the pipe is inserted into the housing, the annular protruding portion engages with an engaging member called a retainer installed inside the housing, thereby allowing the pipe to be coupled with the housing through a one-touch operation. Also, another quick connector that uses a retainer having a gate-type inserting piece has been known. According to this connector, after the end portion of the pipe is inserted into the housing, the inserting piece of the retainer is inserted so as to engage with the annular protruding portion.

The quick connectors as described above are advantageous in that a piping work can be performed readily and swiftly. However, in a state where the end portion of the pipe is inserted into the housing, it is difficult to confirm whether the annular protruding portion completely fits into the retainer through a mere sight of the connector from the outside. Hence, in the event that fluid is flown when the connection is incomplete due to a mistake in the piping work or the like, there is a possibility that the connection is disconnected and fluid starts to leak.

Accordingly, JP-A-10-141567 proposes an arrangement using a connector, in which the housing has an axially restricted portion and a pair of window portions penetrating through the housing in a radius direction and provided oppositely in a circumferential direction, and the retainer, inserted and held inside the housing, has a pair of claw portions elastically deformable in the radius direction and provided at positions corresponding to the window portions. The claw portions include inclined inner surfaces inclined inwardly in the radius direction from the opening end to the inner side in the axial direction of the housing, on which the annular protruding portion slides with pressing when the pipe is introduced inside, and a hooking portion that hooks on the annular protruding portion when coupling is made and thereby restricts fall-off of the pipe. Herein, a confirming member, which has an axially restricting portion stopped at the axially restricted portion through engagement and thereby restricting relative movement in the axial direction, and a C-shaped member expandable in diameter through elastic deformation, is provided to the outer peripheral surface of the housing of the connector to be held externally from a direction at right angles to the axis. The C-shaped member is stopped at the edges of the window portions through engagement, and when coupling is completed by fully introducing the pipe inside, the C-shaped member is expanded in diameter by the claw portions. This allows the confirming member to be removed, based on which a coupling state can be confirmed.

Patent Document 1: JP-A-10-141567

The connector provided with the confirming member enables confirmation of connection through removal of the confirming member from the housing after the pipe is introduced and coupled to the housing that is coupled to the other pipe. However, in a case where the pipe is disconnected by releasing the engagement with the connector and reconnected, there arises a problem that the coupling state can no longer be confirmed because the confirming member has been removed. In this case, the confirming member may be stored and attached again to the housing at the time of reconnection; however, such a work is so tedious that it does not meet the practical need.

SUMMARY OF THE INVENTION

It is therefore an object of the invention to provide a connector with check function of enabling confirmation of connection through a mere sight of the connector from the outside after a pipe is connected, and of enabling confirmation of connection as with the first time even in a case where the connection is disconnected and the pipe is reconnected.

In order to achieve the above and other objects, according to a first aspect of the invention, a connector with check function for connecting pipes for fluid, one of the pipes having an annular protruding portion on an outer periphery thereof at an end portion, the connector includes a housing, a stopper, and a retainer. The approximately cylindrical housing is coupled to the other of the pipes. The one of the pipes is inserted into the housing. The stopper is disposed in an interior of the housing. The stopper is held at an initial position of the stopper adjacent to an opening portion of the housing. The stopper moves to a push-in position away from the opening portion of the housing when the one of the pipes is fully inserted. The retainer is attached to the housing to be insertable and movable between an initial position of the retainer and an insert position. The retainer and the stopper each has a restricting portion. The restricting portions restrict the retainer depending on a position of the stopper so that the retainer is allowed to be inserted into the housing when the stopper is at the push-in position, and the retainer is not allowed to be inserted into the housing when the stopper is at a position other than the push-in position. The retainer is configured to engage with the housing at the insert position.

In the first aspect, the stopper is held at the initial position, and when the tip end portion of the one of the pipes is fully inserted into the housing in this state, the stopper moves to the push-in position, and the retainer can be inserted in this state. Given this state, the operator can confirm whether connection is established in a reliable manner at a glance of the retainer that is inserted into the housing.

Because the stopper has not moved to the push-in position while the end portion of the one of the pipes is inserted into the housing halfway, the restricting portion provided between the retainer and the stopper inhibits the retainer from being inserted into the housing. Hence, the operator can confirm that connection is incomplete at a sight of the retainer that is not inserted into the housing.

In a case where the one of the pipes is pulled out and reconnected for some reason by pulling the retainer upward after connection is completed by fully introducing the one of the pipes into the housing and inserting the retainer, the stopper held by the connector only has to be returned to the initial position and the one of the pipes is inserted into the housing again. When the one of the pipes is fully introduced inside, the stopper moves to the push-in position, which allows insertion of the retainer. Hence, not only can the one of the pipes be reconnected, but also connection can be confirmed based on the fact that the retainer is inserted.

According to a second aspect, in the first aspect, the retainer has a locking piece inserted into an upper opening portion, which is formed in a top wall of the housing, in a direction at right angles to an axial direction of the housing. The locking piece engages with the annular protruding portion of the one of the pipes.

In the second aspect, because the locking piece of the retainer engages with the annular protruding portion of the one of the pipes, a pair of pipes can be coupled more firmly.

According to a third aspect of the invention, in the first or second aspect, the stopper includes an engaging piece, which elastically engages with the annular protruding portion of the one of the pipes. When the one of the pipes is inserted, the engaging piece abuts against and engages with the annular protruding portion with elastically opening up. When the one of the pipes is pulled out, the engaging piece engages with the annular protruding portion to return the stopper to the initial position of the stopper.

In the third aspect, by providing the engaging piece to the stopper, it is possible to automatically return the stopper to the initial position when the connected pipe is pulled out and removed, because the engaging piece elastically engages with the annular protruding portion of the one of the pipes. Hence, not only can the one of the pipes be introduced again and reconnected, but also connection can be confirmed without the need of a work to return the stopper to the initial position at the time of reconnection.

According to a fourth aspect of the invention, in the third aspect, the locking piece of the retainer is open at a tip end in an inserting direction. The locking piece includes a notch having an approximately semi-circular shape, the notch capable of receiving the one of the pipes. The engaging piece of the stopper is positioned at an opening portion of the tip end of the locking piece.

In the fourth aspect, when the retainer is inserted into the housing, the semi-circular notch of the locking piece abuts against the one of the pipes broadly along the outer periphery and engages with the annular protruding portion in a wide region, which makes it possible to enhance a disengagement preventing force. Also, it is possible to provide the engaging piece used to return the stopper to the initial position when the one of the pipes is pulled out at a position to avoid interference with the locking piece.

According to a fifth aspect of the invention, in any one of the first to fourth aspects, the stopper has a pair of protruding pieces oppositely extending in a direction perpendicular to an inserting direction of the retainer. The protruding pieces protrude through side opening portions formed on sidewalls of the housing. The retainer is assembled to the housing so that sidewalls of the retainer cover the sidewalls of the housing. The sidewalls of the retainer includes insertion restricting portions, which engage with protruding portions of the protruding pieces when the stopper is located at the initial position of the stopper.

In the fifth aspect, because the insertion restricting portions on the respective sidewalls of the retainer engage with the protruding pieces of the stopper when the stopper is at the initial position, even when the operator tries to push in the retainer in this state, it never happens that the retainer is inclined to release the engagement. It is thus possible to restrict the insertion of the retainer in a reliable manner.

According to a sixth aspect of the invention, in any one of the first to fifth aspects, the retainer includes a pillar-shaped protrusion on an inner periphery of a top wall thereof, the pillar-shaped protrusion extending in parallel to the locking piece through a second upper opening portion of the housing and disposed at a position shifted toward the opening portion of the housing with respect to the locking piece. A lower end of the pillar-shaped protrusion abuts against the outer periphery of the one of the pipes when the one of the pipes is fully inserted and the locking piece of the retainer is fully inserted. The lower end of the pillar-shaped protrusion abuts against the annular protruding portion of one of the pipes, when the one of the pipes is inserted halfway and not fully inserted.

In the sixth aspect, in the event that the stopper has moved to the push-in position before the one of the pipes is introduced and connected, even when the operator tries to insert the retainer, the pillar-shaped protrusion abuts against the annular protruding portion of the one of the pipes and the retainer cannot be fully inserted into the housing unless the one of the pipes is fully introduced inside, based on which the operator can confirm that connection is not completed.

According to a seventh aspect of the invention, in the sixth aspect, a clearance between the pillar-shaped protrusion and the locking piece is less than a thickness of the annular protruding portion of the one of the pipes.

In the seventh aspect, even in a case where the operator tries to insert the retainer while the annular protruding portion of the one of the pipes is positioned between the pillar-shaped protrusion and the locking piece, because the clearance between the pillar-shaped protrusion and the locking piece is less than the thickness of the annular protruding portion, the pillar-shaped protrusion abuts against the annular protruding portion and thereby inhibits the retainer from being inserted. By placing the pillar-shaped protrusion away from the locking piece, deterioration in strength of the housing can be prevented by making the area of the opening portion of the housing as small as possible.

According to an eighth aspect of the invention, in any one of the first to seventh aspects, the retainer includes a through-hole in a top wall thereof. A protruding piece is formed on one of the housing and the stopper, and protrudes through the through-hole when the retainer is moved to the insert position.

In the eighth aspect, when connection is completed by fully introducing the one of the pipes inside and inserting the retainer, the protruding piece protrudes through the through-hole and can be visually observed from the outside, or the protruding state can be confirmed through the touch by hand, which makes it easier to confirm the completion of connection.

According to a ninth aspect of the invention, in any one of the first to eighth aspects, the housing includes a notch in a top wall thereof at an edge on a side of the opening portion through which the one of the pipes is inserted. The retainer includes, on an inner periphery of a top wall thereof, a protruding portion, which is inserted into the notch portion and extends inside the housing, and abuts against the annular protruding portion of the one of the pipes to restrict insertion of the retainer when the one of the pipes is not fully inserted.

In the ninth aspect, because the length in the axial direction of the protruding portion provided to the inner periphery of the top wall of the retainer can be secured from the opening portion of the housing, it can be arranged in such a manner that the protruding portion of the retainer starts to interfere with the annular protruding portion of the one of the pipes immediately after it is introduced inside through the opening portion of the housing. This makes it possible to restrict insertion of the retainer in a reliable manner while the one of the pipes is not fully introduced inside.

According to a tenth aspect of the invention, in the second aspect, the locking piece of the retainer includes a stopping portion, which engages with an inner edge portion of the upper opening portion after the locking piece is inserted into the upper opening portion formed in the top wall of the housing, to prevent the locking piece from disengaging therefrom.

In the tenth aspect, the disengagement preventing structure of the retainer can be made simpler, and the disengagement preventing function can be further ensured.

According to an eleventh aspect of the invention, in any one of the first to tenth aspects, the connector with check function further includes a cap inserted into the housing while the retainer is located at the initial position, to restrict movement of the retainer to the insert position.

In the eleventh aspect, by introducing the cap into the housing, it is possible to prevent the retainer from moving to the insert position during delivery or the like, and the connector can be used immediately for piping connection by merely removing the cap on site. Also, by inserting the cap into the opening portion of the housing, entrance of dust or the like into the housing can be prevented.

According to a twelfth aspect of the invention, in any one of the first to eleventh aspects, a covering wall is formed in approximately parallel to sidewalls of the housing. Clearance large enough for sidewalls of the retainer to be inserted is formed between the side walls of the housing and the cover wall. When the retainer is moved to the insert position, the sidewalls of the retainer are covered with the covering wall.

In the twelfth aspect, the respective sidewalls of the retainer are covered with the covering walls of the housing in a state where connection is completed by fully introducing the one of the pipes into the housing and by moving the retainer to the insert position. Hence, should a third party try to pull the retainer upward mischievously, he cannot hold the respective sidewalls of the retainer, and as a consequence, such a mischievous conduct can be prevented.

According to a thirteenth aspect of the invention, in any one of the first to eleventh aspects, the connector with check function further includes a covering member, which is assembled to the housing with the retainer having moved to the insert position, to cover sidewalls of the retainer.

In the thirteenth aspect, the respective sidewalls of the retainer are covered with the covering member by assembling the covering member to the housing in a state where the connection is completed by fully introducing the one of the pipes into the housing and by moving the retainer to the insert position. Hence, should a third party try to pull the retainer upward mischievously, he cannot hold the respective sidewalls of the retainer, and as a consequence, such a mischievous conduct can be prevented.

According to a fourteenth aspect of the invention, in anyone of the first to thirteenth aspects, the housing includes a flange portion against which an edge of the retainer in a direction moving away from the opening portion of the housing abuts. The flange portion includes a notch portion on a top wall of the housing. A tool is insertable into a space between the housing and the retainer through the notch portion with the retainer having moved to the insert position.

In the fourteenth aspect, the retainer and the housing can be assembled without any rattle through the use of the flange portion with the retainer having moved to the insert position. Also, in a case where piping connection needs to be released, the retainer can be pulled upward readily by inserting a tool through the notch portion formed in the flange portion.

BRIEF DESCRIPTION OF THE DRAWINGS

FIG. 17(a) is a bottom view, FIG. 17(b) is a plan view, FIG. 17(c) is a side view, and FIG. 17(d) is a front view, showing a housing of the connector with check function.

FIG. 19(a) is a plan view, FIG. 19(b) is a front view, FIG. 19(c) is a bottom view, FIG. 19(d) is a rear view, FIG. 19(e) is a cross section taken along the line H-H of FIG. 19(b), and FIG. 19(f) is a cross section taken along the line I-I of FIG. 19(b), showing a stopper of the connector with check function.

FIG. 34(a) is a view showing a state before the stopper is inserted into the housing, FIG. 34(b) is a view showing a state where the stopper is introduced halfway through the housing, and FIG. 34(c) is a view showing a state where the stopper is fully inserted into the housing and the retainer is attached, used to explain a procedure of introducing the stopper into the housing of the connector with check function.

FIG. 46(a) is a bottom view, FIG. 46(b) is a plan view, FIG. 46(c) is a side view, FIG. 46(d) is a front view, and FIG. 46(e) is a cross section taken along the line W'-W' of FIG. 46(b), showing the housing of the connector with check function.

DETAILED DESCRIPTION OF THE PREFERRED EMBODIMENTS

Figure 1:
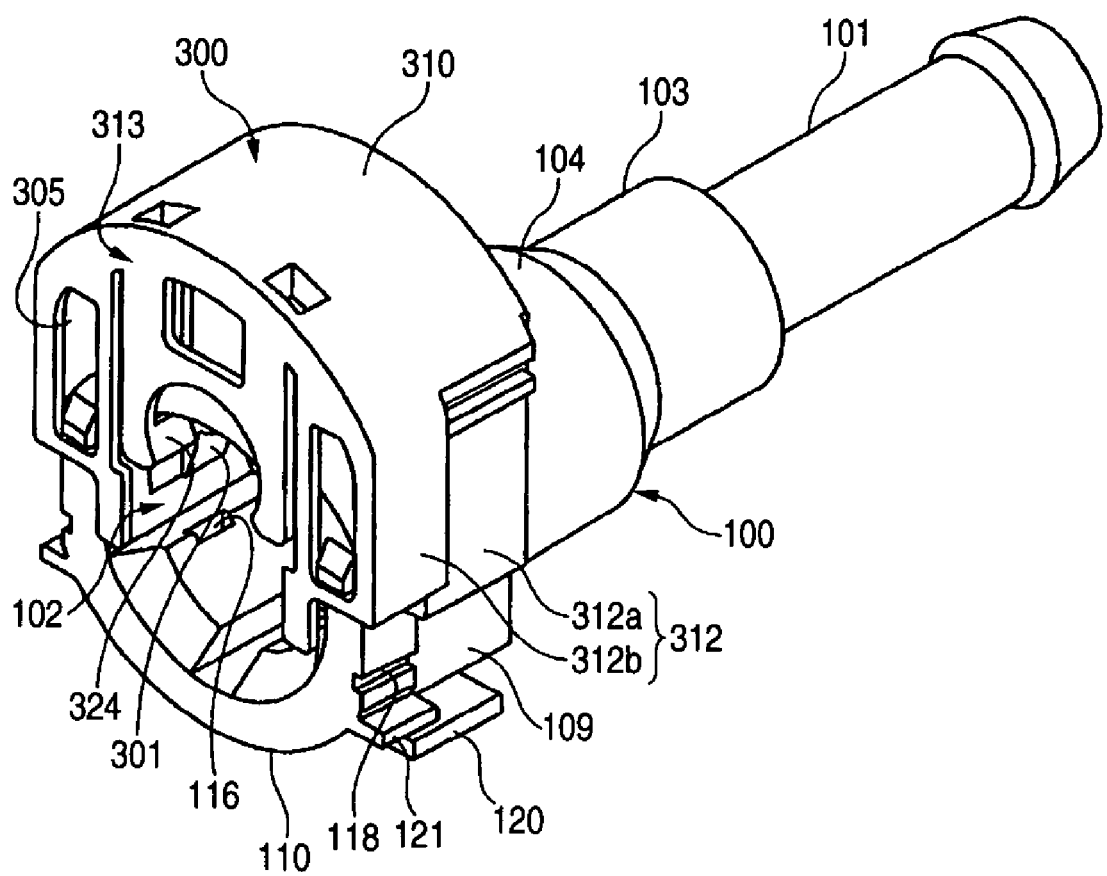
FIG. 1 is a perspective view showing a first embodiment of a connector with check function of the invention.

A first embodiment of the invention will now be explained with reference to FIGS. 1 through 15.

As shown in FIGS. 1, 2, 3, and 9, a connector with check function is used to connect a pair of pipes. One pipe 400 includes an annular protruding portion 401 on the outer periphery at the end portion thereof. The other pipe (not shown) to be connected, for example, a hose or a tube, is connected to a housing 100. Further, the connector with check function includes the housing 100, a stopper 200 disposed in the housing 100 in advance, and a retainer 300 assembled to the housing 100. The end portion of the pipe 400 to be connected is inserted into the housing 100, and then the retainer 300 is inserted into the housing 100. Accordingly, the retainer 300 engages with the annular protruding portion 401 so as not to disengage therefrom and the connection is completed.

Figure 4:
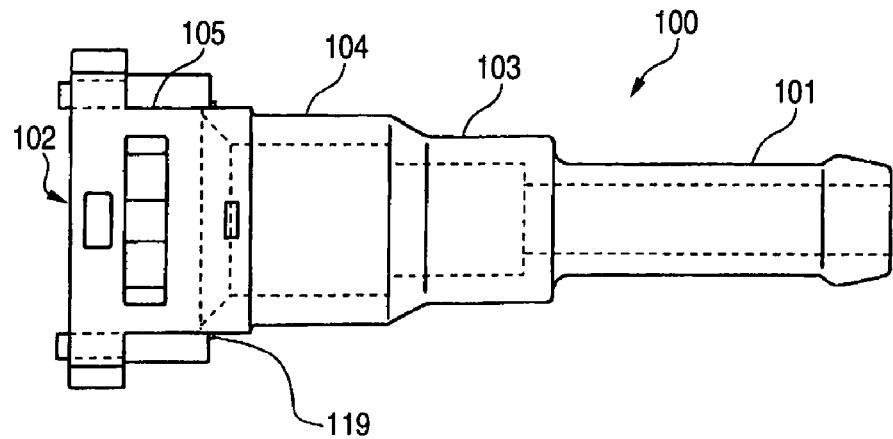
FIG. 4($a$) is a plan view, FIG. 4($b$) is a front view, and FIG. 4($c$) is a rear view, showing a housing of the connector with check function.
Figure 4:
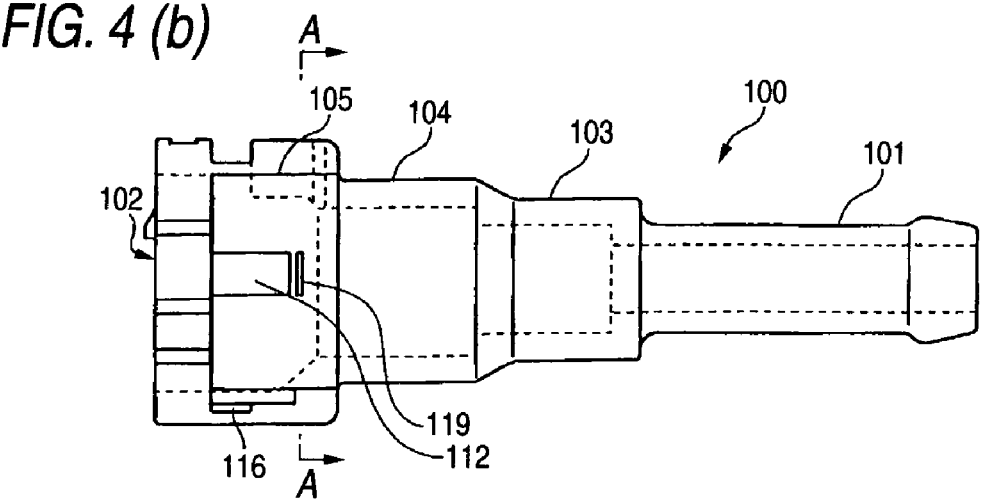
Figure 4:
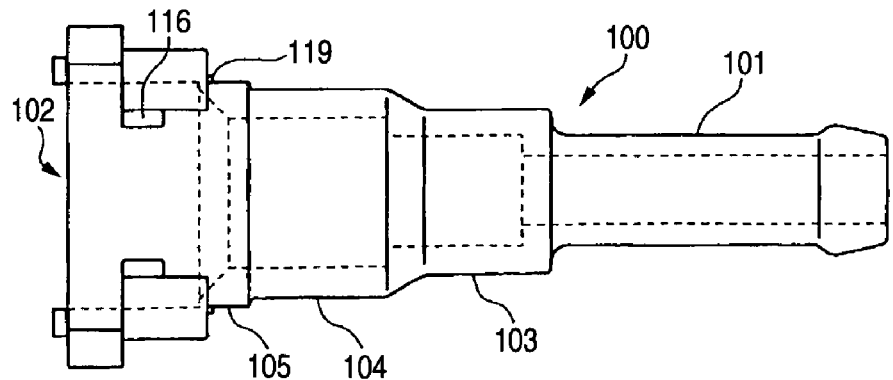
Figure 5:
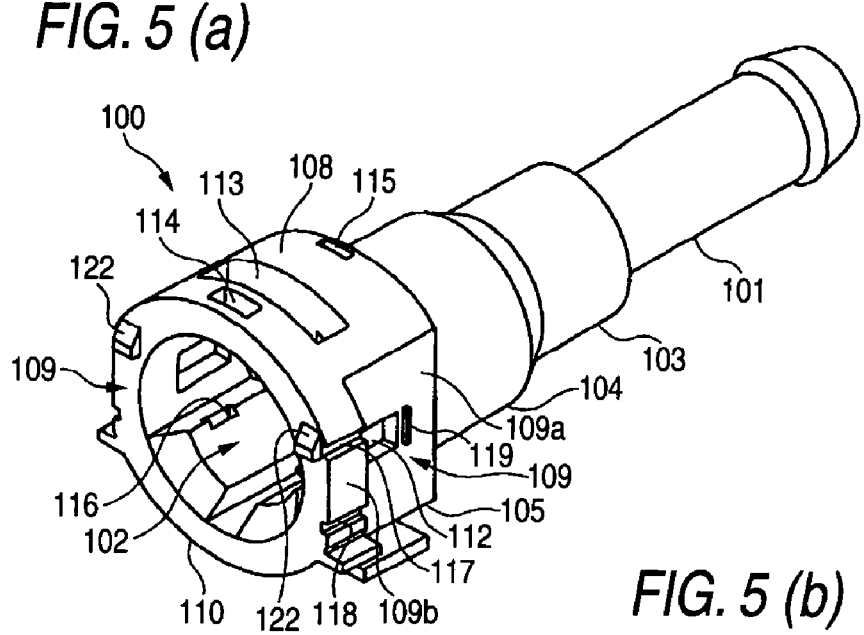
FIG. 5($a$) is a perspective view, FIG. 5($b$) is an end view, FIG. 5($c$) is a cross section taken along the line A-A of FIG. 4($b$), and FIG. 5($d$) is a partial front cross section, showing the housing of the connector with check function.
Figure 5:
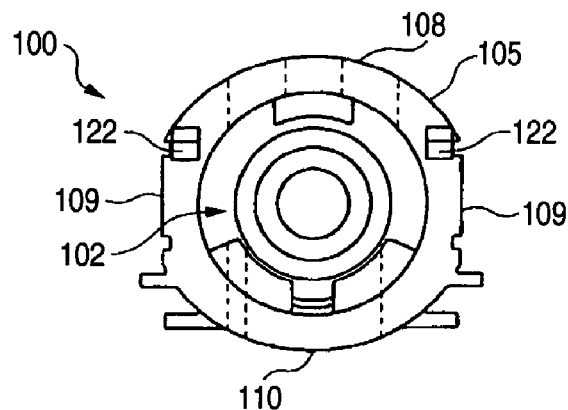
Figure 5:
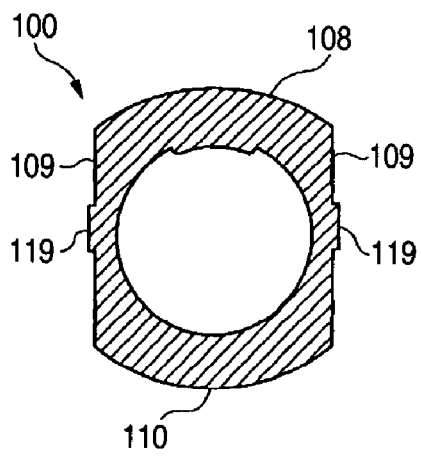
Figure 5:
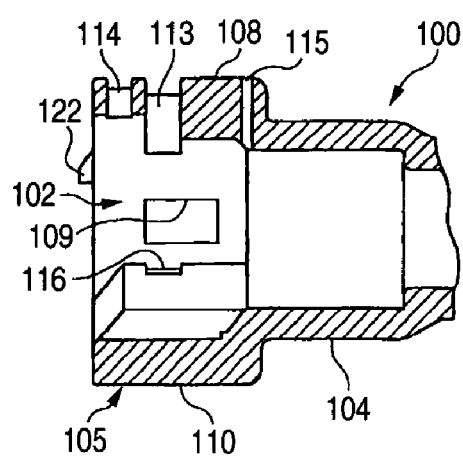

A structure of the housing 100 will now be explained with reference to FIGS. 4 and 5 together. The housing 100 includes, at one end, a nipple 101 to which the other pipe (not shown) to be connected, for example, a hose or a tube, is fitted from the outside and connected. The other end of the housing 100 forms an opening portion 102 through which the end portion of the pipe 400 to be connected is inserted thereinto.

Figure 9:
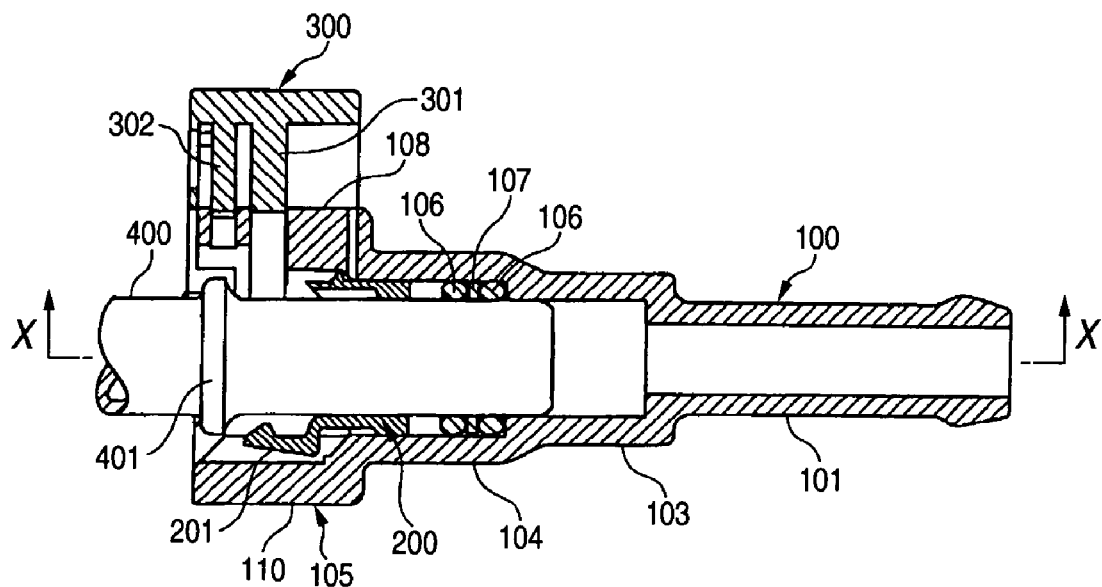
FIG. 9($a$) is a front cross section and FIG. 9($b$) is a cross section taken along the line X-X of FIG. 9($a$), showing a state where one pipe is slightly inserted into the housing when connecting pipes through the use of the connector with check function.
Figure 9:
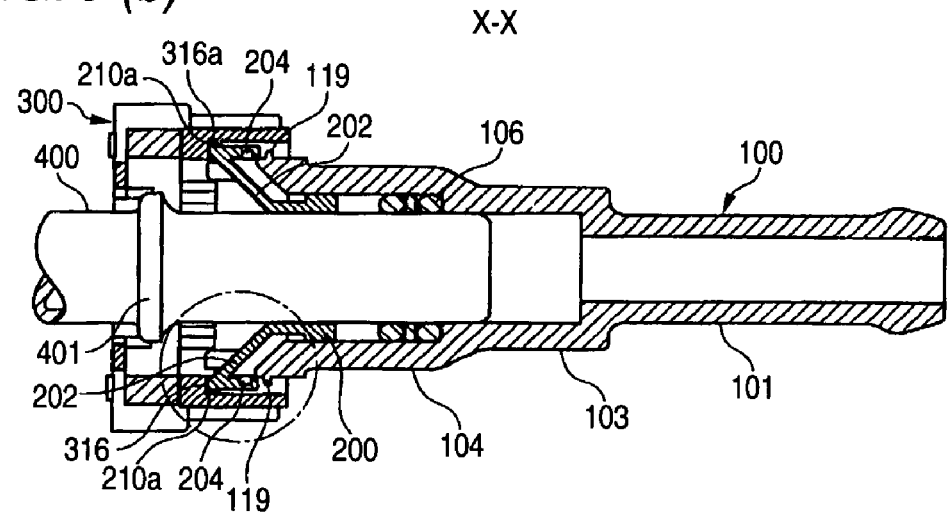
Figure 9:
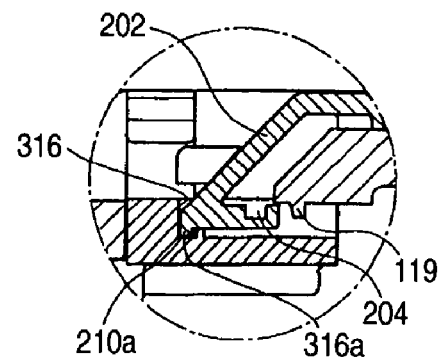

The outside diameters of the housing 100 are enlarged in three steps at a first diameter-enlarging portion 103, a second diameter-enlarging portion 104, and a third diameter-enlarging portion 105 as approaching from the nipple 101 to the opening portion 102. The inside diameter of the housing 100 is also enlarged step by step in accordance with the outside diameters. As shown in FIG. 9, the inside diameter of the first diameter-enlarging portion 103 is of a size that conforms to the end portion of the pipe 400 so that the pipe 400 can be inserted thereinto. The inside diameter of the second diameter-enlarging portion 104 is of a size that conforms to the tip end portion of the stopper 200 so that the stopper 200 can be inserted thereinto. Two seal rings 106 are placed on the inner periphery of the second diameter-enlarging portion 104 through an annular spacer 107.

Figure 2:
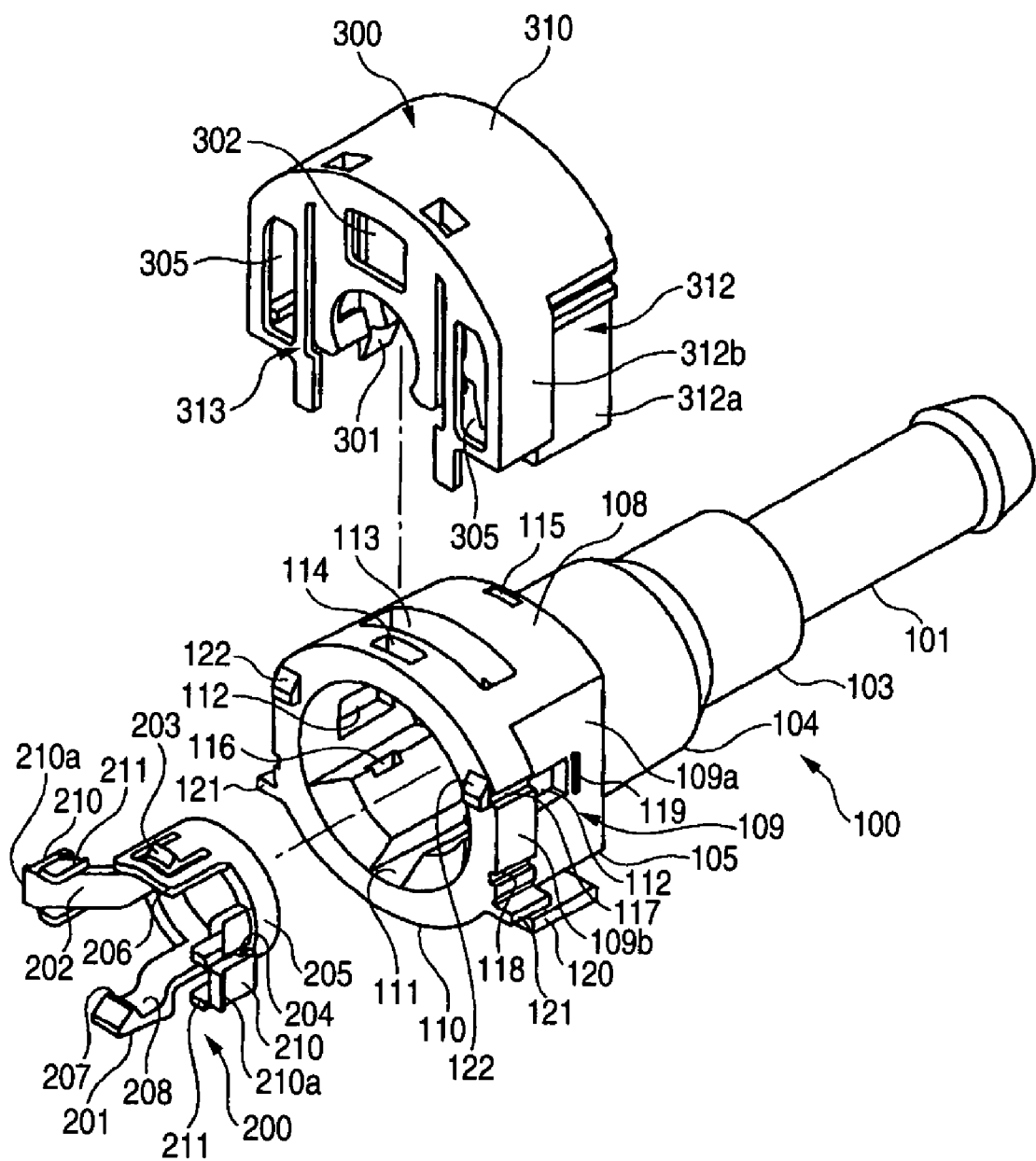
FIG. 2 is an exploded perspective view of the connector with check function.
Figure 3:
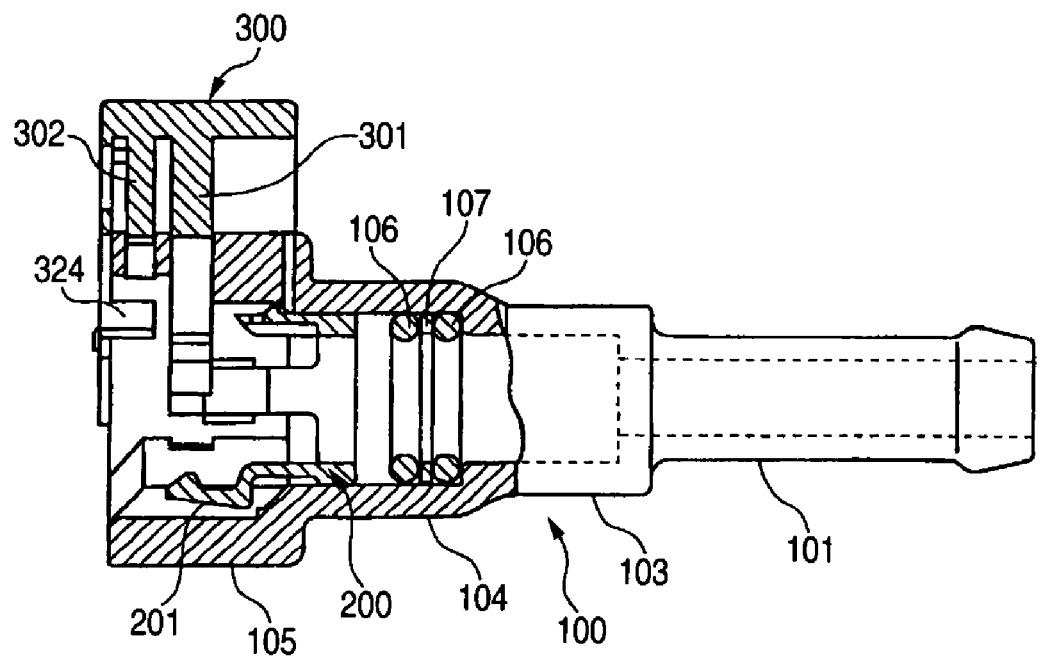
FIG. 3($a$) is a partially cutaway front cross section and FIG. 3($b$) is a partially cutaway plan cross section, showing the connector with check function.
Figure 3:
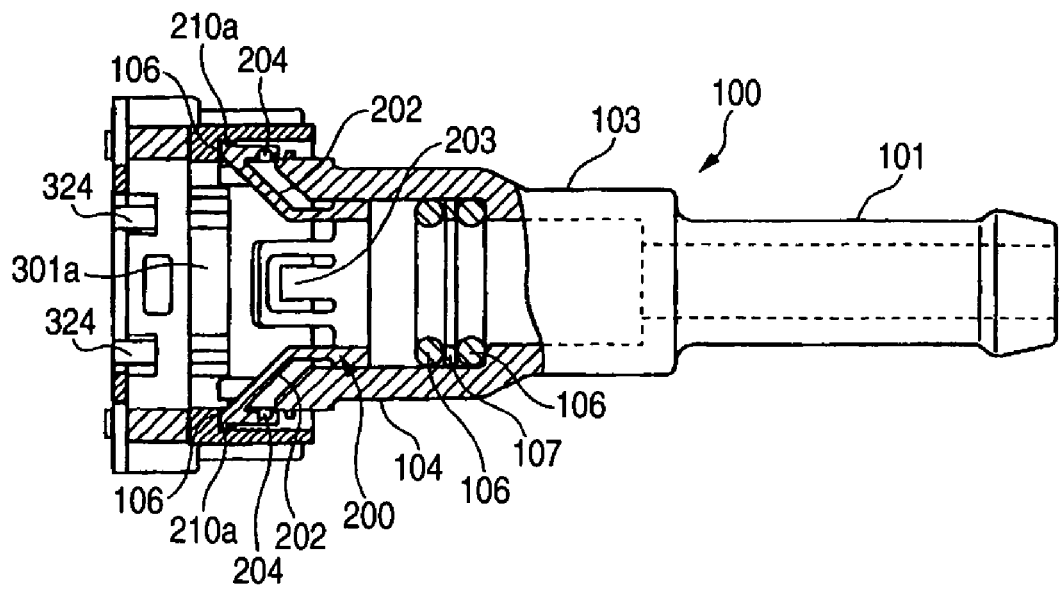

A top wall 108, two sidewalls 109, and a bottom wall 110 constitute the third diameter-enlarging portion 105. Referring to FIG. 2, a slot 111 is formed in the inner periphery of the bottom wall 110 in the axial direction, into which an engaging piece 201 of the stopper 200 is inserted. Also, stopping holes 116 are formed at slightly distant positions on the both sides of the slot 111, into which the tip ends of a locking piece 301 of the retainer 300 are inserted. Although only one stopping hole 116 is shown in FIG. 2, one stopping hole 116 is formed on each side of the slot 111.

The respective sidewalls 109 are provided with sidewall openings 112, into which a pair of protruding pieces 202 of the stopper 200 are fitted. The top wall 108 is provided with a top wall first opening 113 into which the locking piece 301 of the retainer 300 is inserted, a top wall second opening 114 into which a pillar-shaped protrusion 302 of the retainer 300 is inserted, and a top wall third opening 115 having a slit shape, with which an elastic claw 203 of the stopper 200 is engaged.

Figure 13:
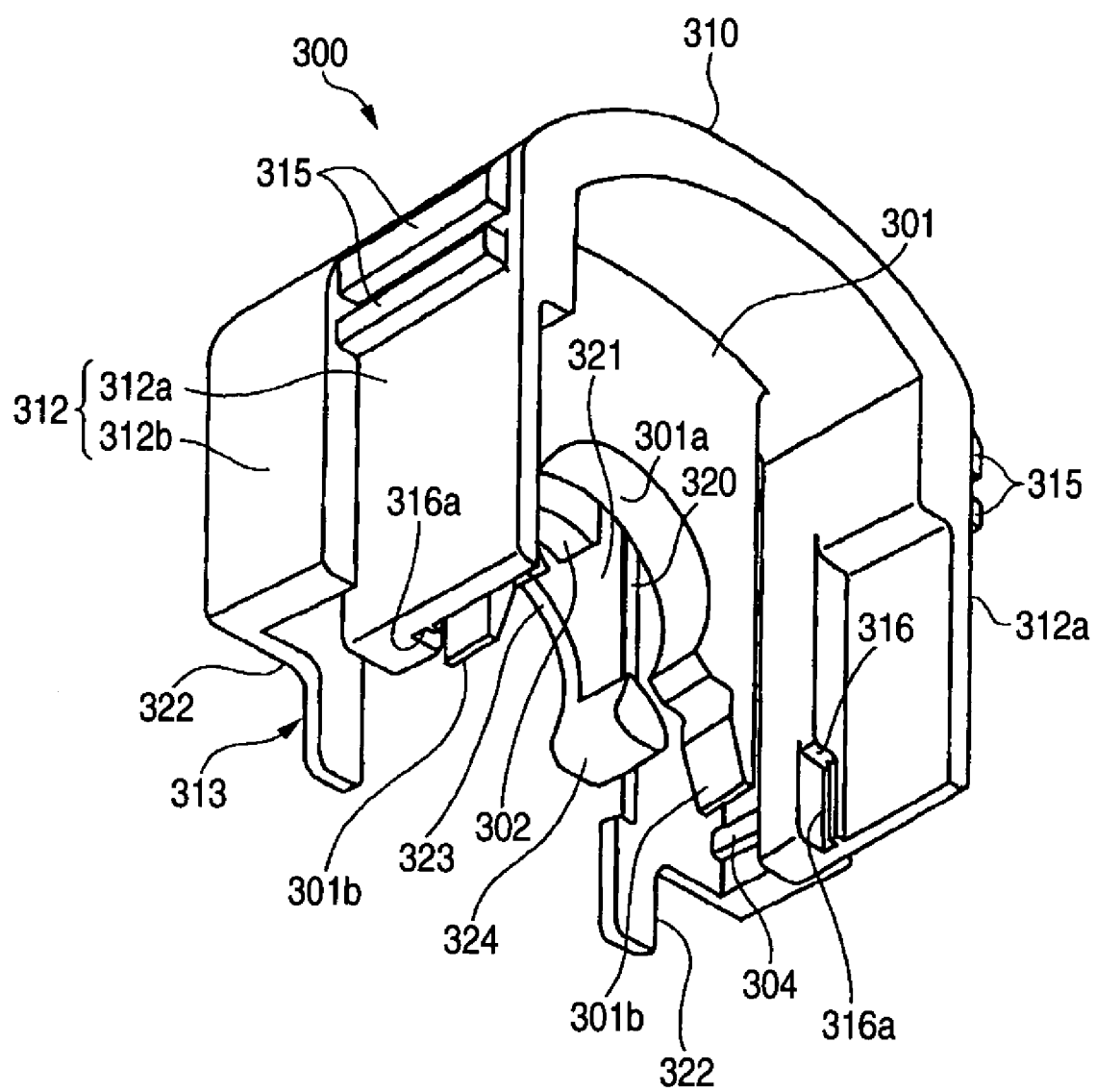
FIG. 13 is a perspective view showing a state of the retainer of the connector with check function when viewed from the inside.

Also, each sidewall 109 is provided with, on the outside, an upper sliding position holding slot 117 and a lower sliding position holding slot 118, with which a protrusion 304 (see FIG. 8(b) and FIG. 13) formed on the inner periphery of both sidewalls 312 of the retainer 300 at the lower end portion thereof. Further, a protruding strip 119 (see FIGS. 14 and 15 together) is formed at a slightly depart position in a pipe inserting direction with respect to the sidewall opening 112, and engages with an engaging slot 204 formed at the end portion of each protruding piece 202 of the stopper 200.

Further, plate-shaped protectors 120 and 121 are formed at the boundary portion between each sidewall 109 and the bottom wall 110 to protrude in the horizontal direction to prevent the retainer 300 from disengaging when the retainer 300 is directly hit by a stepping stone or the like.

It should be noted that, of each sidewall 109, a wall portion, 109a provided with the sidewall opening 112 is narrowed in the width direction with respect to a wall portion 109b provided with the upper and lower sliding position holding slots 117 and 118, so that each is of a shape that readily guides the retainer 300 described below to slide. Also, two claws 122 that fit in slits 305 (see FIG. 2) of the retainer 300 described below are provided respectively on the right and left of the end surface of the opening portion 102 of the housing 100.

Figure 6:
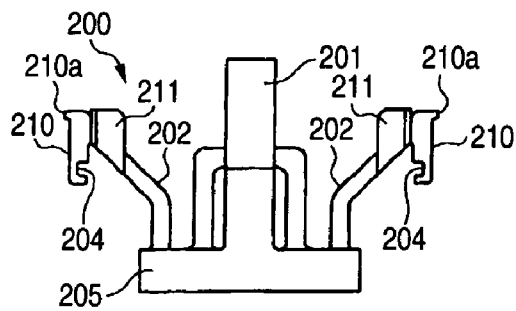
FIG. 6($a$) is a plan view, FIG. 6($b$) is a front view, FIG. 6($c$) is a bottom view, FIG. 6($d$) is a rear view, FIG. 6($e$) is a cross section taken along the line E-E of FIG. 6($b$), FIG. 6($f$) is a cross section taken along the line F-F of FIG. 6($b$), and FIG. 6($g$) is a perspective view, showing a stopper of the connector with check function.
Figure 6:
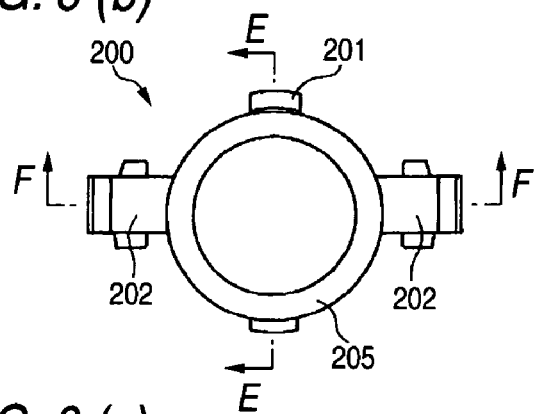
Figure 6:
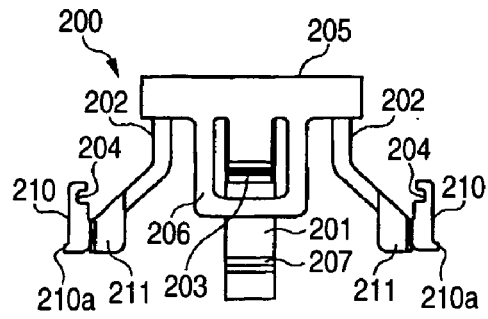
Figure 6:
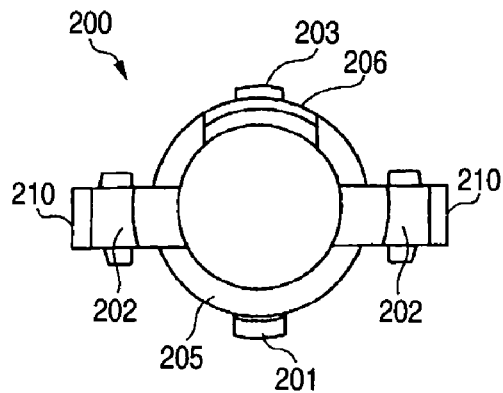
Figure 6:
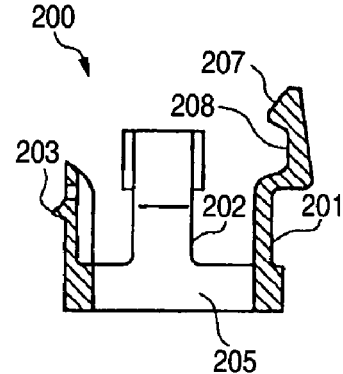
Figure 6:
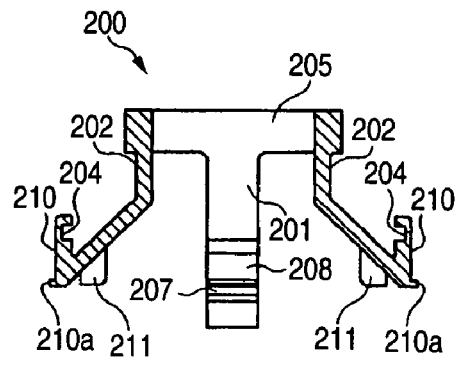
Figure 6:
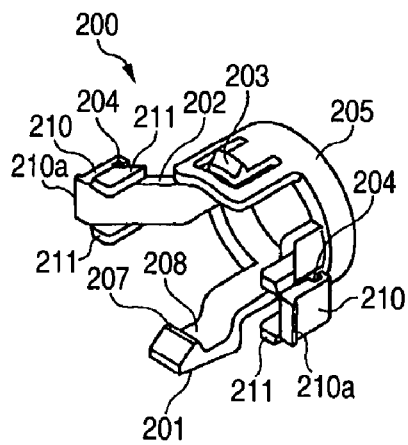
Figure 7:
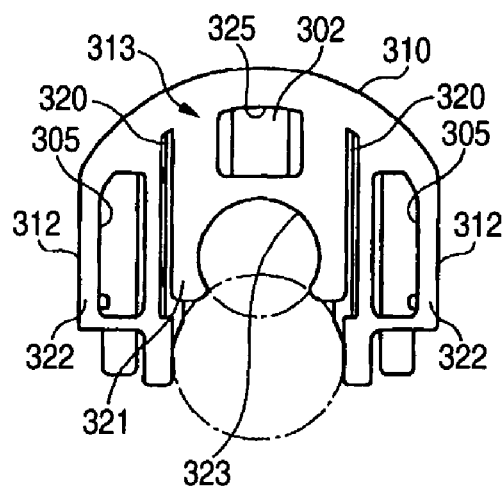
FIG. 7($a$) is a plan view, FIG. 7($b$) is a front view, FIG. 7($c$) is a bottom view, and FIG. 7($d$) is a left side view, showing a retainer of the connector with check function.
Figure 7:
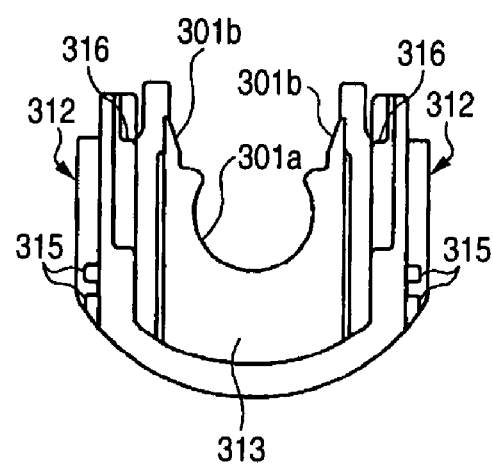
Figure 7:
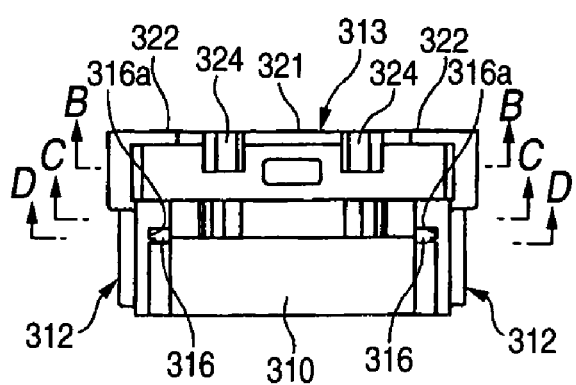
Figure 7:
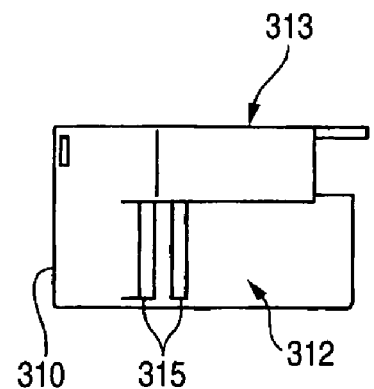
Figure 8:
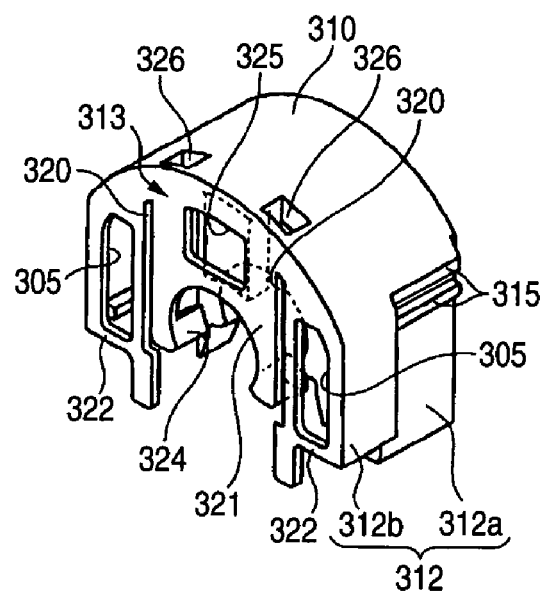
FIG. 8($a$) is a perspective view, FIG. 8($b$) is a cross section taken along the line B-B of FIG. 7($b$), FIG. 8($c$) is a cross section taken along the line C-C of FIG. 7($b$), and FIG. 8($d$) is a cross section taken along the line D-D of FIG. 7($b$), showing the retainer of the connector with check function.
Figure 8:
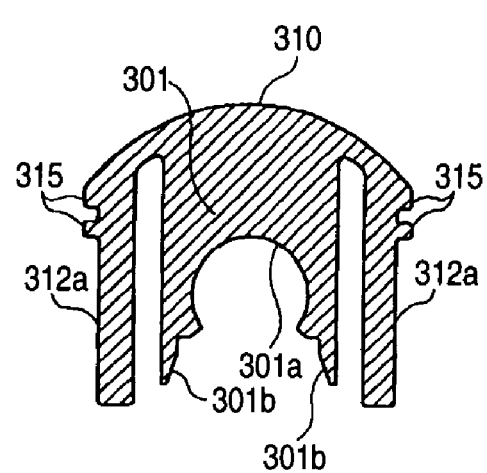
Figure 8:
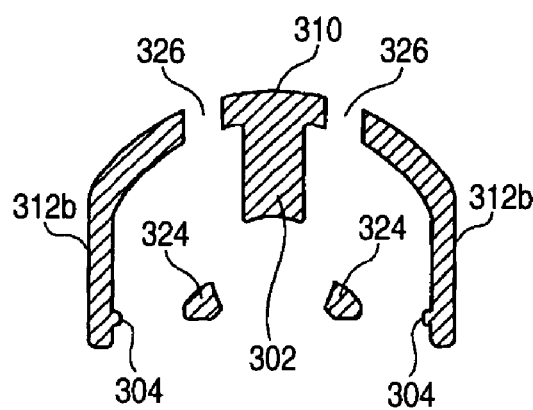
Figure 8:
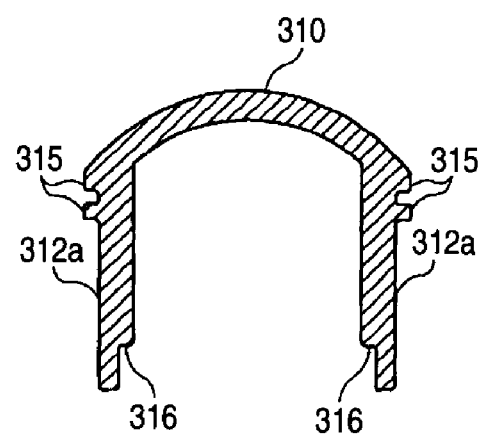

The stopper 200 inserted into and disposed in the housing 100 in advance will now be explained with reference to, in particular, FIGS. 2, 6, and 9. The stopper 200 includes an annular portion 205 that conforms to the inner periphery of the first diameter-enlarging portion 103 of the housing 100. The annular portion 205 also serves to prevent the seal rings 106 from disengaging.

The engaging piece 201 that elastically engages with the annular protruding portion 401 of the pipe 400 and the pair of protruding pieces 202 protruding through the sidewall openings 112 in the respective sidewalls 109 of the housing 100 extend from the annular portion 205 toward the opening portion 102 of the housing 100.

Further, a tongue piece 206 extends also from the annular portion 205 toward the opening portion 102 of the housing 100. The tongue piece 206 is formed at an opposite position to the engaging piece 201. The elastic claw 203 is defined by providing a U-shaped slit in the rim of the tongue piece 206. The elastic claw 203 engages with the inner periphery of the top wall third opening 115 of the housing 100 when the stopper 200 has moved to a push-in position.

The engaging piece 201 is extended from the annular portion 205 in the axial direction, then bent in the outer diameter direction, and extended again in the axial direction. An engaging claw 207 is formed at the tip end of the engaging piece 201. A portion before the engaging claw 207 forms a concave portion 208 provided between the engaging claw 207 and the bending portion. Thus, it is arranged in such a manner that when the pipe 400 is inserted through the opening portion 102 of the housing 100, the annular protruding portion 401 abuts against the engaging claw 207 to press and expand the engaging piece 201. When the annular protruding portion 401 surmounts the engaging claw 207, the annular protruding portion 401 engages with the concave portion 208.

The pair of protruding pieces 202 extended from the annular portions 205 extend in the axial direction by a certain distance and then extend diagonally toward the respective sidewalls 109 of the housing 100. The top ends of the protruding pieces 202 are folded backward to form plate-shaped portions 210 that respectively fit into the sidewall openings 112 of the housing 100. Also, each of the protruding pieces 202 includes a guide plate 211, which abuts against the inner periphery of the corresponding sidewall opening 112, on the side closer to the base portion than the plate-shaped portion 210, so that the guide plate 211 guides the plate-shaped portion 210 to slide in the axial direction while being fit into the sidewall opening 112.

A protrusion 210a protruding in the outer diameter direction is provided to the plate-shaped portion 210 at the end portion closer to the opening portion 102. The protrusion 210a engages with the retainer 300 described below at the initial position, and the structure thereof will be described below. Also, the engaging slot 204 that engages with the protruding strip 119 formed on each sidewall 109 of the housing 100 is provided to the plate-shaped portion 210 on the inner side of the end portion in a direction away from the opening portion 102.

The stopper 200 is attached inside the housing 100 in advance with the annular portion 205 being inserted into the inner periphery of the first diameter-enlarging portion 103 of the housing 100, the engaging piece 201 being inserted into the slot 111 in the bottom wall 110 of the housing 100, and the plate-shaped portions 210 of the protruding pieces 202 being fitted to the sidewall openings 112 of the housing 100 from inside.

The retainer 300 will now be explained with reference to, in particular, FIGS. 1, 2, 7, 8, 9, and 13. The retainer 300 includes a top wall 310, both sidewalls 312, and a front wall 313.

The top wall 310 is of a curved shape with a curved surface that conforms to the top wall 108 of the housing 100. The locking piece 301 to be inserted into the top wall first opening 113 of the housing 100 is extended from the center of the inner periphery thereof. As shown in FIG. 8(c), the locking piece 301 is extended in the shape of a plate to be slightly spaced apart from two wall portions 312a, and includes a notch portion 301a cut out in a semi-circular shape at the lower edge portion. The notch portion 301a is formed to have an inner diameter that conforms to the outer periphery of the pipe 400, and to shape an arc slightly longer than a semi-circle, and more preferably, the notch portion 301a is formed in such a manner that the inner periphery length runs an angle of 100 to 120 degrees about the center. This configuration allows the locking piece 301 to fit to the pipe 400 with a clicking response and to engage with the annular protruding portion 401 in a range as wide as possible.

Also, each of two side-end portions 301b of the locking piece 301 in the protruding direction forms a fine diameter portion opened outward, and the tip end thereof further forms a protruding shape. By forming the respective side-end portions 301b as the fine diameter portions opened outward, the pipe 400 can be readily introduced. Also, the tip ends of the respective side-end portions 301b are inserted respectively into the stopping holes 116 in the bottom wall 110 of the housing 100 when the locking piece 301 is inserted, and the respective side-end portions 301b thereby support the locking piece 301 at both the top and the bottom, which enhances an engagement force with respect to the annular protruding portion 401 of the pipe 400.

Also, the pillar-shaped protrusion 302 is disposed on the inner wall of the top wall 310 of the retainer 300 on the opening portion 102 side of the housing 100 with respect to the locking piece 301. Distance between the pillar-shaped protrusion 302 and the locking piece 301 is smaller than the thickness of the annular protruding portion 401. The pillar-shaped protrusion 302 is inserted into the housing 100 through the top wall second opening 114 of the housing 100, and the protruding end portion thereof is arranged so as to abut against the outer periphery of the pipe 400 while the retainer 300 is fully inserted.

Each sidewall 312 of the retainer 300 includes a recessed wall portion 312a that abuts against the wall portion 109a of the corresponding sidewall 109 of the housing 100, and a protruding wall portion 312b that abuts against the wall portion 109b of the corresponding sidewall 109 of the housing 100.

Each wall portion 312a is provided with an anti-slipping protrusion 315 to be used as a hook when the retainer 300 is held between fingers. A step portion 316 (see FIG. 13), which engages with the protrusion 210a (see FIGS. 2 and 6) of the corresponding plate-shaped portion 210 of the stopper 200, is formed at the inner lower edge portion of the wall portion 312a. In other words, when the stopper 200 is at the initial position, the step portions 316 of the retainer 300 engage with the protrusions 210a of the stopper 200, so that the retainer 300 cannot be pushed in (see FIGS. 9 and 10). The protrusions 210a of the stopper 200 and the step portions 316 of the retainer 300 together form an insertion restricting portion of the invention.

In addition, a stopping slot 316a (see FIG. 7(b) and FIG. 13) is formed in each step portion 316 on the wall portion 312a side. Hence, it is arranged in such a manner that when the stopper 200 is positioned at the initial position, the protrusions 210a of the stopper 200 engage with the stopping slots 316a and thereby hold the stopper 200 at the initial position.

Further, each wall portion 312b is provided with, in the inner lower edge portion, the protrusion 304 that engages with the upper and lower sliding position holding slots 117 and 118 formed in the wall portion 109b of the corresponding sidewall 109 of the housing 100 in a detachable manner (see FIG. 8(b)). According to this arrangement, the protrusions 304 engage with the upper sliding position holding slots 117 when the retainer 300 is pulled upward. On the other hand, the protrusions 304 engage with the lower sliding position holding slots 118 when the retainer 300 is inserted.

The front wall 313 of the retainer 300 is formed of a wall extended from the top wall 310 in a thin-plate shape, so that the front wall 313 can cover the end surface of the opening portion 102 of the housing 100. The front wall 313 is divided into a central plate portion 321 and two side plate portions 322 by a pair of slits 320 on the right and left.

Each side plate portion 322 is provided with a slit 305 into which fits the corresponding claw 122 formed on the end surface of the opening portion 102 of the housing 100. The claw 122 fits into the slit 305 slidably in a vertical direction by a certain distance, and thereby guides the retainer 300 to slide.

An arc-shaped notch 323 that abuts against the outer periphery of the pipe 400 is formed at the lower edge portion of the central plate portion 321. Further, a pair of pillar-shaped protrusions 324 extending toward the interior of the housing 100 is provided respectively to the tip end portions of the central plate portion 321 on the both sides (see FIGS. 8(a) and 8(b) and FIG. 13). The inner sides of the protrusions 324 and the lower end of the pillar-shaped protrusion 302 are disposed to surround the outer periphery of the pipe 400. The retainer 300 cannot be fully inserted when the pipe 400 is not fully inserted and the annular protruding portion 401 is present below the protrusions 324 and the pillar-shaped protrusion 302.

Herein, the locking piece 301 is inserted into the top wall first opening 113 of the housing 100, and the pillar-shaped protrusion 302 is inserted into the top wall second opening 114. Then, the wall portions 312a of the sidewalls 312 are placed along the wall portions 109a of the sidewalls 109 of the housing 100, and the wall portions 312b of the sidewalls 312 are placed along the wall portions 109b of the sidewalls 109 of the housing 100. Further, the central plate portion 321 of the front wall 313 is lifted up elastically, so that the protrusions 324 are inserted into the opening portions 102 of the housing 100, and subsequently the front wall 313 is placed in front of the opening portion 102 of the housing 100. The retainer 300 is thus assembled to the housing 100.

A pair of openings 326 in the top wall 310 and an opening 325 in the central plate portion 321 are holes for use in die-cutting during molding.

An operation of the connector with check function will now be explained.

The nipple 101 of the housing 100 is coupled to the other pipe to be connected, such as not-shown hose and tube. Then, the end portion of the pipe 400 to be connected is inserted through the opening portion 102 of the housing 100. The pipe 400 may be connected to another not-shown hose or tube.

Initially, in a state before the pipe 400 is coupled to the housing 100, the retainer 300 is pulled upward with respect to the housing 100, so that the protrusions 304 of the retainer 300 engage with the upper sliding position holding slots 117 of the housing 100.

In this state, as shown in FIG. 9, the stopper 200 is positioned at the initial position, and the protrusions 210a of the protruding pieces 202 of the stopper 200 engage with the stopping slots 316a in the step portions 316 of the retainer 300, and thereby hold the stopper 200 at the initial position. Also, because the step portions 316 of the retainer 300 engage with the vicinities of the protrusions 210a of the protruding pieces 202 of the stopper 200, the retainer 300 cannot be inserted. Also, because the step portions 316 of the respective sidewalls 312 of the retainer 300 engage with the protruding pieces 202 of the stopper 200, the retainer 300 will not incline, which makes it possible to prevent the retainer 300 from being inserted in a reliable manner.

The tip end portion of the pipe 400 is inserted through the opening portion 102 of the housing 100, then penetrates through the annular portion 205 of the stopper 200, penetrates through the seal rings 106 and the spacer 107 placed on the inner periphery of the second diameter-enlarging portion 104, and is inserted into the inner periphery of the first diameter-enlarging portion 103.

Figure 10:
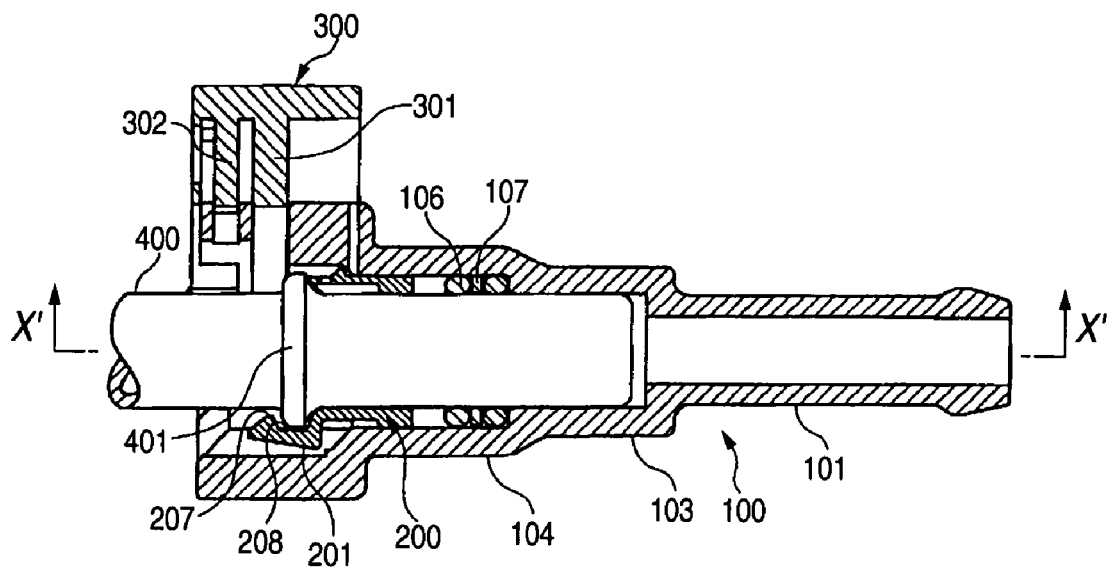
FIG. 10($a$) is a front cross section and FIG. 10($b$) is a cross section taken along the line X'-X' of FIG. 10($a$), showing a state where one pipe is further inserted into the housing when connecting pipes through the use of the connector with check function.
Figure 10:
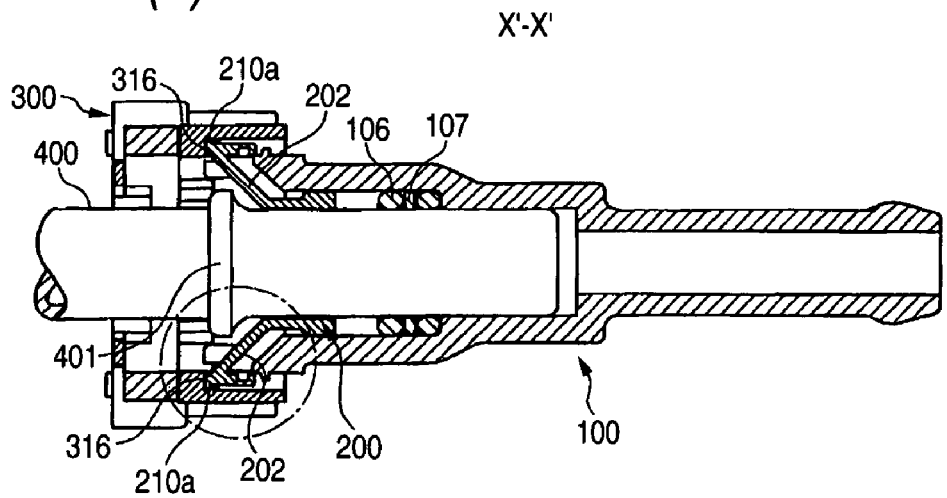
Figure 10:
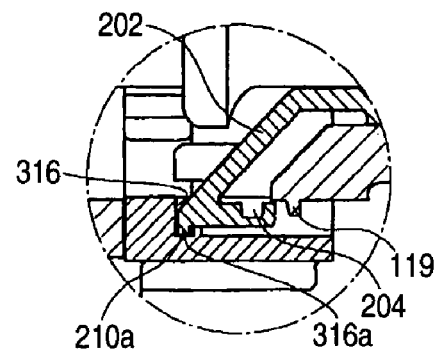
Figure 14:
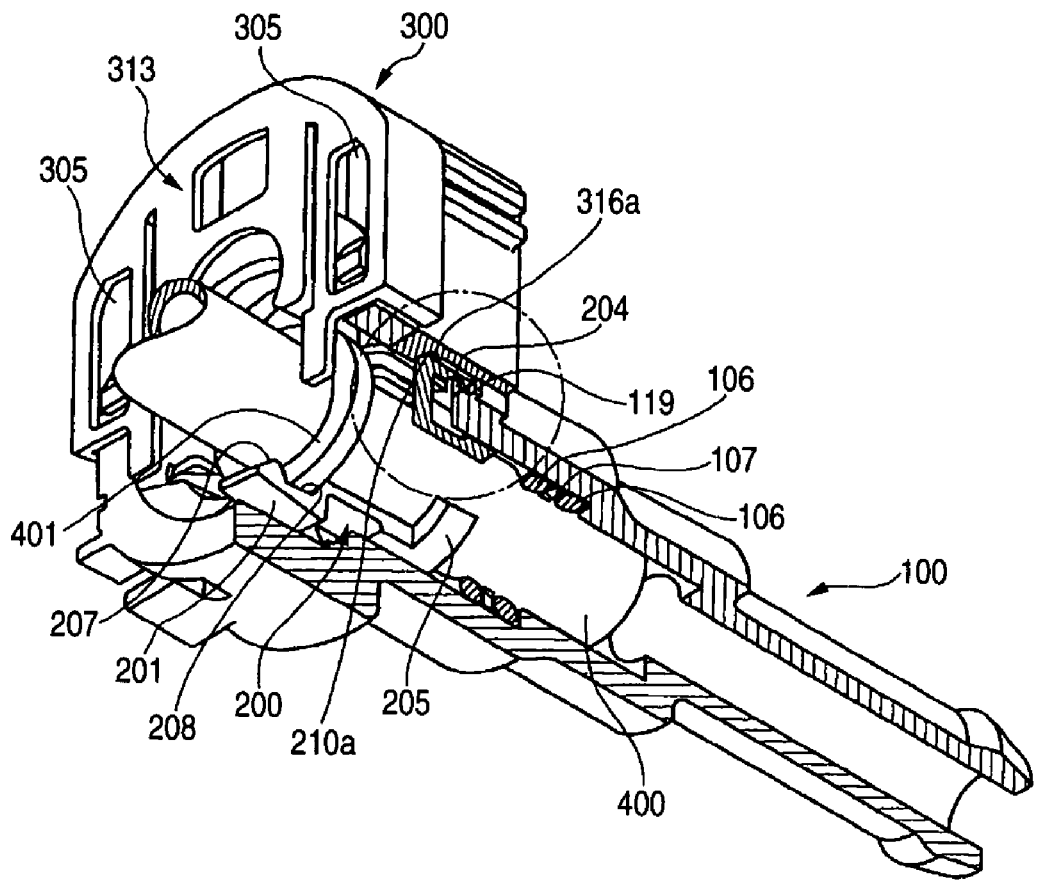
FIG. 14 is a partially cutaway perspective view showing a state where one pipe is inserted into the housing when connecting pipes through the use of the connector with check function.
Figure 14:
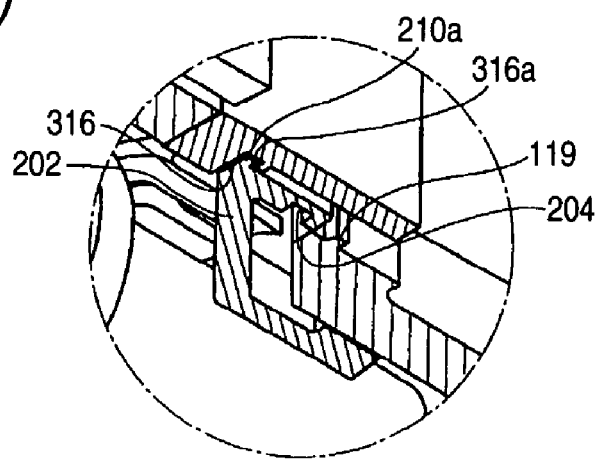

FIGS. 10 and 14 show a state while the pipe 400 is inserted halfway. When the pipe 400 is inserted, the annular protruding portion 401 abuts against the claw 207 of the engaging piece 201 of the stopper 200. In response, the engaging piece 201 elastically opens outward, and the annular protruding portion 401 surmounts the claw 207 and fits in the concave portion 208.

The annular protruding portion 401 abuts against the innermost wall of the concave portion 208 in this state, and engages with the stopper 200. For this reason, when the pipe 400 is inserted further, the engagement between the protrusions 210a of the protruding pieces 202 of the stopper 200 and the stopping slots 316a in the step portions 316 of the retainer 300 is released, whereupon the stopper 200 is pushed by the annular protruding portion 401 and starts to move in the inserting direction.

It should be noted, however, that because the step portions 316 of the retainer 300 still engage with the vicinities of the protrusions 210a of the protruding pieces 202 of the stopper 200 while the pipe 400 is inserted halfway, the retainer 300 cannot be inserted.

In the event that the stopper 200 moves and the protrusions 210a of the protrusions 202 disengages from the step portions 316 of the retainer 300, at least one of the locking piece 301, the pillar-shaped protrusion 302, and the protrusions 324 of the retainer 300 abuts against the annular protruding portion 401 of the pipe 400 when the operator tries to insert the retainer 300, which prevents the retainer 300 from being fully inserted. Hence, the operator can confirm that the retainer 300 is inserted incompletely through visual inspection from the outside, based on which he can know that the coupling is not completed.

Figure 11:
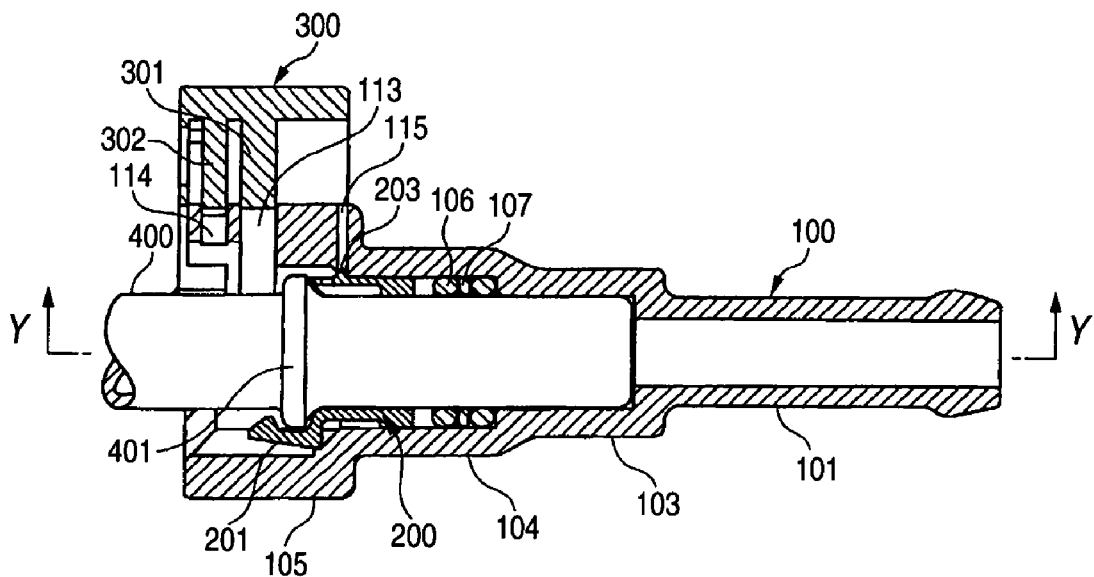
FIG. 11($a$) is a front cross section and FIG. 11($b$) is a cross section taken along the line Y-Y of FIG. 11($a$), showing a state where one pipe is fully inserted into the housing when connecting pipes through the use of the connector with check function.
Figure 11:
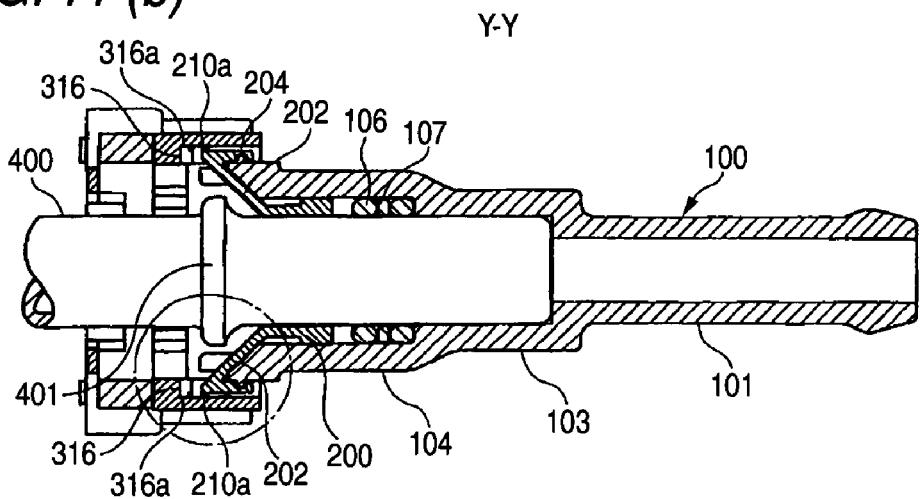
Figure 11:
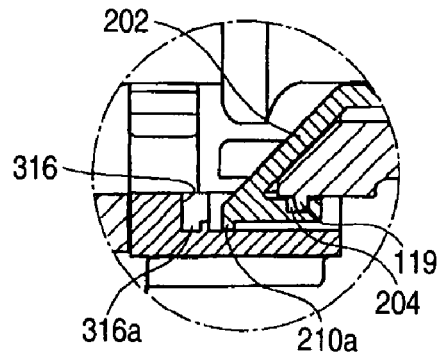

Then, as shown in FIG. 11, when the tip end portion of the pipe 400 is fully pushed until the pipe 400 reaches the inner end of the first diameter-enlarging portion 103, the stopper 200 moves to the push-in position, whereby the engaging slots 204 of the protruding pieces 202 of the stopper 200 engage with the protruding strips 119 formed on the respective side walls 109 of the housing 100, and the elastic claw 203 of the tongue piece 206 of the stopper 200 engages with the inner periphery of the top wall third opening 115 in the housing 100. Consequently, the stopper 200 is held at the push-in position.

In this state, the protrusions 210a of the protruding pieces 202 of the stopper 200 move away completely from the step portions 316 of the retainer 300, and the engagement between the vicinities of the protrusions 210a and the step portions 316 is thereby released. It is thus possible to depress and insert the retainer 300 into the housing 100.

Figure 12:
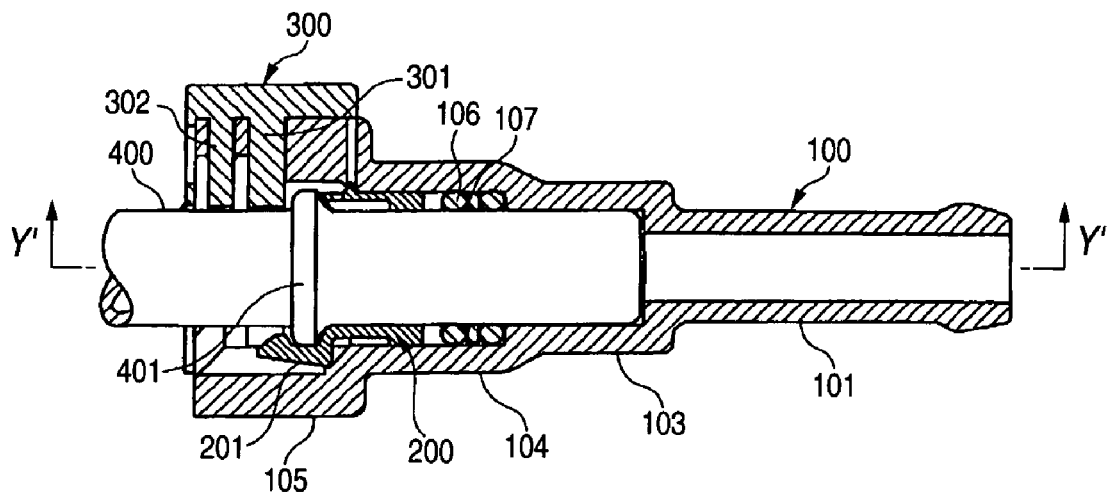
FIG. 12($a$) is a front cross section and FIG. 12($b$) is across section taken along the line Y'-Y' of FIG. 12($a$), showing a state where coupling is completed by inserting the retainer when connecting pipes through the use of the connector with check function.
Figure 12:
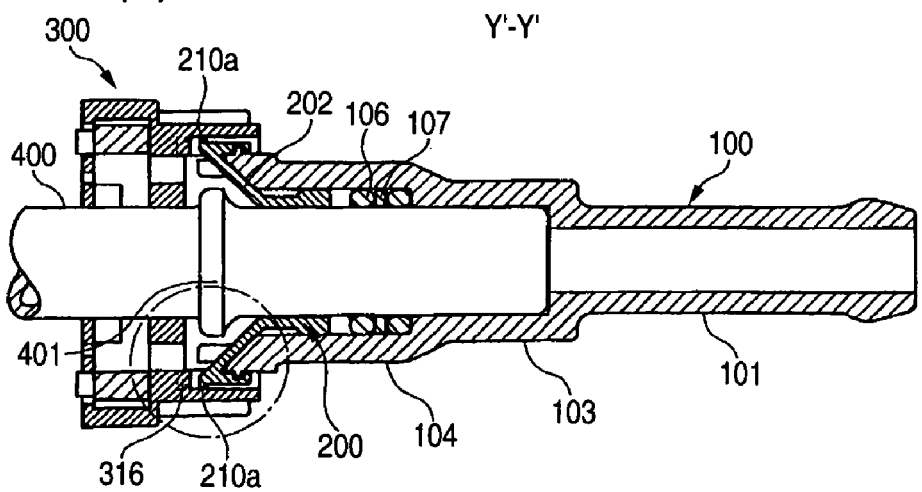
Figure 12:
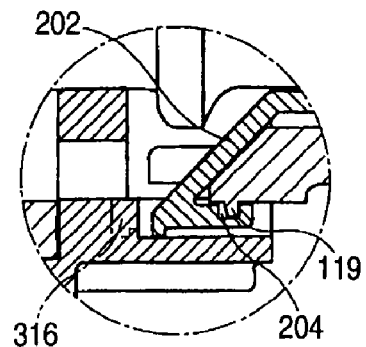
Figure 15:
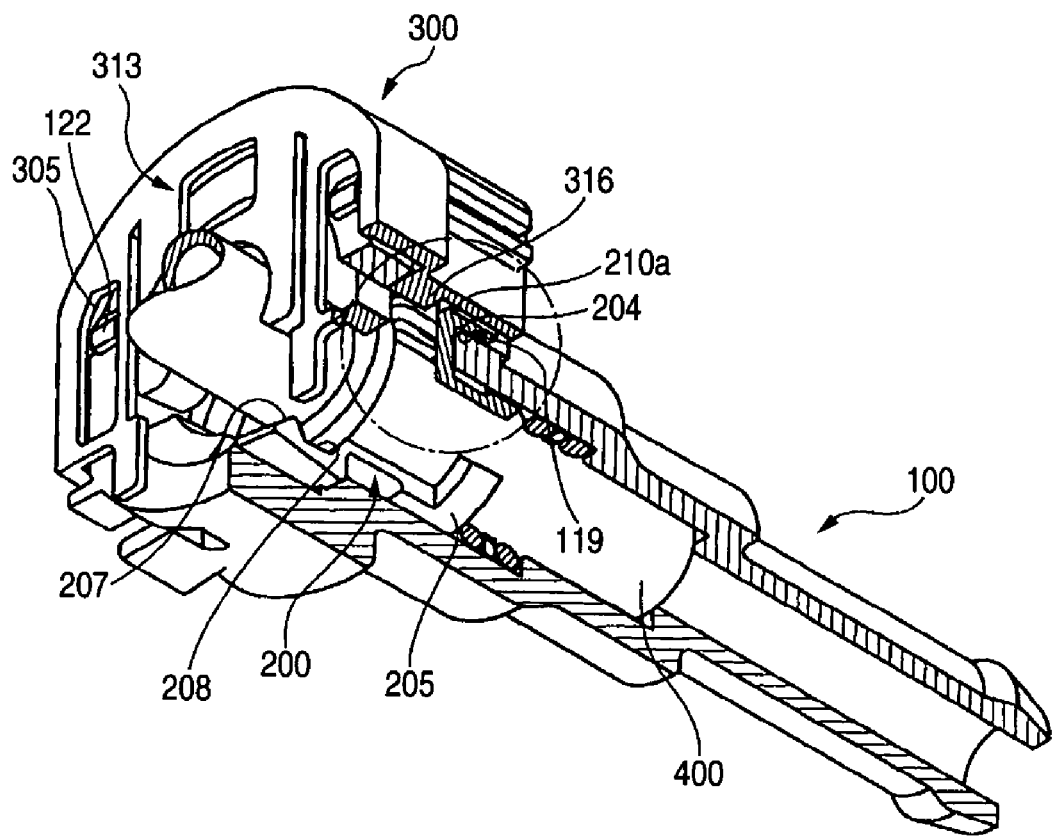
FIG. 15 is a partially cutaway perspective view showing a state where coupling is completed by inserting the retainer when connecting pipes through the use of the connector with check function.
Figure 15:
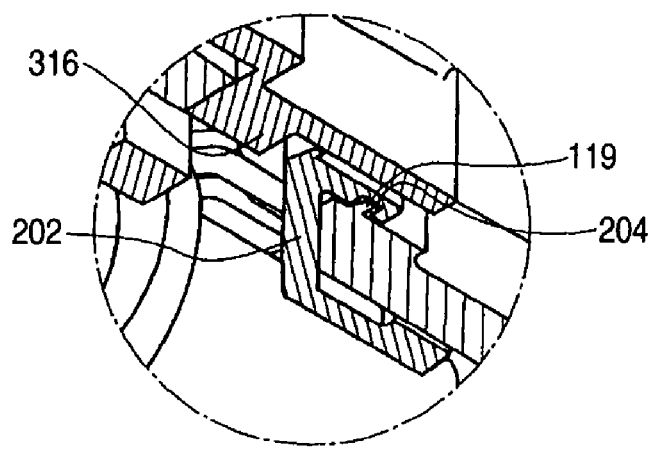

FIGS. 12 and 15 show a state where the retainer 300 is depressed in the state described above and fully inserted into the housing 100. In this state, the pipe 400 fits into the notch portion 301a of the locking piece 301 of the retainer 300 and the tip ends of the respective side-end portions 301b of the locking piece 301 are inserted into the stopping holes 116 in the bottom wall 110 of the housing 100, while the locking piece 301 is supported with its top end being coupled to the top wall 310 of the retainer 300 and its bottom end being coupled to the bottom wall 110 of the housing 100.

As a result, when the operator tries to pull out the pipe 400, the annular protruding portion 401 of the pipe 400 engages with the locking piece 301 to prevent the pipe 400 from disengaging therefrom. Also, the tip end portion of the pipe 400 is sealed hermetically with the inner wall of the housing 100 through the seal rings 106. In this manner, the pipe 400 can be coupled to a not-shown hose or tube connected to the housing 100 in a reliable manner.

As has been described, because the retainer 300 cannot be inserted unless the pipe 400 is fully inserted into the housing 100, the pipe 400 and the housing 100 remain coupled to each other while the retainer 300 is inserted, and the retainer 300 is never inserted when the coupling is incomplete. Hence, the operator can check the completion of coupling by merely observing whether the retainer 300 is fully inserted through visual inspection.

In a case where the coupled connector is removed and re-coupled, the insertion is released by pulling the retainer 300 upward from the housing 100, and the pipe 400 is pulled out in this state. Then, the stopper 200 moves toward the opening portion 102 of the housing 100 together with the pipe 400 through the engaging piece 201 that fits in the annular protruding portion 401 of the pipe 400, and returns to the initial state shown in FIG. 9.

Hence, at the time of re-coupling, the insertion of the retainer 300 is restricted by the stopper 200 in the same manner as described above, and the retainer 300 cannot be inserted unless the pipe 400 is fully inserted. It is thus possible to check defective coupling of the connector as described above through visual inspection from the outside.

In the event that the stopper 200 has moved to the push-in position for some reason and the retainer 300 is inserted, the end portion of the pipe 400 has to go through the notch 323 of the front wall 313 of the retainer 300 for being introduced inside. However, the annular protruding portion 401 of the pipe 400 is hooked by the notch 323, and therefore, the pipe 400 cannot be inserted and the annular protruding portion 401 remains on the outside, based on which the operator can know that the coupling is incomplete.

The above embodiment is arranged in such a manner that the annular protruding portion 401 of the pipe 400 engages with the locking piece 301 of the retainer 300 to prevent the pipe 400 from disengaging therefrom. However, it is possible to furnish the stopper 200 with a disengagement preventing function, so that the retainer 300 is provided only to confirm the completion of coupling by being inserted only when the pipe 400 is fully inserted. As to a structure of furnishing the stopper 200 itself with the disengagement preventing function, a locking structure used in a known quick connector maybe adopted, and for example, the structure disclosed in JP-A-2002-213671 can be employed.

A second embodiment of the invention will now be explained with reference to FIGS. 16 through 25. Substantially the same portions are labeled with the same reference numerals with respect to the first embodiment, and an explanation thereof is omitted.

Figure 16:
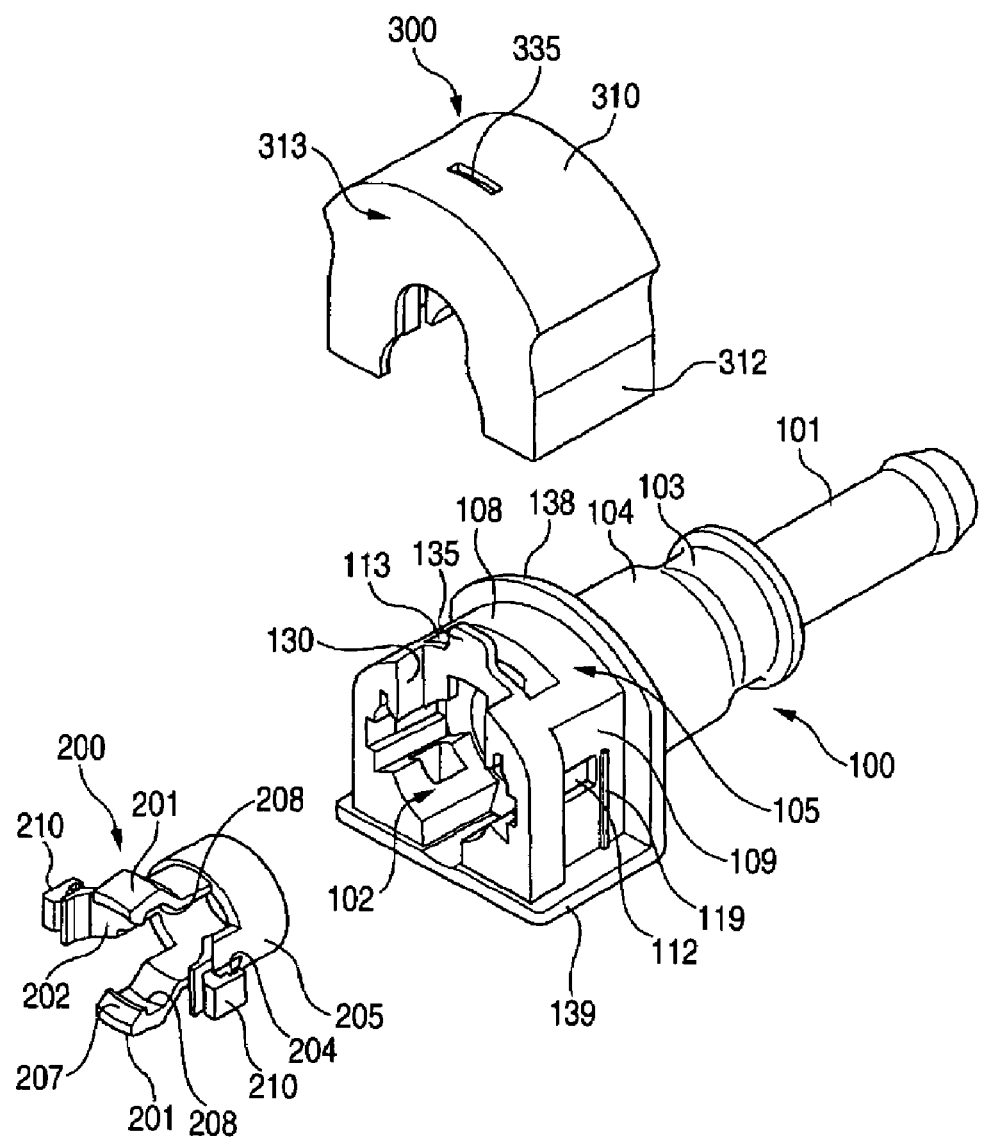
FIG. 16 is an exploded perspective view showing a second embodiment of the connector with check function of the invention.
Figure 18:
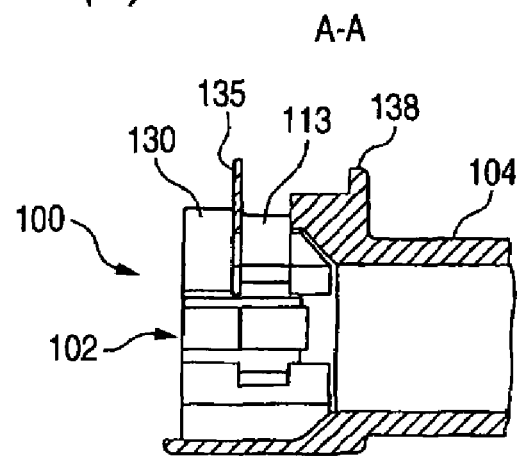
FIG. 18(a) is a cross section taken along the line A-A of FIG. 17.
FIG. 18(b) is a cross section taken along the line B-B of FIG. 17.
FIG. 18(c) is a cross section taken along the line C-C of FIG. 17, showing the housing of the connector with check function.
Figure 18:
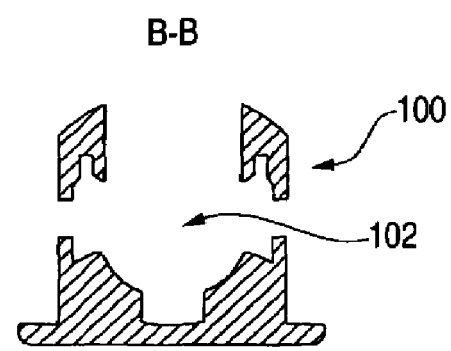
Figure 18:
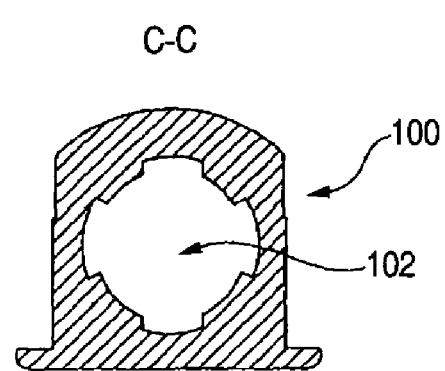

In this embodiment, as shown in FIGS. 16 through 18, a notch 130 is formed in the top wall 108 of the housing 100 at the edge on the opening portion 102 side through which the pipe 400 is inserted.

Figure 20:
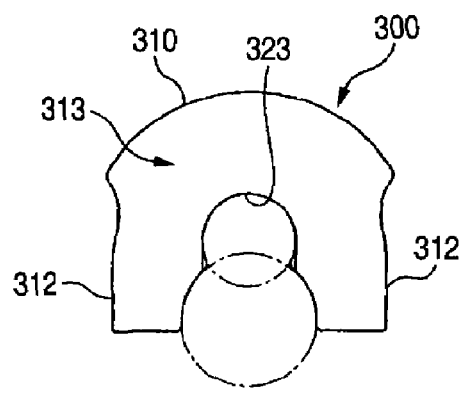
FIG. 20(a) is a front view.
FIG. 20(b) is a rear view.
FIG. 20(c) is a bottom view.
FIG. 20(d) is a side view.
FIG. 20(e) is a cross section taken along the line D-D of FIG. 20(b) showing a retainer of the connector with check function.
Figure 20:
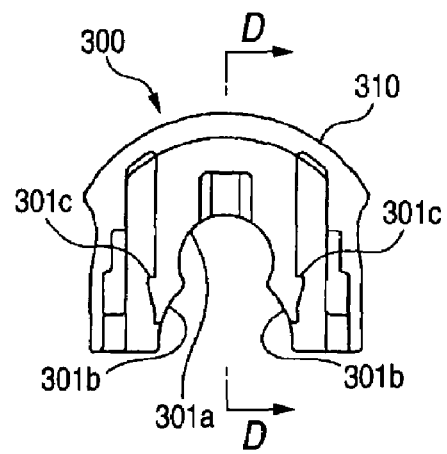
Figure 20:
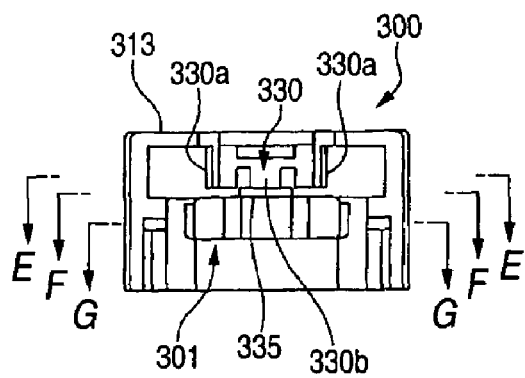
Figure 20:
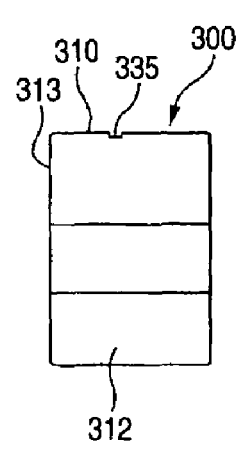
Figure 20:
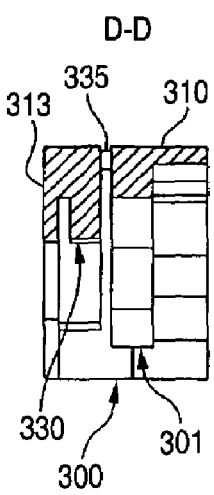
Figure 21:
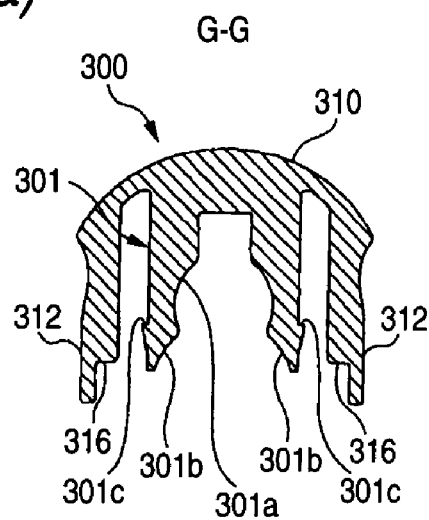
FIG. 21(a) is a cross section taken along the line G-G of FIG. 20.
FIG. 21(b) is a cross section taken along the line E-E of FIG. 20.
FIG. 21(c) is a cross section taken along the line F-F of FIG. 20, showing the retainer of the connector with check function.
Figure 21:
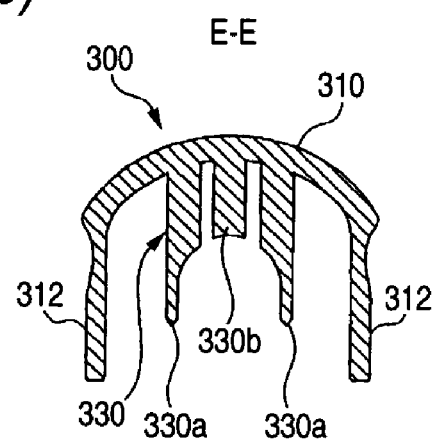
Figure 21:
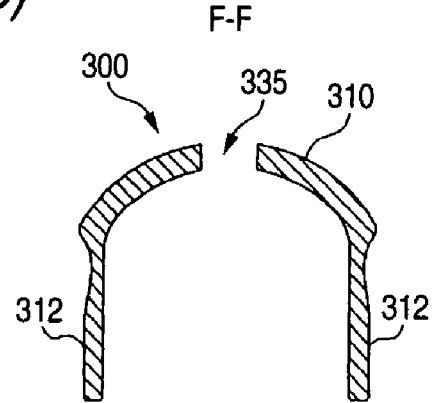

Correspondingly, as shown in FIGS. 20 and 21, a protruding portion 330 to be inserted into the notch 130 and extending into the housing 100 is formed on the inner periphery of the top wall 310 of the retainer 300. As shown in FIG. 21(b), the protruding portion 330 has two side portions 330a and a central portion 330b. The respective side portions 330a are extended downward to conform to the outer periphery of the pipe 400. Also, in a case where the annular protruding portion 401 of the pipe 400 is positioned below the protrusion 330, the lower ends of the respective side portions 330a interfere with the annular protruding portion 401, and the protruding portion 330 thereby functions to restrict movement of the retainer 300 to the insert position.

The locking piece 301 is formed adjacently to the protruding portion 330 in a direction away from the opening portion 102. As has been described above, the notch portion 301a cut out in a semi-circular shape is formed at the lower edge portion of the locking piece 301. Also, stopping portions 301c are formed on the outside of the respective side-end portions 301b of the locking piece 301. The stopping portions 301c engage with the inner rim portion of the first opening portion 113 when the locking piece 301 is inserted into the first opening portion 113 of the housing 100, and thereby have a function of preventing the retainer 300 from disengaging from the housing 100.

Further, a slit-shaped through-hole 335 is formed in the top wall 310 between the protruding portion 330 and the locking piece 301. A clearance between the protruding portion 330 and the locking piece 301 is less than the thickness of the annular protruding portion 401 of the pipe 400, so that the annular protruding portion 401 will not be inserted into the clearance. Hence, when the annular protruding portion 401 of the pipe 400 is located on the opening portion 102 side and at a position before going beyond the locking piece 301 (in a state where the pipe 400 is inserted incompletely), the protruding portion 330 or the locking piece 301 interferes with the annular protruding portion 401, which makes it possible to prevent the retainer 300 from moving to the insert position in a reliable manner.

In connection with the through-hole 335, the housing 100 includes a protruding piece 135 that is adjacent to the notch 130 and extends upward from the top wall 108. When the retainer 300 is moved to the insert position, the protruding piece 135 protrudes through the through-hole 335 of the retainer 300, so that it can be confirmed visually from the outside or the protruding state can be confirmed through the touch by hand. Consequently, the operator can confirm that the retainer 300 has moved to the insert position and connection is completed through visual inspection or through the touch by hand when the protruding piece 135 is at a position where visual inspection is difficult.

In this embodiment, a flange portion 138 is formed between the second diameter-enlarging portion 104 and the third diameter-enlarging portion 105 of the housing 100. Also, a flange portion 139 that expands in a direction perpendicular to the flange portion 138 is formed on the rim of the bottom wall of the housing 100. The flange portions 138 and 139 abut against one end surface and the bottom surface of the retainer 300, and thereby serve as the insertion guide of the retainer 300.

Also, as shown in FIG. 19, the stopper 200 includes engaging pieces 201 extending upward and downward and protruding pieces 202 extending to the right and left with respect to the annular portion 205, so that the annular protruding portion 401 of the pipe 400 fits into the concave portions 208 of the engaging pieces 201 at the top and the bottom.

Figure 22:
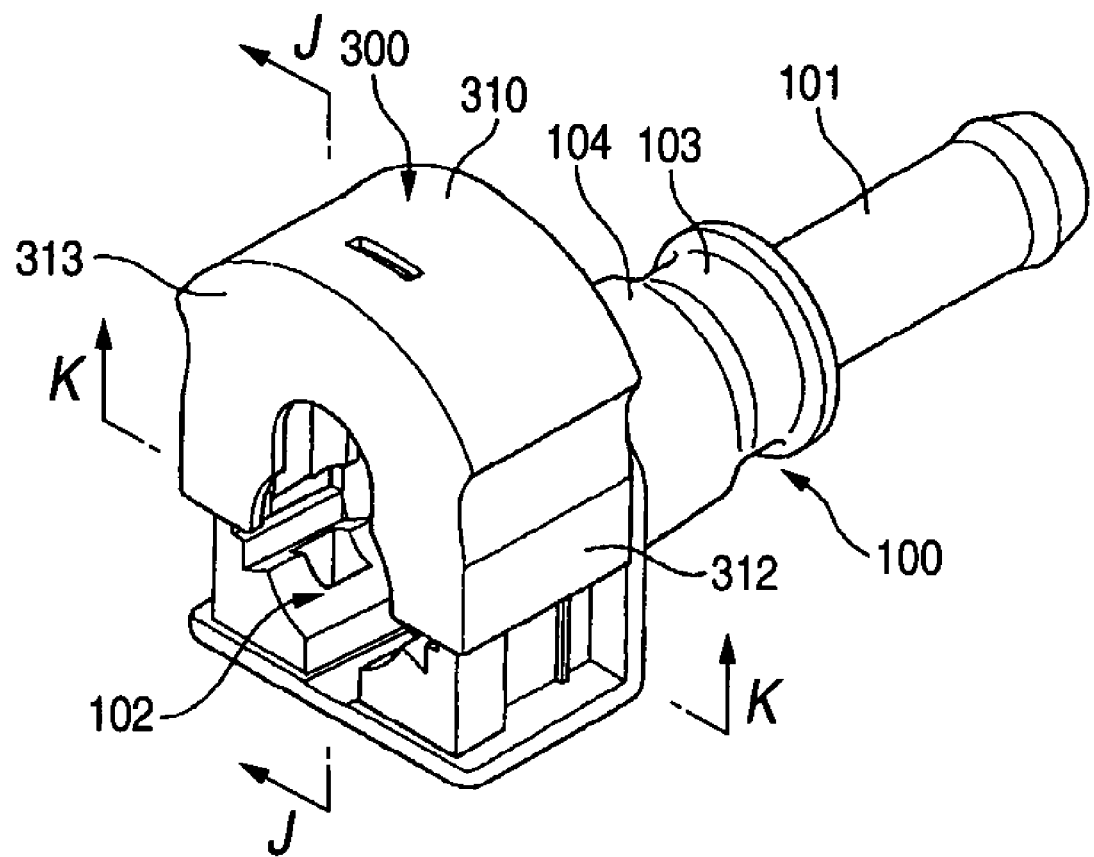
FIG. 22 is a perspective view showing a state where one pipe is slightly inserted into the housing when connecting pipes through the use of the connector with check function.
Figure 23:
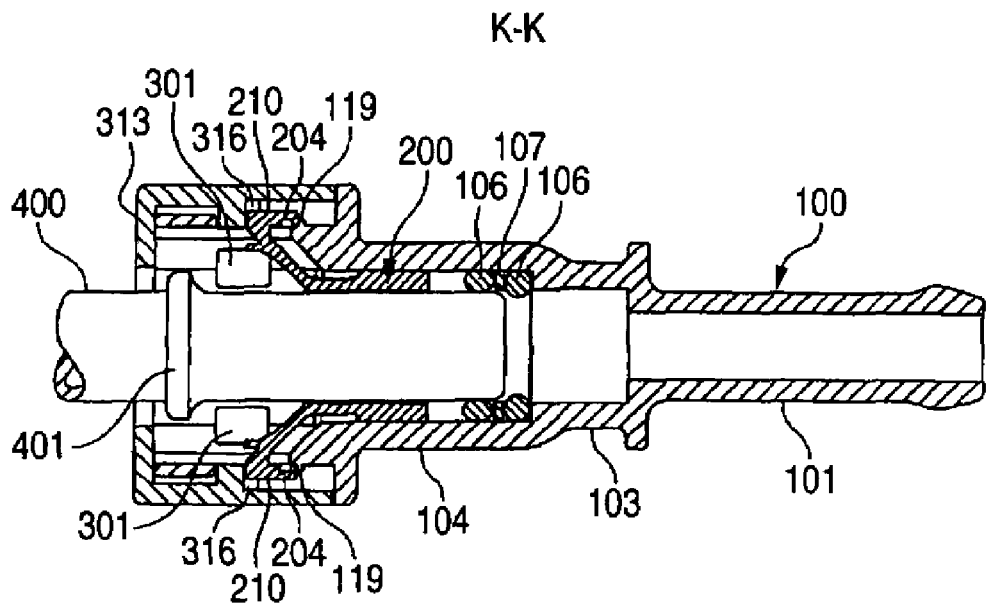
FIG. 23(a) is a cross section taken along the line K-K of FIG. 22
FIG. 23(b) is a cross section taken along the line J-J of FIG. 22, showing a state where one pipe is slightly inserted into the housing when connecting pipes through the use of the connector with check function.
Figure 23:
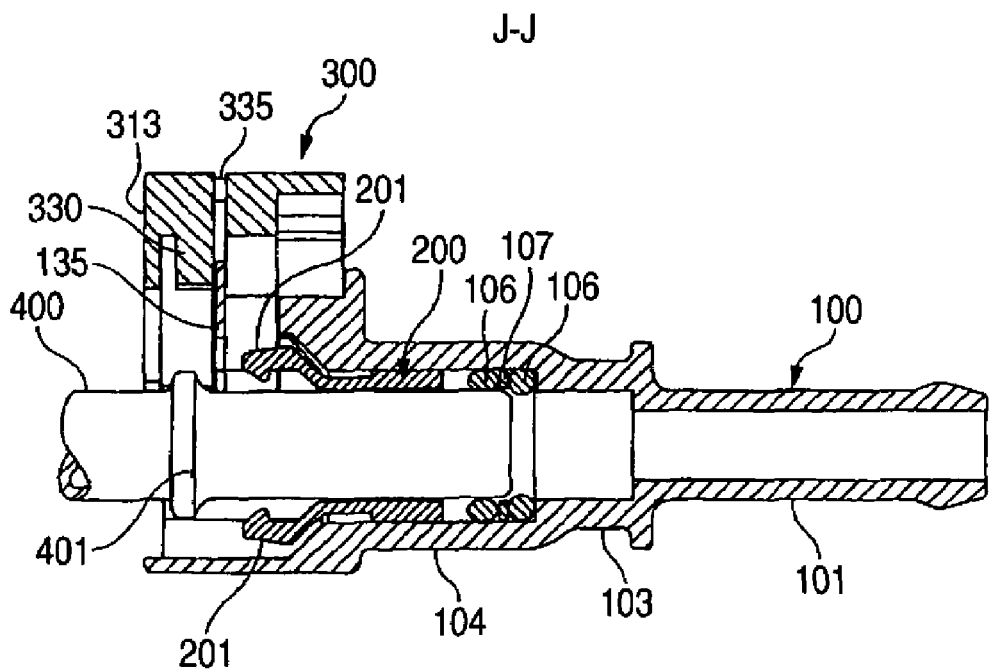
Figure 24:
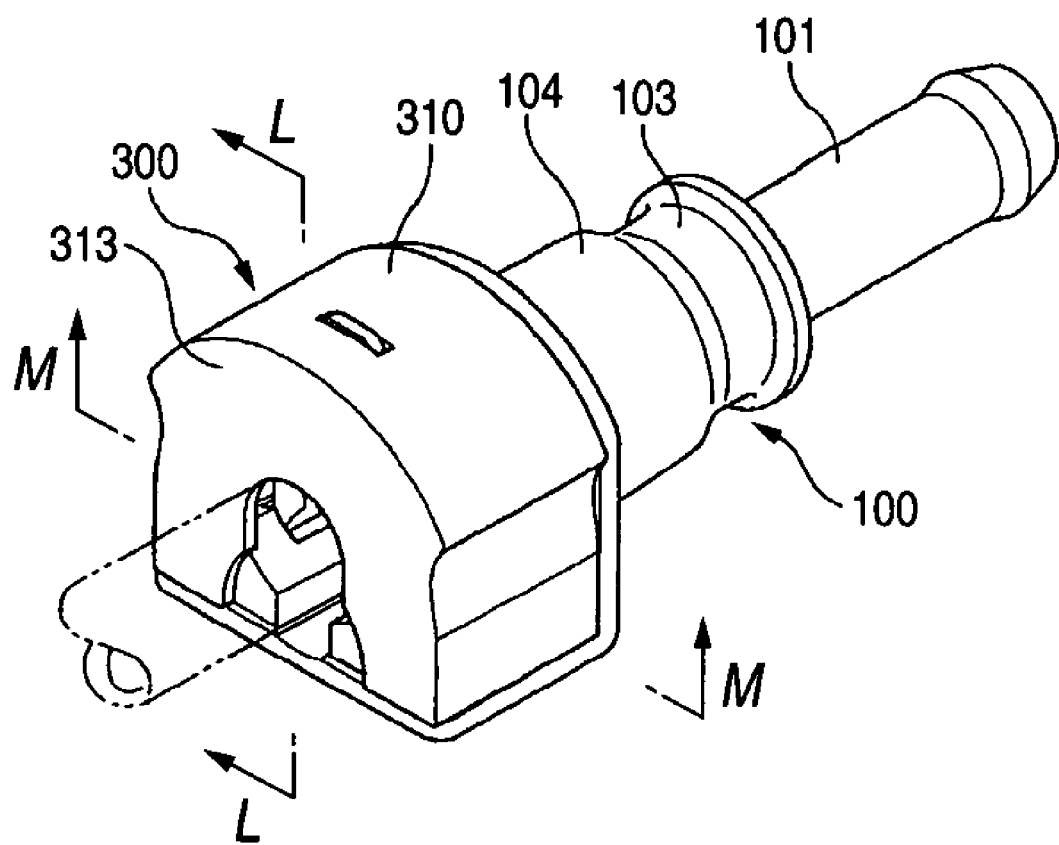
FIG. 24 is a perspective view showing a state where one pipe is inserted into the housing and the retainer is inserted when connecting pipes through the use of the connector with check function.
Figure 25:
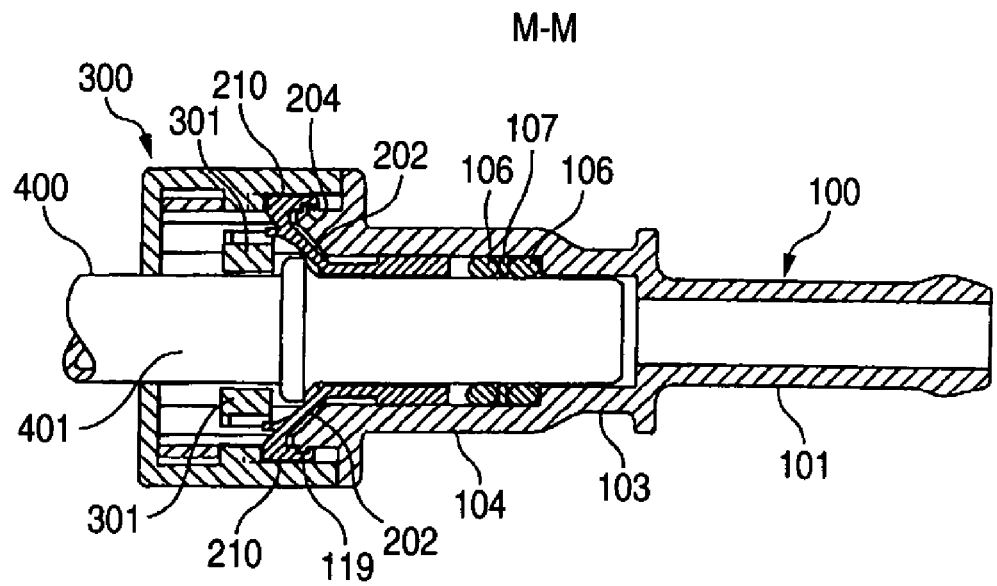
FIG. 25(a) is a cross section taken along the line M-M of FIG. 24
FIG. 25(b) is a cross section taken along the line L-L of FIG. 24, showing a state where one pipe is inserted into the housing and the retainer is inserted when connecting pipes through the use of the connector with check function.
Figure 25:
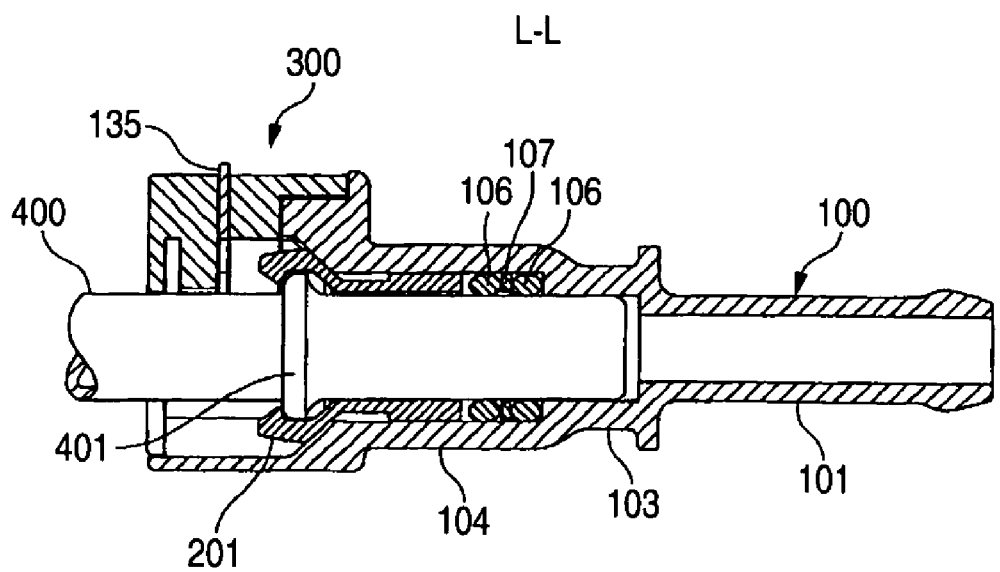

Although the shapes in detail are different, the structures of the other portions are substantially the same as those in the first embodiment. FIGS. 22 and 23 show a state where the retainer 300 is at the initial position with respect to the housing 100, and FIGS. 24 and 25 show a state where the retainer 300 is at the insert position with respect to the housing 100.

In the second embodiment, the protruding piece 135 is provided to the housing 100. When connection is completed by fully inserting the pipe 400 into the housing 100 and by inserting the retainer 300 so that the locking piece 301 of the retainer 300 engages with the annular protruding portion 401, the protruding piece 135 protrudes through the through-hole 335 in the retainer 300. Hence, as has been described above, the completion of connection can be confirmed through visual inspection or through the touch by hand.

Also, the stopping portions 301c are provided to the locking piece 301 of the retainer 300, so that disengagement is prevented by bringing the stopping portions 301c into engagement with the inner rim of the first opening portion 113 when the locking piece 301 is inserted into the first opening portion 113 of the housing 100. Hence, it is possible to simplify the disengagement preventing structure of the retainer 300 and ensure the disengagement preventing function.

Figure 26:
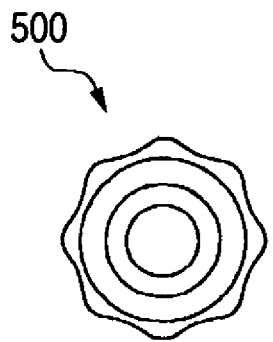
FIG. 26(a) is a front view.
FIG. 26(b) is a side view.
FIG. 26(c) is a perspective view, showing a cap used in a third embodiment of the connector with check function of the invention.
Figure 26:
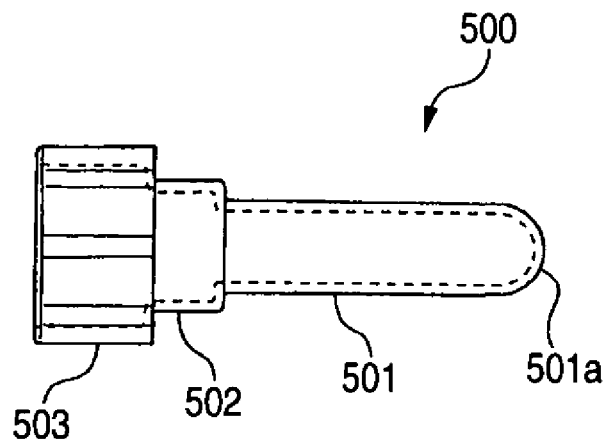
Figure 26:
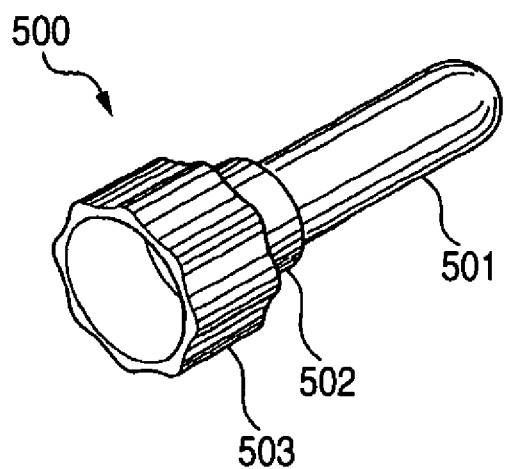
Figure 27:
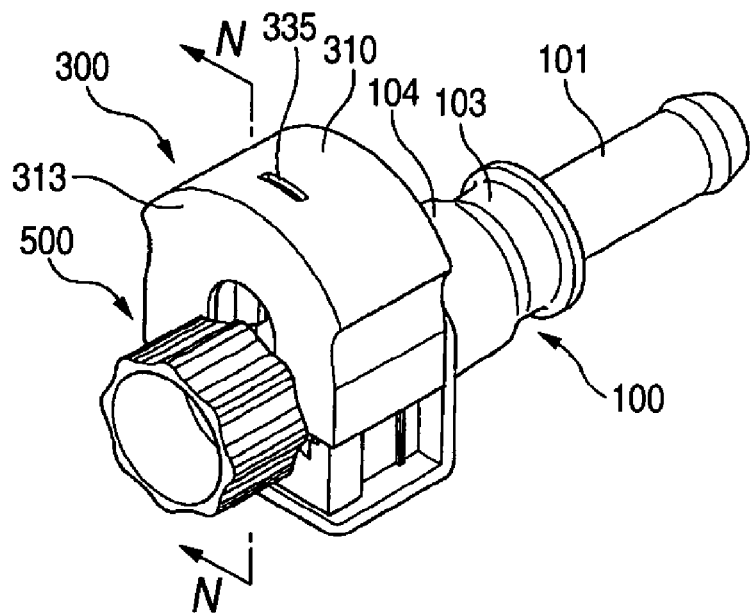
FIG. 27(a) is a perspective view and FIG. 27(b) is a cross section taken along the line N-N of FIG. 27(a), showing a state where the cap is used in the connector with check function.
Figure 27:
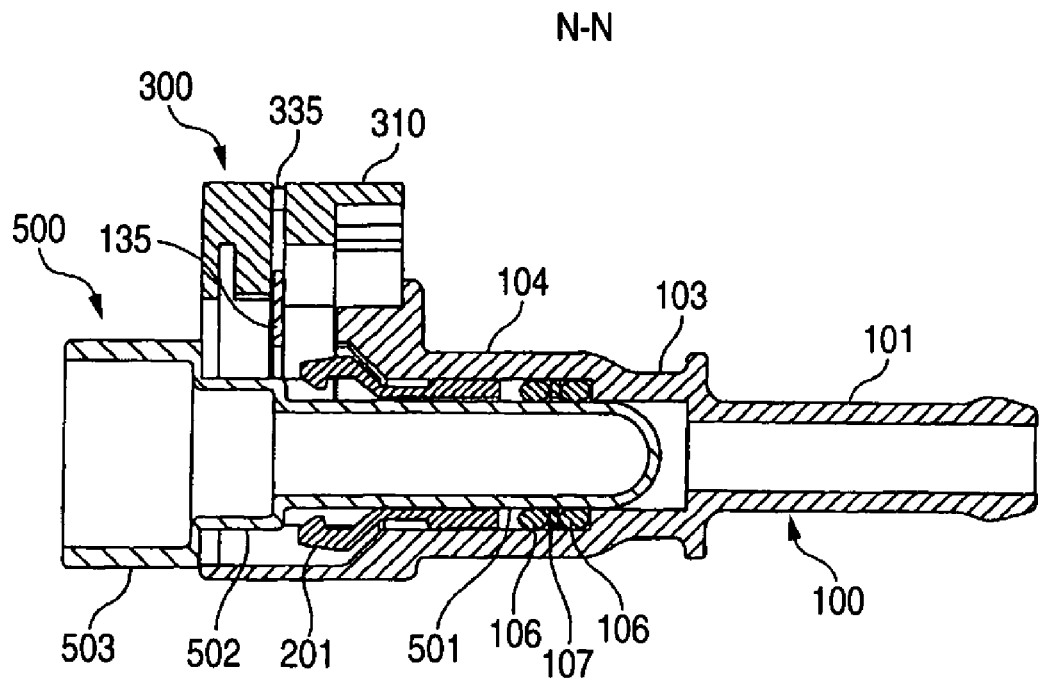

A third embodiment of the invention will now be explained with reference to FIGS. 26 and 27.

The third embodiment is identical with the second embodiment in the structures of the housing 100, the stopper 200, and the retainer 300, but is different in that a cap 500 is provided to restrict movement of the retainer 300 to the insert position when handled before the connector is used, for example, at the time of delivery.

The cap 500 includes a small-diameter cylindrical portion 501 as thick as the pipe 400, a medium-diameter cylindrical portion 502 as thick as the annular protruding portion 401 of the pipe 400, and a large-diameter cylindrical portion 503 of a thickness large enough to avoid being inserted into the opening portion 102 of the housing 100. The tip end of the small-diameter cylindrical portion 501 forms a semi-spherical surface and is closed.

When the product is delivered, the small-diameter cylindrical portion 501 of the cap 500 is inserted through the opening portion 102 of the housing 100. Then, the small-diameter cylindrical portion 501 is inserted into the inner periphery of the first diameter-enlarging portion 101, the medium-diameter cylindrical portion 502 is inserted into the inner periphery of the third diameter-enlarging portion 105, and the large-diameter cylindrical portion 503 abuts against the edge portion of the opening portion 102 of the housing 100 at a step portion of the enlarged diameter. Thus, when the operator tries to move the retainer 300 from the initial position to the insert position, the stopper piece 301 or the protruding portion 330 of the retainer 300 abuts against the medium-diameter cylindrical portion 502, and thereby restricts insertion of the retainer 300.

As a result, because the retainer 300 is prevented from moving to the insert position, when the connector is used, the operator only has to pull out the cap 500, and instead, inserts the end portion of the pipe 400 to be connected, which can accelerate a connection work. Also, because entrance of dust into the housing 100 can be prevented by the cap 500, it is possible to prevent the occurrence of a problem that the sealing property of the seal rings 106 is deteriorated due to adhesion of dust or the like.

A fourth embodiment of the invention will now be explained with reference to FIGS. 28 through 38. Substantially the same portions are labeled with the same reference numerals with respect to the first embodiment and the second embodiment, and an explanation thereof is omitted.

Figure 28:
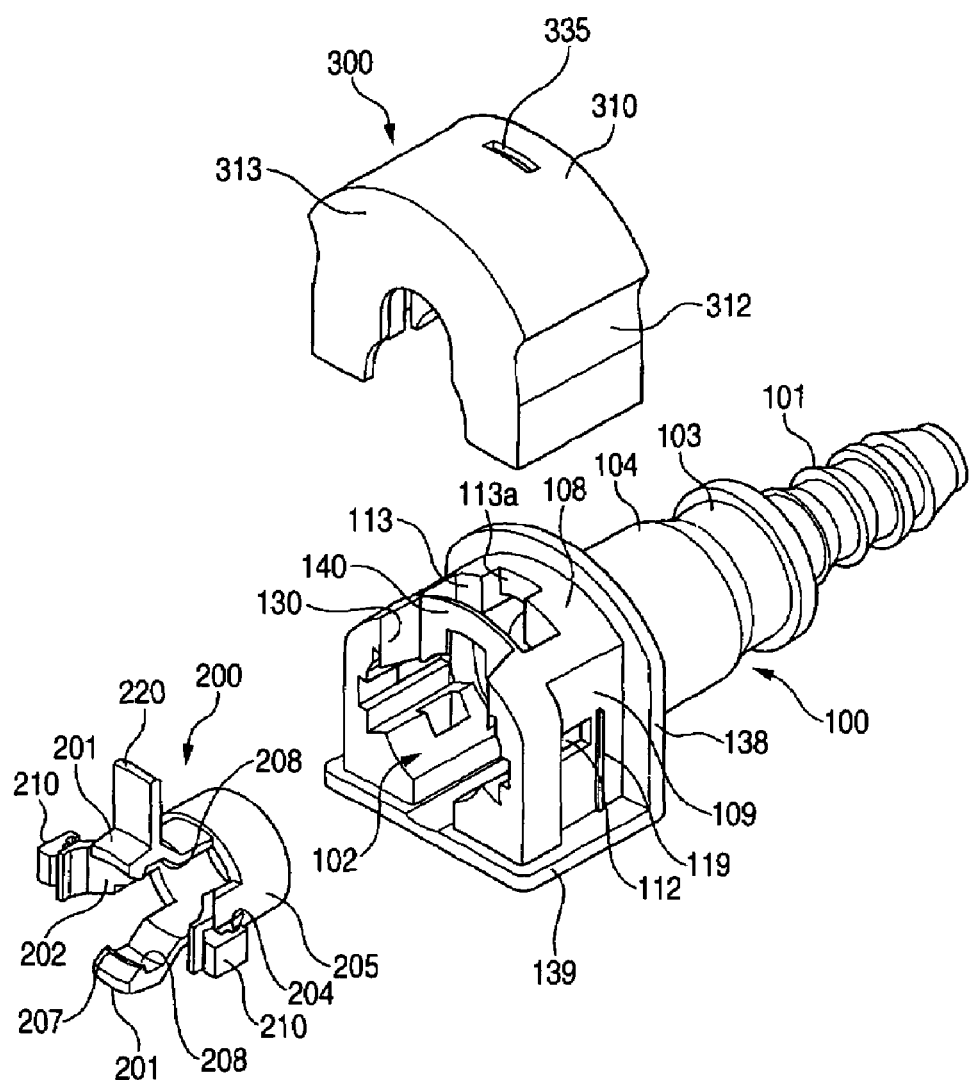
FIG. 28 is an exploded perspective view showing a fourth embodiment of the connector with check function of the invention.
Figure 29:
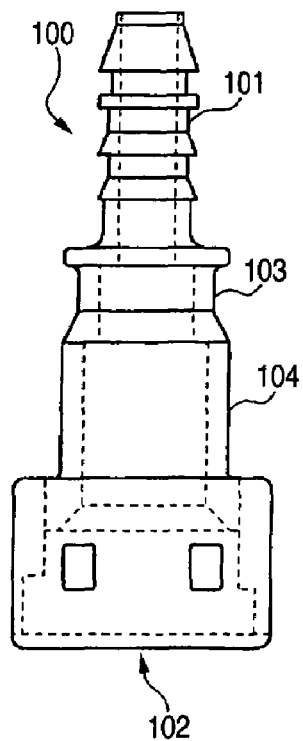
FIG. 29(a) is a bottom view.
FIG. 29(b) is a plan view.
FIG. 29(c) is a side view.
FIG. 29(d) is a front view, showing a housing of the connector with check function.
Figure 29:
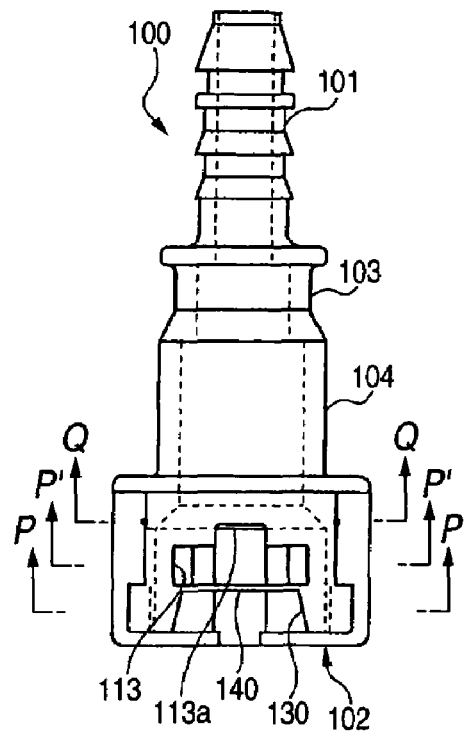
Figure 29:
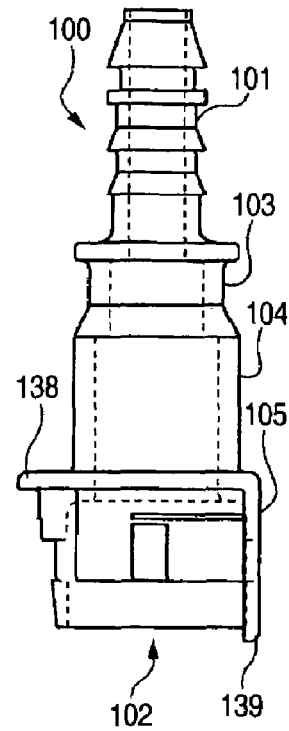
Figure 29:
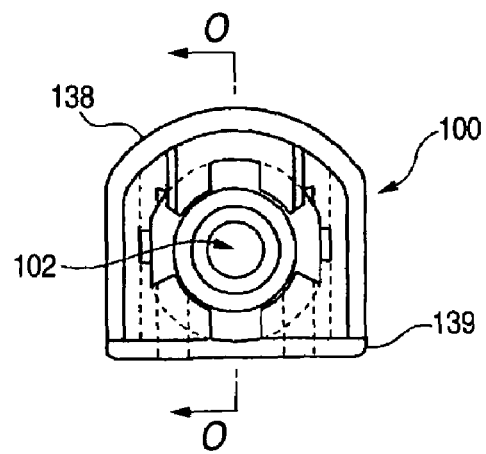
Figure 30:
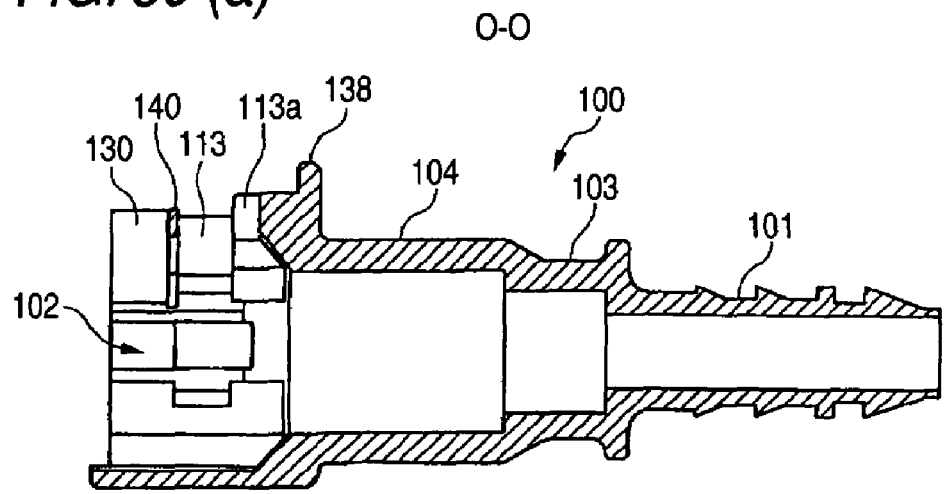
FIG. 30(a) is a cross section taken along the line O-O of FIG. 29.
FIG. 30(b) is a cross section taken along the line P-P of FIG. 29.
FIG. 30(c) is a cross section taken along the line Q-Q of FIG. 29.
FIG. 30(d) is a cross section taken along the line P'-P' of FIG. 29, showing the housing of the connector with check function.
Figure 30:
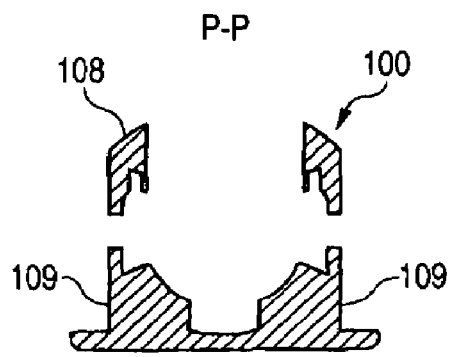
Figure 30:
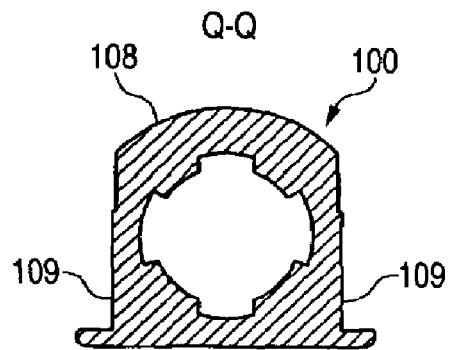
Figure 30:
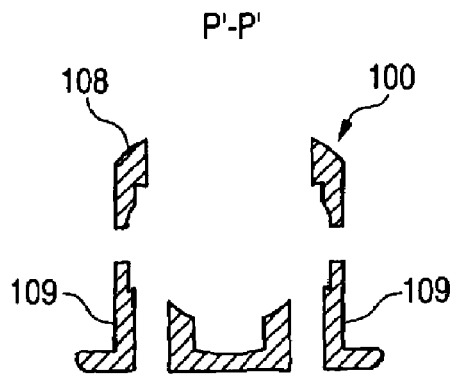
Figure 31:
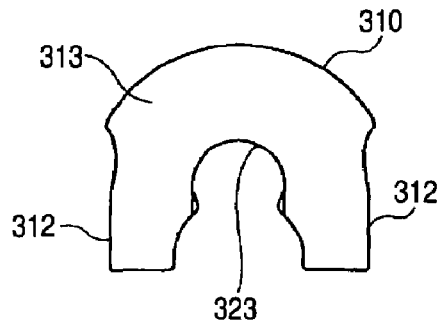
FIG. 31(a) is a front view.
FIG. 31(b) is a rear view.
FIG. 31(c) is a bottom view.
FIG. 31(d) is a side view.
FIG. 31(e) is a cross section taken along the line U-U of FIG. 31(b), showing a retainer of the connector with check function.
Figure 31:
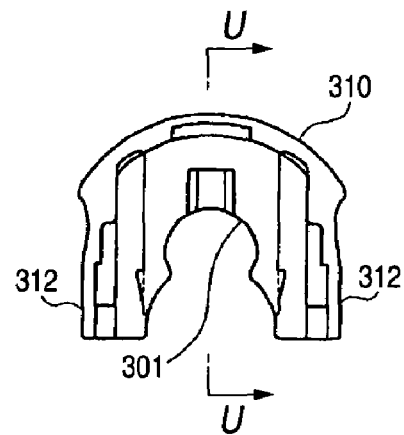
Figure 31:
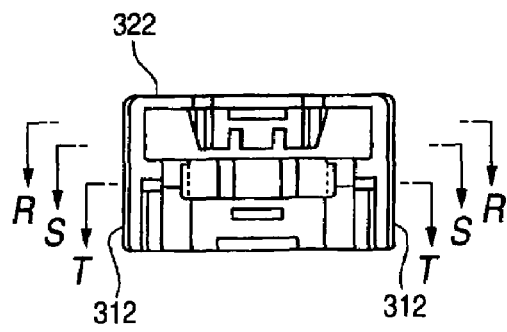
Figure 31:
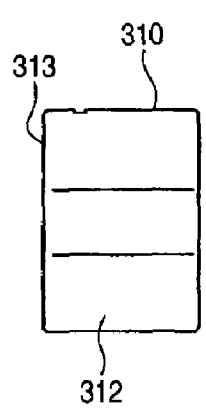
Figure 31:
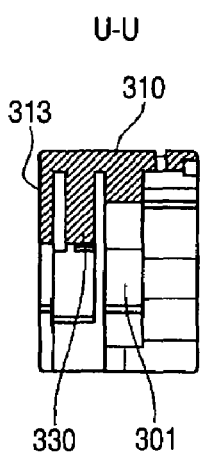
Figure 32:
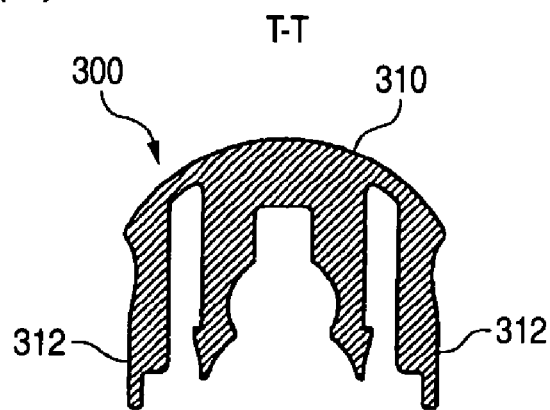
FIG. 32(a) is a cross section taken along the line T-T of FIG. 31.
FIG. 32(b) is a cross section taken along the line S-S of FIG. 31.
FIG. 32(c) is a cross section taken along the line R-R of FIG. 31, showing the retainer of the connector with check function.
Figure 32:
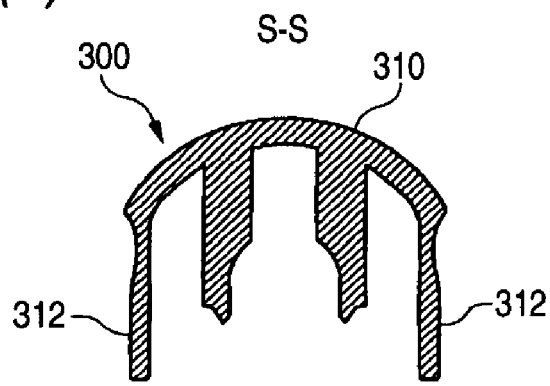
Figure 32:
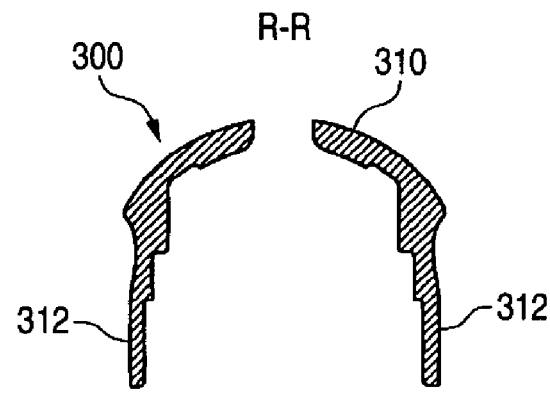
Figure 33:
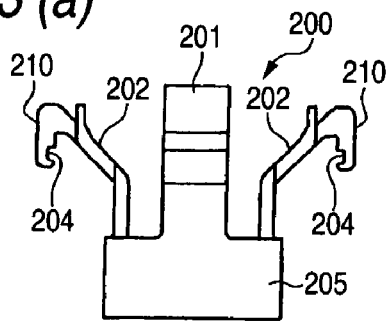
FIG. 33(a) is a plan view.
FIG. 33(b) is a front view.
FIG. 33(c) is a bottom view.
FIG. 33(d) is a rear view.
FIG. 33(e) is a cross section taken along the line V-V of FIG. 33(b)
FIG. 33(f) is a cross section taken along the line W-W of FIG. 33(b), showing a stopper of the connector with check function.
Figure 33:
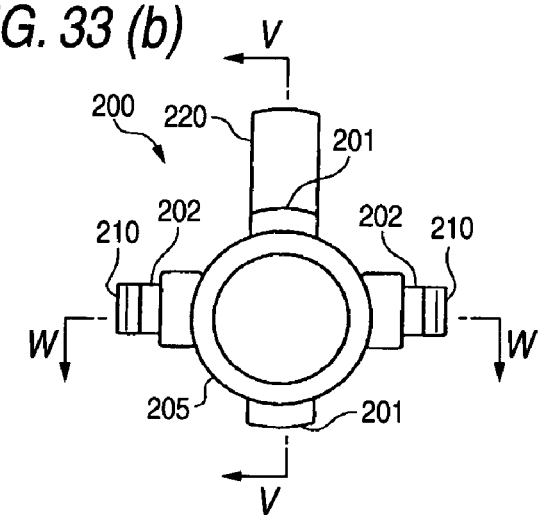
Figure 33:
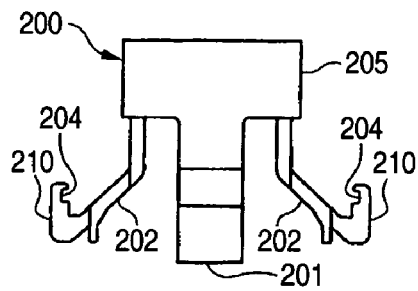
Figure 33:
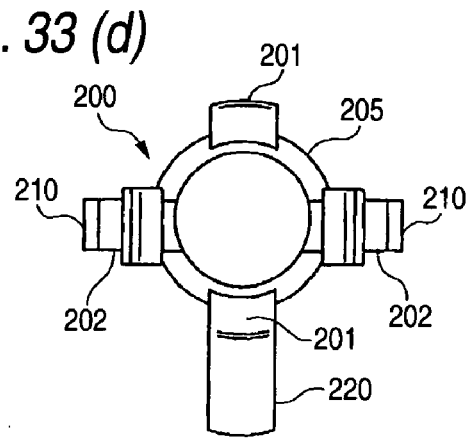
Figure 33:
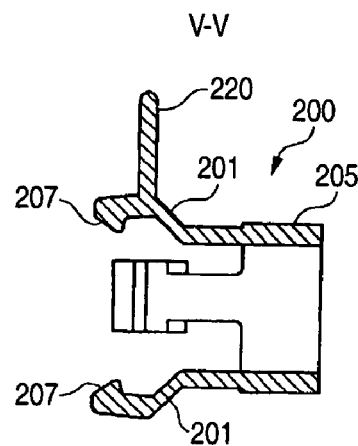
Figure 33:
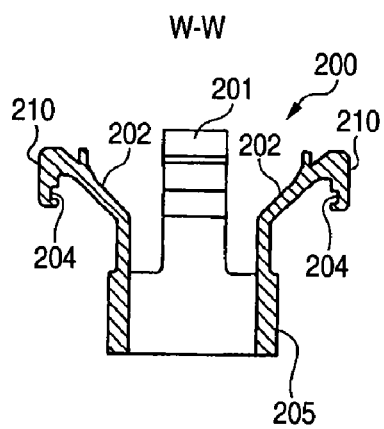

Basically, the fourth embodiment is of the same structure as the second embodiment; however, a member to be inserted into the through-hole 335 of the retainer 300 is different. In other words, in this embodiment, as shown in FIGS. 28, 33, and 34, a protruding piece 220 to be inserted into the through-hole 335 is provided to the upper engaging piece 201 of the stopper 200.

Also, the first opening portion 113 of the housing 100 is provided with a notch portion 113a into which the protruding piece 220 is inserted. A partition wall 140 is defined between the first opening portion 113 and the notch portion 130 into which the protruding portion 330 of the retainer 300 is inserted. When the stopper 200 is inserted into the housing 100, as shown in FIG. 34(a), the stopper 200 is inserted into the opening portion 102 of the housing 100 while the retainer 300 is not attached. In this instance, the protruding piece 220 of the stopper 200 is hooked by the partition wall 140. However, as shown in FIG. 34(b), bending the engaging piece 201 and the protruding piece 220 allows the protruding piece 220 to go under the partition wall 140 and move toward the first opening portion 113. Once the protruding piece 220 is inserted into the first opening portion 113 in this manner, the protruding piece 220 is placed in the notch portion 113a with its own elastic restoring force.

Figure 35:
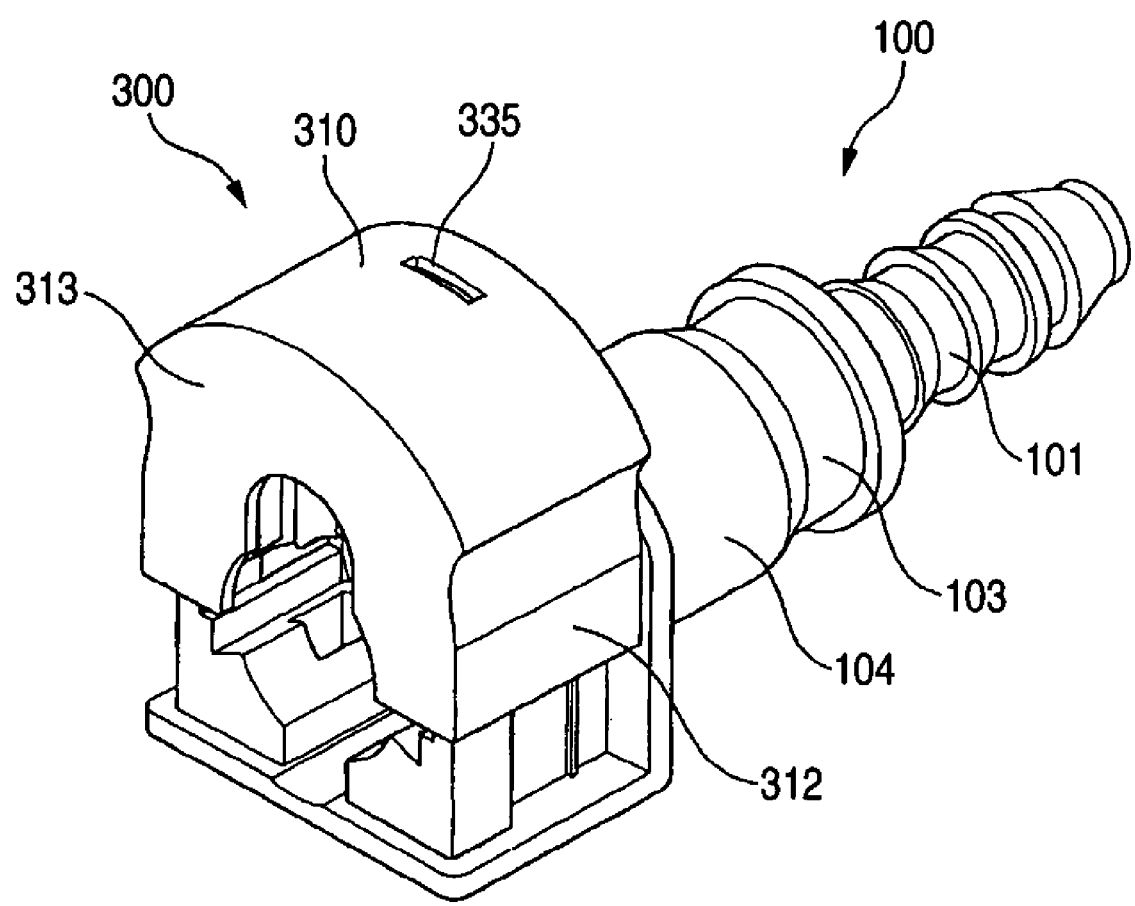
FIG. 35 is a perspective view showing a state where one pipe is slightly inserted into the housing when connecting pipes through the use of the connector with check function.
Figure 36:
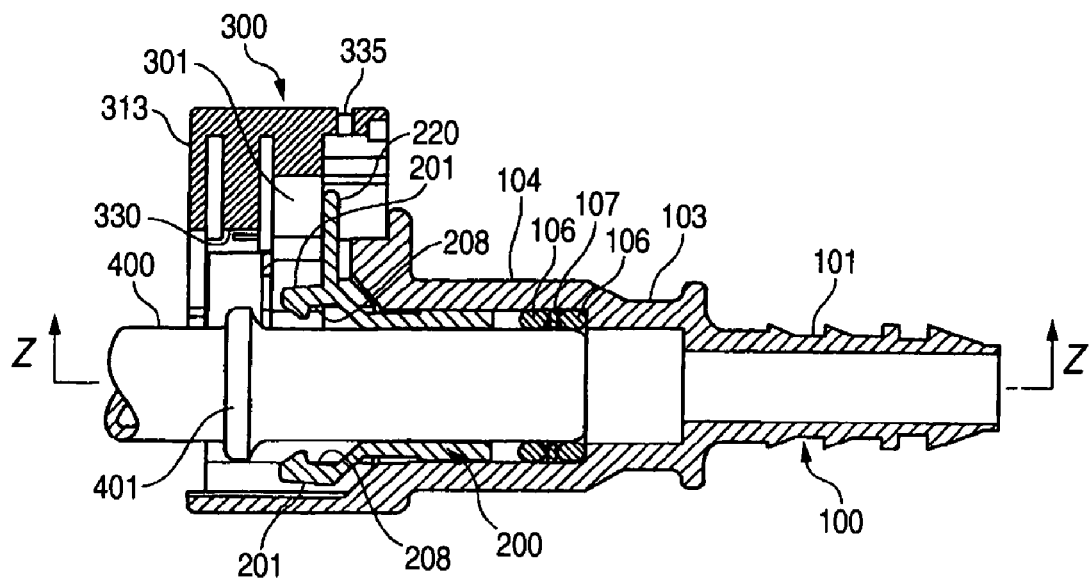
FIG. 36(a) is a longitudinal cross section and FIG. 36(b) is a cross section taken along the line Z-Z of FIG. 36(a), showing a state where one pipe is slightly inserted into the housing when connecting pipes through the use of the connector with check function.
Figure 36:
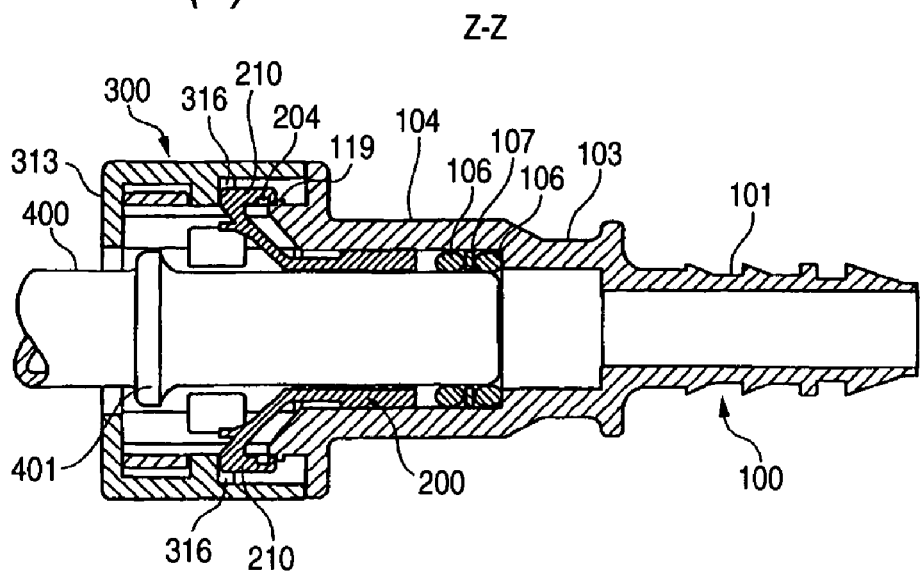
Figure 37:
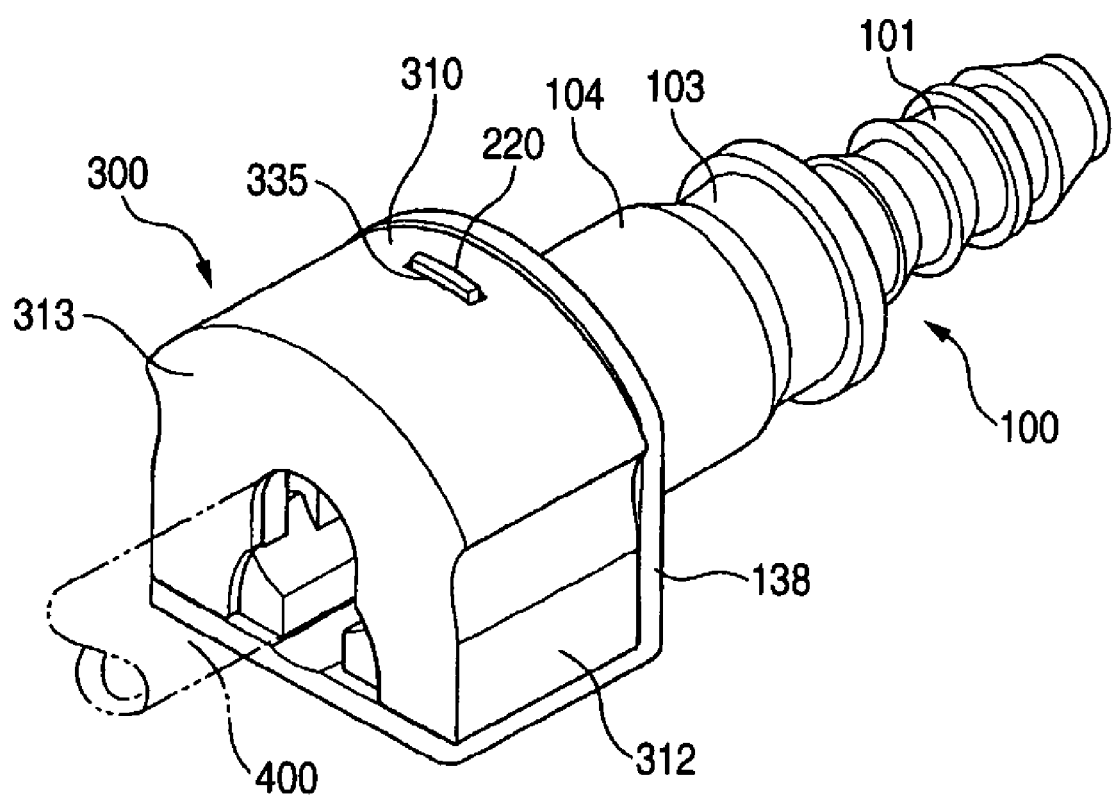
FIG. 37 is a perspective view showing a state where one pipe is inserted into the housing and the retainer is inserted when connecting pipes through the use of the connector with check function.
Figure 38:
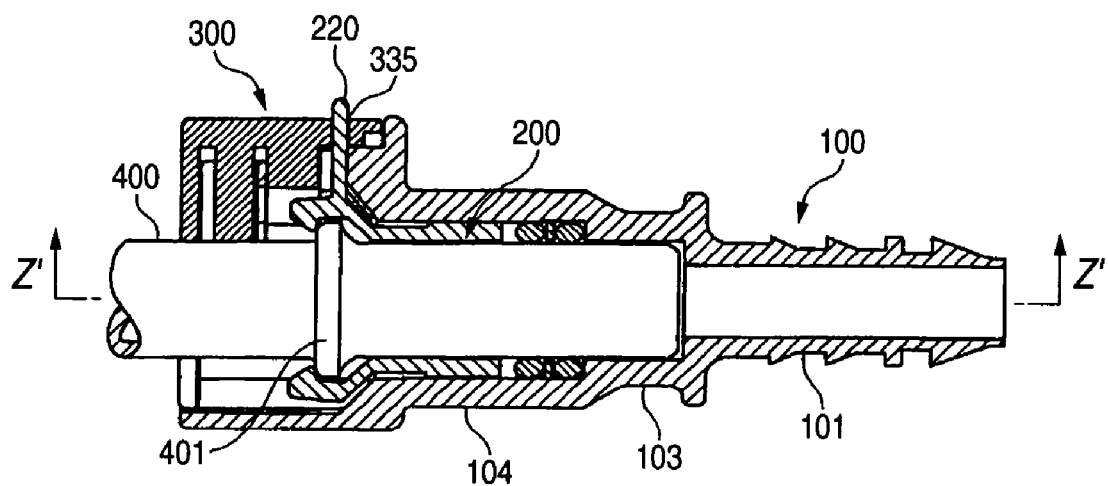
FIG. 38(a) is a longitudinal cross section and FIG. 38(b) is a cross section taken along the line Z'-Z' of FIG. 38(a), showing a state where one pipe is inserted into the housing and the retainer is inserted when connecting pipes through the use of the connector with check function.
Figure 38:
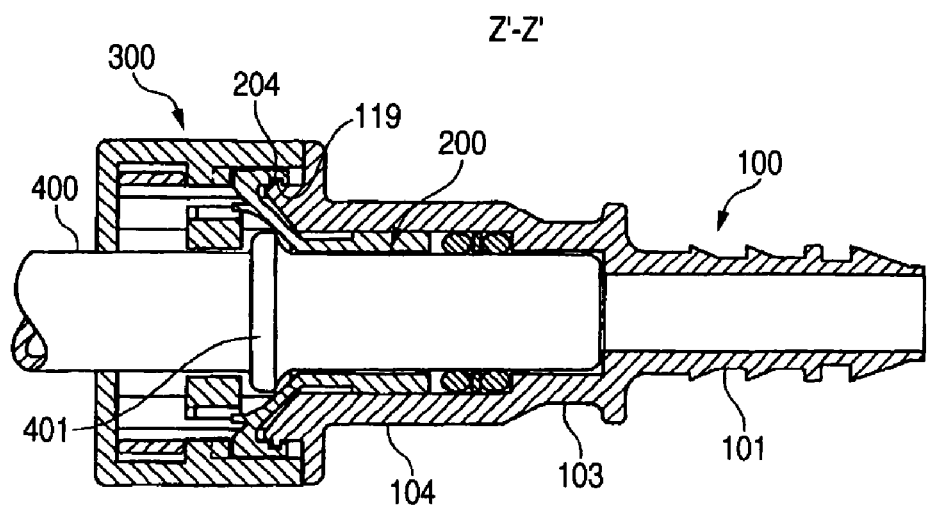

FIGS. 35 and 36 show a state where the retainer 300 is at the initial position with respect to the housing 100, and FIGS. 37 and 38 show a state where the retainer 300 is at the insert position with respect to the housing 100.

In this state, as with the embodiment shown in FIGS. 1 through 15, the retainer 300 cannot be inserted because the step portions 316 of the retainer 300 engage with the end portions of the plate-shaped portions 210 of the stopper 200.

The pipe 400 is inserted in this state. However, because the protruding portion 330 or the stopper piece 301 abuts against the annular protruding portion 401 until the annular protruding portion 401 of the pipe 400 goes beyond the position of the stopper piece 301, even when the operator tries to insert the retainer 300, the retainer 300 cannot be inserted. In this state, the protruding piece 220 of the stopper 200 is positioned inside the retainer 300, and is invisible from the outside.

When the pipe 400 is fully inserted into the housing 100, the annular protruding portion 401 of the pipe 400 fits in the concave portions 208 of the engaging pieces 201 of the stopper 200, whereupon the stopper 200 starts to move to the inner side of the housing 100. In response, the protruding piece 220 moves just below the through-hole 335 of the retainer 300. Also, the plate-shaped portions 210 of the stopper 200 disengages from the step portions 316 of the retainer 300, while the annular protruding portion 401 of the pipe 400 surmounts the stopper piece 301 and moves to the inner portion, whereupon insertion of the retainer 300 is allowed.

When the retainer 300 is inserted in this manner, the stopper piece 301 comes to the opening portion 102 side of the annular protruding portion 401, and thereby prevents the annular protruding portion 401 from disengaging therefrom. At the same time, the protruding piece 220 of the stopper 200 protrudes on the outer periphery of the retainer 300 through the through-hole 335. Hence, the operator can confirm the completion of connection by visually observing the protruding piece 220 from the outside. When the connector is inserted in a narrow portion so that the protruding piece 220 cannot be seen, the operator can confirm the completion of connection by touching the top wall 310 of the retainer 300 to check whether the protruding piece 220 is protruding through the touch by hand.

Also, in this embodiment, by changing a color of the retainer 300 from a color of the stopper 200, for example, by giving a dark color, such as black, to the retainer 300, and a bright color, such as white, to the stopper 200, it becomes easier to confirm whether the protruding piece 220 is protruding.

Figure 39:
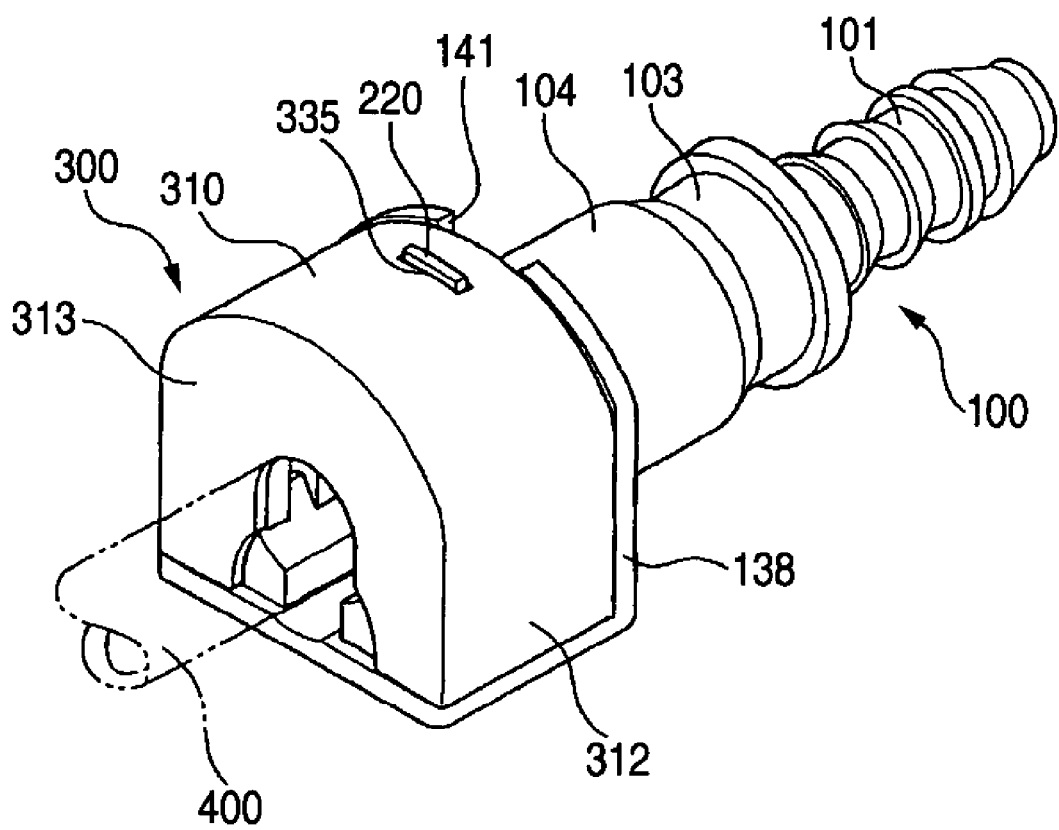
FIG. 39 is a perspective view showing a fifth embodiment of the connector with check function of the invention.
Figure 40:
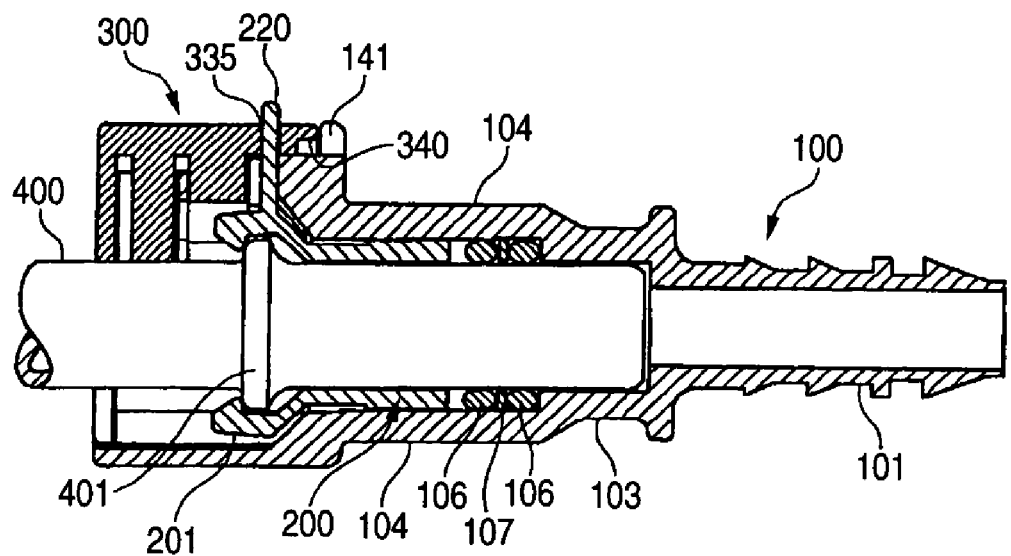
FIG. 40(a) is a longitudinal cross section showing a state where a retainer is inserted and FIG. 40(b) is a longitudinal cross section showing a state where the retainer is pushed upward with a tool, showing the connector with check function.
Figure 40:
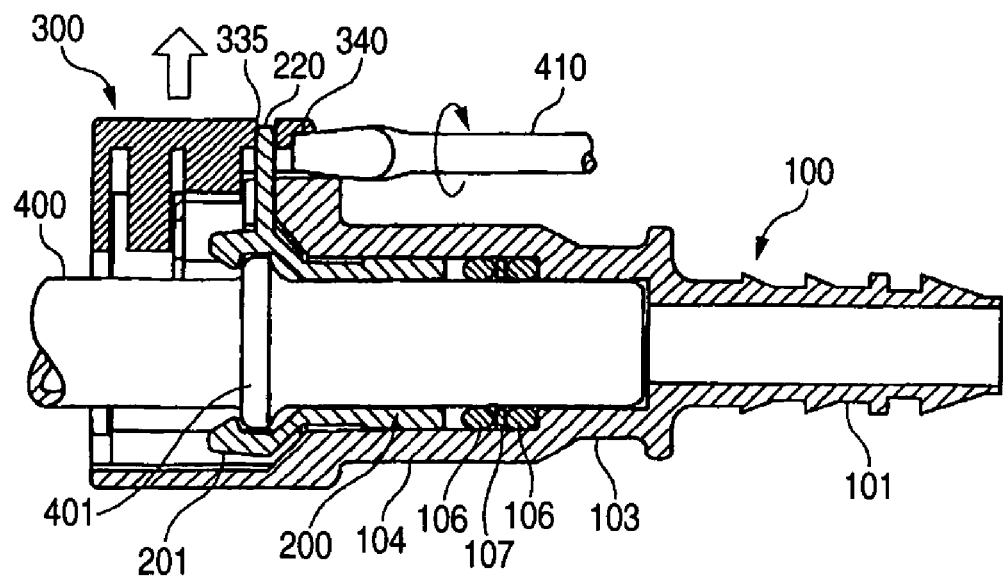

A fifth embodiment of the invention will now be explained with reference to FIGS. 39 and 40. Substantially the same portions are labeled with the same reference numerals with respect to the respective embodiments above, and an explanation of thereof is omitted.

Basically, this embodiment is identical with the fourth embodiment except that a notch portion 141 is formed in the vicinity of the apex of the flange portion 138 formed between the second diameter-enlarging portion 104 and the third diameter-enlarging portion 105 of the housing 100. Also, a diameter-enlarging concave portion 340 is provided to the retainer 300 in a portion on the inner periphery of the edge portion that abuts against the flange portion 138 and opposes the notch portion 141.

In the event that the pipe 400 needs to be removed for the reason of repairing of the apparatus or the like in a state where the connection is completed by moving the retainer 300 to the insert position and thereby providing the disengagement prevention to the annular protruding portion 401 of the pipe 400 with the stopper piece 301, as shown in FIG. 40(b), the tip end of a tool 410, such as a slotted screwdriver, is inserted to the diameter-enlarging concave portion 340 of the retainer 300 through the notch portion 141 of the flange portion 138.

By pushing the retainer 300 upward in this state through a method of rotating the tip end of the tool 410, such as the slotted screwdriver, the stopper piece 301 moves away from the outer periphery of the pipe 400, where upon the engagement between the stopper piece 301 and the annular protruding portion 401 is released. The pipe 400 can be then pulled out from the housing 100.

Figure 41:
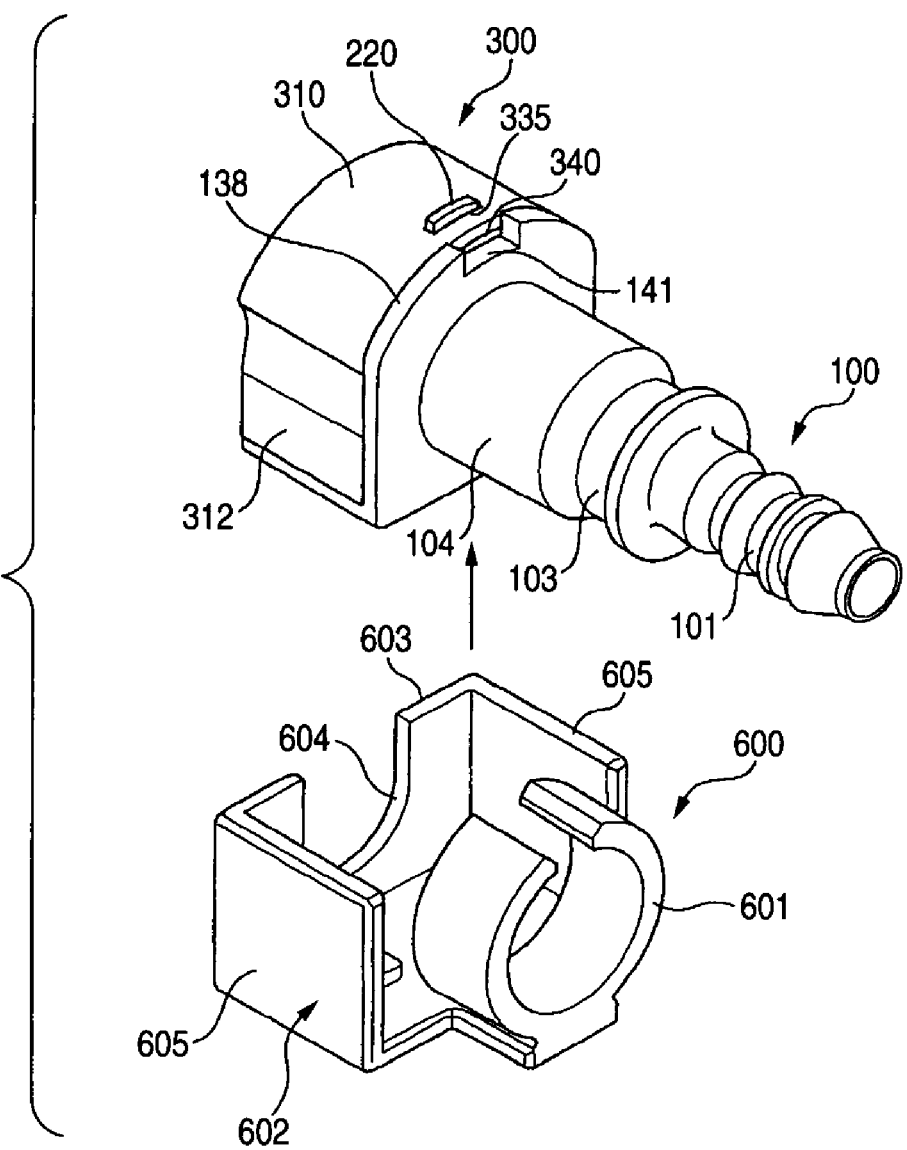
FIG. 41 is a perspective view showing a sixth embodiment of the connector with check function of the invention with a covering member being removed.
Figure 42:
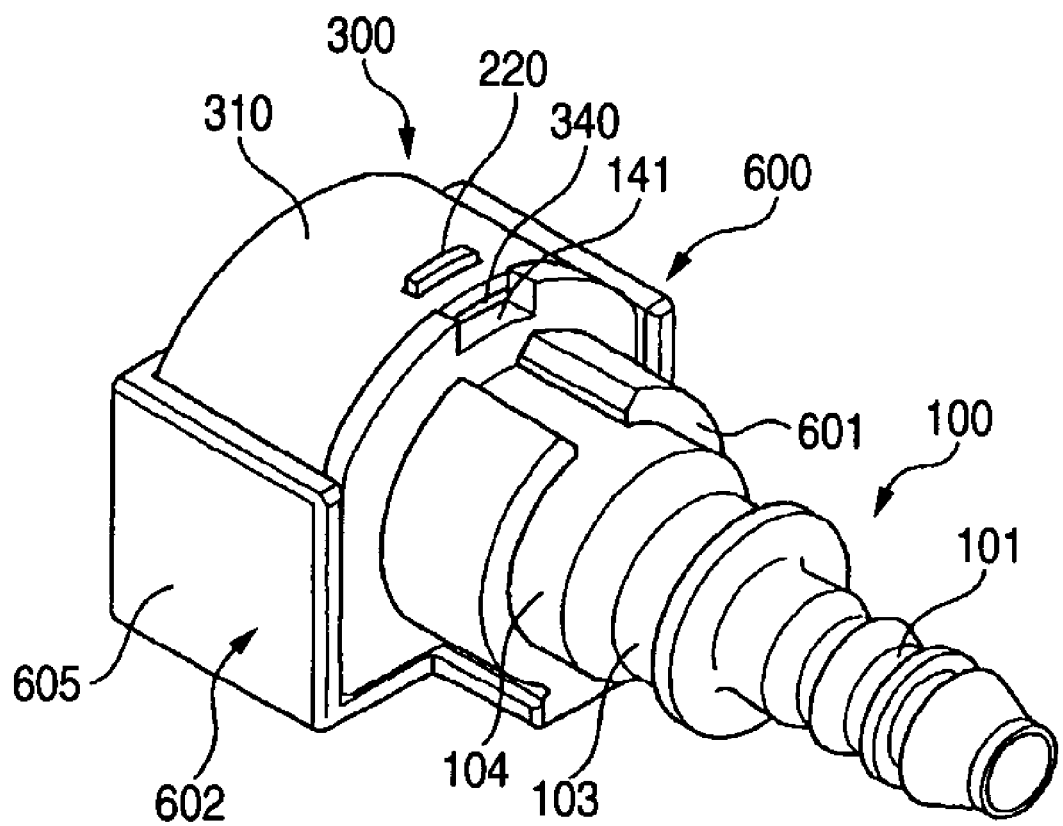
FIG. 42 is a perspective view showing a state of the connector with check function with the covering member being attached.
Figure 43:
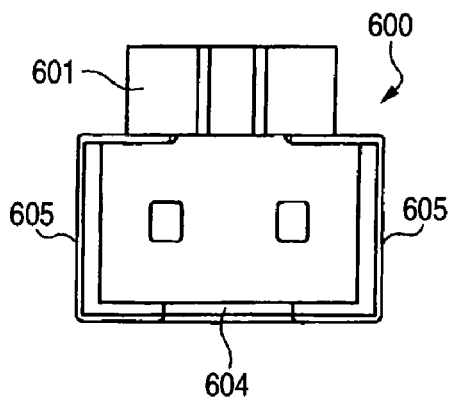
FIG. 43(a) is a plan view.
FIG. 43(b) is a front view.
FIG. 43(c) is a bottom view.
FIG. 43(d) is a side view.
FIG. 43(e) is a rear view, showing the covering member of the connector with check function.
Figure 43:
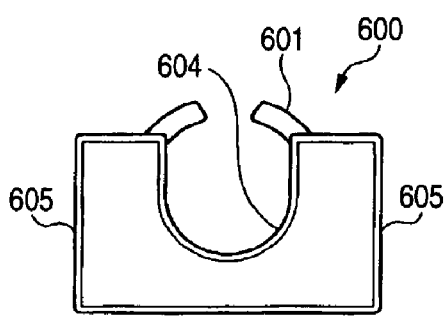
Figure 43:
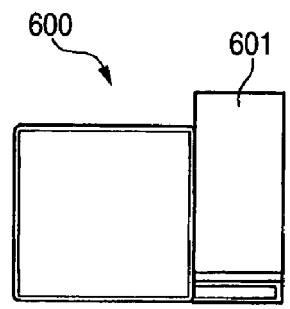
Figure 43:
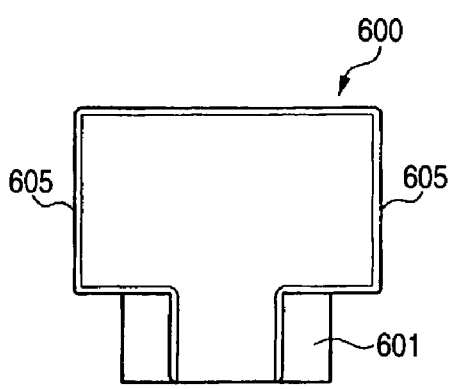
Figure 43:
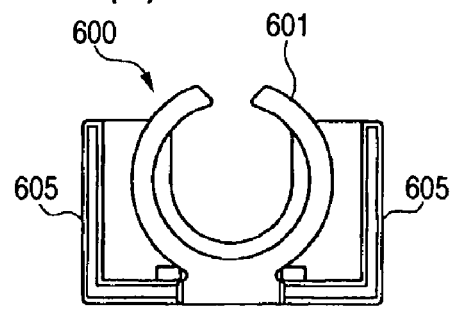

A sixth embodiment of the invention will now be explained with reference to FIGS. 41 through 43. Substantially the same portions are labeled with the same reference numerals with respect to the respective embodiments above, and an explanation thereof is omitted.

Basically, this embodiment is identical with the fourth embodiment and the fifth embodiment, but is different in that a covering member 600 is provided, which is assembled to the housing 100 with the retainer 300 having moved to the insert position, and thereby covers the respective sidewalls of the retainer 300.

The covering member 600 includes a holder 601 having a C-shaped cross section to be fitted to the outer periphery of the second diameter-enlarging portion 104 of the housing 100, and a box-type cover 602 provided continuously with the holder 601. The cover 602 is open at the top surface and the surface on the holder 601 side, and is provided with a U-shaped notch 604, into which the pipe is inserted, in a wall portion 603 on the opposite side to the holder 601. Also, two sidewalls 605 are formed to cover the respective sidewalls 312 of the retainer 300.

According to this embodiment, after connection is completed by inserting the pipe 400 into the housing 100 and inserting the retainer 300, the covering member 600 is attached to the housing 100 by fitting the holder 601 to the outer periphery of the second diameter-enlarging portion 104. Then, the respective sidewalls of the retainer 300 are covered with the covering member 600, which makes it impossible for anyone to hold the retainer 300 directly. For this reason, the retainer 300 cannot be pulled upward, and for example, when the retainer 300 is used for piping connection for cooling water or fuel in a motorbike, it is possible to inhibit a third party from disconnecting the pipe by mischievously pulling the retainer 300 upward.

Figure 44:
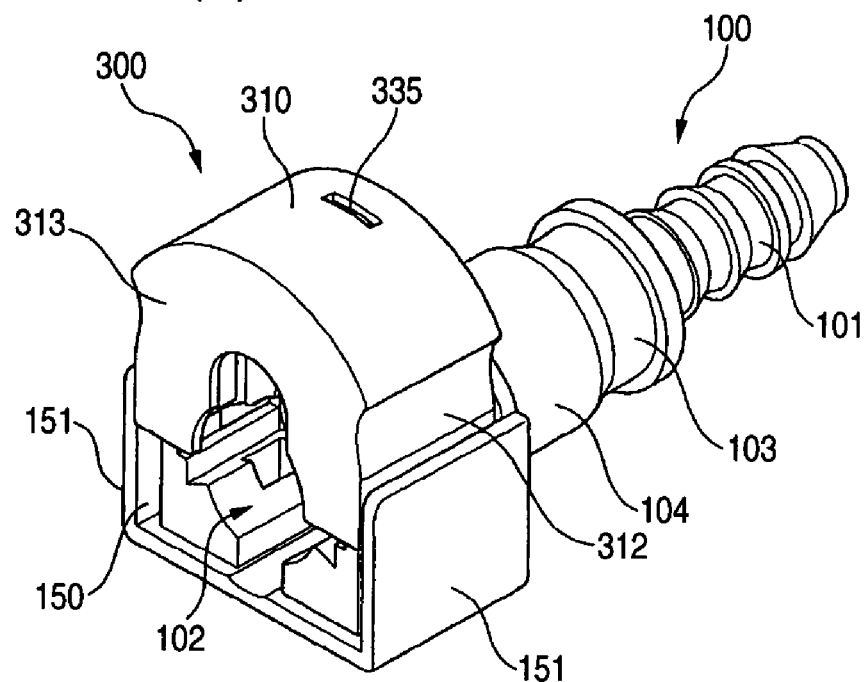
FIG. 44(a) is a perspective view showing a state where a retainer is inserted halfway.
FIG. 44(b) is a perspective view showing a state where the retainer is fully inserted, showing a seventh embodiment of the connector with check function of the invention.
Figure 44:
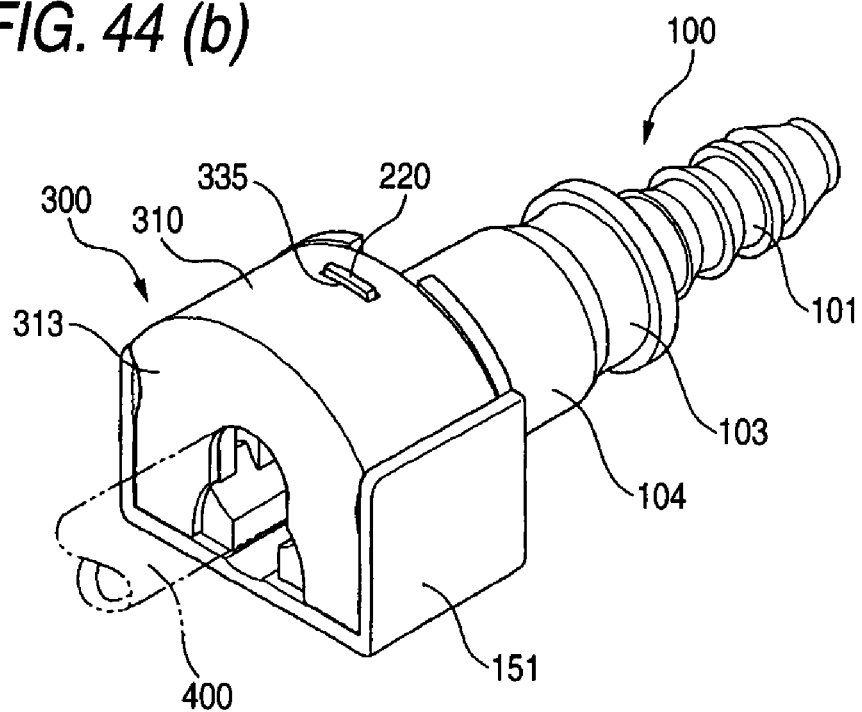
Figure 45:
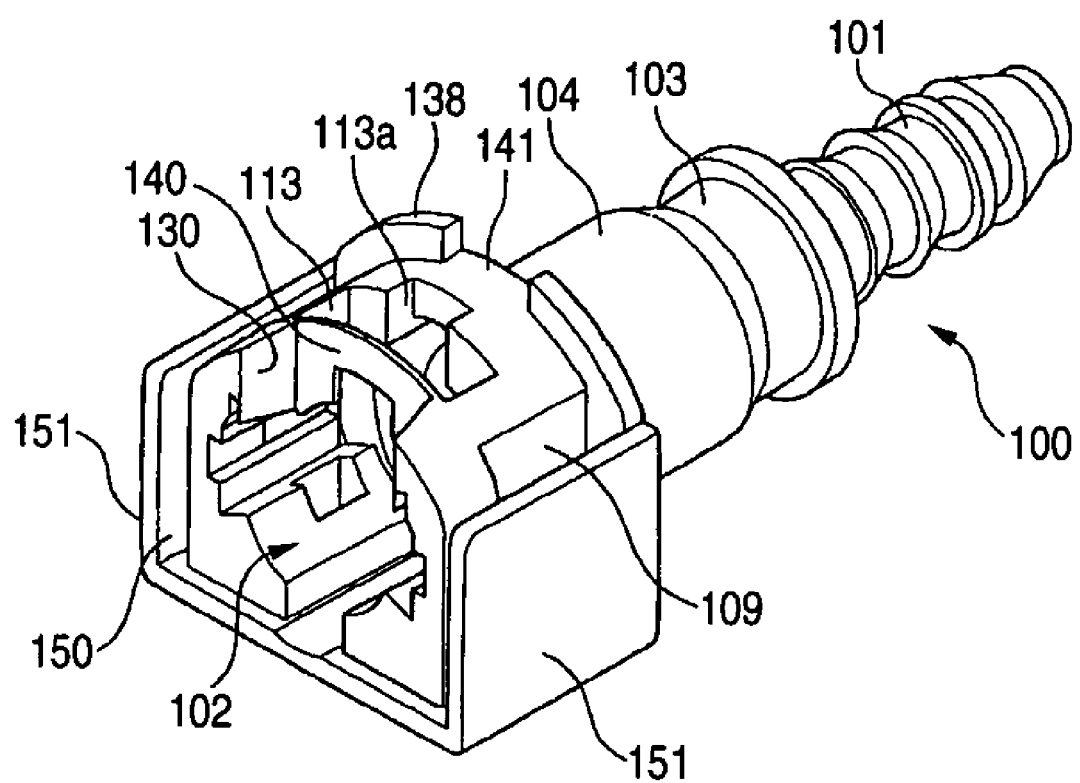
FIG. 45 is a perspective view showing a housing of the connector with check function.

A seventh embodiment of the invention will now be explained with reference to FIGS. 44 through 46. Substantially the same portions are labeled with the same reference numerals with respect to the respective embodiments above, and an explanation thereof is omitted.

Basically, this embodiment is identical with the fourth embodiment and the fifth embodiment, but is different in that covering walls 151 are formed in almost parallel with the respective sidewalls 109 of the housing 100 while securing clearances 150 large enough for the respective sidewalls 312 of the retainer 300 to be inserted.

In other words, the covering walls 151 are provided to protrude from the bottom wall of the housing 100 on the both sides in the shape of a flange and then stand upright in almost parallel with the respective sidewalls 109. The clearances 150 are formed in spaces large enough for the respective sidewalls 312 of the retainer 300 to be inserted, so that the respective sidewalls 312 of the retainer 300 are covered with the covering walls 151 when the retainer 300 is inserted into the housing 100.

Hence, according to this embodiment, in a state where connection is completed by inserting the pipe 400 into the housing 100 and inserting the retainer 300, the retainer 300 cannot be pulled upward, and therefore, as with the sixth embodiment, it is possible to inhibit a third party from disconnecting a pipe by mischievously pulling the retainer 300 upward.

When there arises a need to remove the pipe 400 by pulling the retainer 300 upward, as has been described above, the retainer 300 can be pulled upward by inserting a tool, such as a slotted screwdriver, through the notch portion 141 of the flange portion 138 of the housing 100.

Also, as another means for preventing a mischievous conduct by a third party as described above, the respective sidewalls 312 of the retainer 300 may be formed into a shape that cannot be readily held by hand, so that the retainer 300 can be pulled upward only through the use of a tool. For example, both the sidewalls 312 maybe flat planes, or of a tapered shape with the width being narrowed toward the top wall 310.

As has been described, according to the invention, it is possible to know the completion of coupling through the use of the connector by merely confirming whether the insertion of the retainer is completed through visual inspection from the outside, which make a check-up in a piping work markedly easy. Also, even when the coupling through the use of the connector is released and the connector is used again, it is still possible to confirm whether coupling is completed in a reliable manner by inserting the retainer.

What is claimed is:

1. A connector with check function for connecting pipes for fluid, one of the pipes comprising an annular protruding portion on an outer periphery thereof at an end portion, the connector comprising:

an approximately cylindrical housing coupled to another of the pipes, the housing into which the one of the pipes is inserted;

a stopper disposed in an interior of the housing, the stopper held at an initial position of the stopper adjacent to an opening portion of the housing, the stopper moving to a push-in position away from the opening portion of the housing when the one of the pipes is fully inserted; and a retainer attached to the housing to be insertable and movable between an initial position of the retainer and an insert position, wherein the retainer and the stopper each comprise a restricting portion, the restricting portions restricting the retainer depending on a position of the stopper so that:

the retainer is able to be inserted into the housing when the stopper is at the push-in position, and the retainer is not able to be inserted into the housing when the stopper is at a position other than the push-in position, wherein the retainer is configured to engage with the housing at the insert position, and wherein the restricting portion of the retainer directly engages the restricting portion of the stopper.

2. The connector with check function according to claim 1, wherein the retainer comprises a locking piece inserted into an upper opening portion, which is formed in a top wall of the housing, in a direction at right angles to an axial direction of the housing, and wherein the locking piece engages with the annular protruding portion of the one of the pipes.

3. The connector with check function according to claim 1, wherein the stopper comprises an engaging piece, which elastically engages with the annular protruding portion of the one of the pipes, wherein when the one of the pipes is inserted, the engaging piece abuts against and engages with the annular protruding portion while elastically opening up; and when the one of the pipes is pulled out, the engaging piece engages with the annular protruding portion to return the stopper to the initial position.

4. The connector with check function according to claim 2, wherein the locking piece of the retainer is open at a tip end in an inserting direction, wherein the locking piece comprises a notch having an approximately semi-circular shape, the notch capable of receiving the one of the pipes, and wherein the engaging piece of the stopper is positioned at an opening portion of the tip end of the locking piece.

5. The connector with check function according to claim 1, wherein the retainer comprises a through-hole in a top wall thereof, and wherein a protruding piece is formed on one of the housing and the stopper, and protrudes through the through-hole when the retainer is moved to the insert position.

6. The connector with check function according to claim 1, wherein the housing comprises a notch in a top wall thereof at an edge on a side of the opening portion through which the one of the pipes is inserted, and wherein the retainer comprises, on an inner periphery of a top wall thereof, a protruding portion, which is inserted into the notch portion and extends inside the housing, and abuts against the annular protruding portion of the one of the pipes to restrict insertion of the retainer when the one of the pipes is not fully inserted.

7. The connector with check function according to claim 2, wherein the locking piece of the retainer comprises a stopping portion, which engages with an inner edge portion of the upper opening portion after the locking piece is inserted into the upper opening portion formed in the top wall of the housing, to prevent the locking piece from disengaging therefrom.

8. The connector with check function according to claim 1, wherein a covering wall is formed approximately parallel to sidewalls of the housing,
wherein a clearance large enough for sidewalls of the retainer to be inserted is formed between the side walls of the housing and the cover wall, and
wherein when the retainer is moved to the insert position, the sidewalls of the retainer are covered with the covering wall.

9. The connector with check function according to claim 3, wherein the housing comprises a slot formed in an inner periphery of the housing, the engaging piece of the stopper being inserted into the slot.

10. The connector with check function according to claim 9, wherein the housing further comprises:
a stopping hole formed adjacent to the slot, and
wherein a tip end of the locking piece of the retainer is inserted into the stopping hole.

11. The connector with check function according to claim 2, wherein the housing further comprises:
a top wall opening formed in the top wall of the housing, and
wherein an elastic claw of the stopper engages the top wall opening.

12. The connector with check function according to claim 1, wherein the housing further comprises:
an upper sliding position holding slot and a lower position holding slot disposed on a sidewall of the housing, and
wherein sidewall protrusions, formed on an inner periphery of a sidewall of the retainer, engage the upper sliding position holding slot and the lower position holding slot.

13. The connector with check function according to claim 11, wherein the elastic claw of the stopper is formed on a tongue portion, which extends from an annular portion of the stopper toward the opening portion of the housing.

14. The connector with check function according to claim 3, wherein the engaging piece of the stopper comprises an engaging claw disposed at a tip end of the engaging piece.

15. The connector with check function according to claim 1, wherein the restricting portion of the stopper comprises a protruding portion extending from a side of an annular portion of the stopper.

16. The connector with check function according to claim 15, wherein the protruding portion comprises a plate-shaped portion disposed at a distal end of the protruding portion.

17. The connector with check function according to claim 16, wherein the restricting portion of the stopper further comprises:
a restricting protrusion disposed on the plate-shaped portion.

18. The connector with check function according to claim 1, wherein the restricting portion of the retainer comprises a step portion disposed on a wall portion of the retainer.

19. A connector with check function for connecting pipes for fluid, one of the pipes comprising an annular protruding portion on an outer periphery thereof at an end portion, the connector comprising:
an approximately cylindrical housing coupled to another of the pipes, the housing into which the one of the pipes is inserted;
a stopper disposed in an interior of the housing, the stopper held at an initial position of the stopper adjacent to an opening portion of the housing, the stopper moving to a push-in position away from the opening portion of the housing when the one of the pipes is fully inserted; and
a retainer attached to the housing to be insertable and movable between an initial position of the retainer and an insert position,
wherein the retainer and the stopper each comprises a restricting portion, the restricting portions restricting the retainer depending on a position of the stopper so that:
the retainer is able to be inserted into the housing when the stopper is at the push-in position, and
the retainer is not able to be inserted into the housing when the stopper is at a position other than the push-in position,
wherein the retainer is configured to engage with the housing at the insert position, wherein the retainer comprises a through-hole in a top wall thereof,
wherein a protruding piece is formed on one of the housing and the stopper, and protrudes through the through-hole when the retainer is moved to the insert position, and
wherein the restricting portion of the retainer directly engages the restricting portion of the stopper.

20. A connector with check function for connecting pipes for fluid, one of the pipes comprising an annular protruding portion on an outer periphery thereof at an end portion, the connector comprising:
an approximately cylindrical housing coupled to another of the pipes, the housing into which the one of the pipes is inserted;
a stopper disposed in an interior of the housing, the stopper held at an initial position of the stopper adjacent to an opening portion of the housing, the stopper moving to a push-in position away from the opening portion of the housing when the one of the pipes is fully inserted; and
a retainer attached to the housing to be insertable and movable between an initial position of the retainer and an insert position,
wherein the retainer and the stopper each comprises a restricting portion, the restricting portions restricting the retainer depending on a position of the stopper so that:
the retainer is able to be inserted into the housing when the stopper is at the push-in position, and
the retainer is not able to be inserted into the housing when the stopper is at a position other than the push-in position,
wherein the retainer is configured to engage with the housing at the insert position,
wherein the housing comprises a notch in a top wall thereof at an edge on a side of the opening portion through which the one of the pipes is inserted,
wherein the retainer comprises, on an inner periphery of a top wall thereof, a protruding portion, which is inserted into the notch portion and extends inside the housing, and abuts against the annular protruding portion of the one of the pipes to restrict insertion of the retainer when the one of the pipes is not fully inserted,
wherein the restricting portion of the retainer directly engages the restricting portion of the stopper.

21. A connector with check function for connecting two pipes, the connector comprising:
- a housing coupled to a first of the two pipes, the housing having an opening into which the second of the two pipes is inserted;
- a stopper disposed in an interior of the housing, the stopper held at an initial position of the stopper adjacent to the opening of the housing, the stopper moving to a push-in position away from the opening of the housing when the second pipe is fully inserted; and
- a retainer attached to the housing to be insertable and movable between an initial position of the retainer and an insert position,
- wherein the retainer and the stopper each comprises a restricting portion, the restricting portion of the retainer directly engaging the restricting portion of the stopper, the restricting portions restricting the retainer depending on a position of the stopper.

22. A connector with check function for connecting two pipes, the connector comprising:
- an approximately cylindrical housing coupled to a first of the two pipes, the housing having an opening into which a second of the two pipes is inserted;
- a stopper disposed in an interior of the housing, the stopper held at an initial position of the stopper adjacent to the opening portion of the housing, the stopper moving to a push-in position away from the opening of the housing when the second pipe is fully inserted; and
- a retainer attached to the housing to be insertable and movable between an initial position of the retainer and an insert position,
- wherein the retainer and the stopper each comprises a restricting portion, the restricting portion of the retainer directly engaging the restricting portion of the stopper.

* * * * *